United States Patent [19]
Kannady et al.

[11] Patent Number: 5,263,164
[45] Date of Patent: Nov. 16, 1993

[54] METHOD AND STRUCTURE FOR DETERMINING TRANSACTION SYSTEM HARDWARE AND SOFTWARE CONFIGURATIONS

[75] Inventors: Danny O. Kannady, Rocklin, Calif.; William M. Horner, Plano, Tex.; Srinivasan Rao, Bangalore, India

[73] Assignee: VeriFone, Inc., Redwood City, Calif.

[21] Appl. No.: 640,279

[22] Filed: Jan. 9, 1991

[51] Int. Cl.$^5$ ............................................. G06F 15/40
[52] U.S. Cl. ...................................... 395/700; 395/75; 364/DIG. 1; 364/274.2; 364/294.3; 364/286
[58] Field of Search ............... 395/700, 650, 600, 900, 395/75, 76, 77, 62, 63, 50

[56] References Cited

U.S. PATENT DOCUMENTS

| | | | |
|---|---|---|---|
| 3,509,331 | 4/1970 | Cutaia | 235/176 |
| 3,598,973 | 8/1971 | Brooks et al. | 235/168 |
| 3,878,531 | 4/1975 | McClelland | 340/366 |
| 3,909,604 | 9/1975 | Monna | 235/152 |
| 3,914,579 | 10/1975 | Shigmori et al. | 235/61.7 B |
| 3,916,386 | 10/1975 | Teixeira et al. | 340/172.5 |
| 3,924,108 | 12/1975 | Nakamura | 235/152 |
| 3,946,217 | 3/1976 | Tsujikawa et al. | 235/156 |
| 3,946,220 | 3/1976 | Brobeck et al. | 235/168 |
| 3,947,660 | 3/1976 | Saito | 235/61.6 |
| 3,963,910 | 6/1976 | Enomoto et al. | 235/156 |
| 4,003,030 | 1/1977 | Takagi et al. | 340/172.5 |
| 4,023,012 | 5/1977 | Ano et al. | 235/61.7 B |
| 4,027,140 | 5/1977 | Fowler et al. | 235/7 |
| 4,048,475 | 9/1977 | Yoshida | 235/61.7 B |
| 4,070,564 | 1/1978 | Tucker | 364/405 |
| 4,070,648 | 1/1978 | Mergenthaler et al. | 340/146.1 BE |
| 4,075,696 | 2/1978 | Shinoda et al. | 364/404 |
| 4,084,238 | 4/1978 | Masuo | 364/405 |
| 4,095,738 | 6/1978 | Masuo | 235/309 |
| 4,138,733 | 2/1979 | Tadakuma et al. | 364/900 |
| 4,142,235 | 2/1979 | Tadakuma et al. | 364/405 |
| 4,144,567 | 3/1979 | Tadakuma et al. | 364/405 |
| 4,159,533 | 6/1979 | Sakurai | 364/900 |
| 4,186,439 | 1/1980 | Shimura et al. | 364/405 |
| 4,188,962 | 2/1980 | Onoe et al. | 133/4 R |
| 4,189,774 | 2/1980 | Kashio | 364/405 |
| 4,191,999 | 3/1980 | Kashio | 364/405 |
| 4,213,179 | 7/1980 | Hamano et al. | 364/405 |
| 4,220,991 | 9/1980 | Hamano et al. | 364/405 |
| 4,231,511 | 11/1980 | Campanella et al. | 235/375 |
| 4,237,483 | 12/1980 | Clever | 358/108 |
| 4,245,138 | 1/1981 | Harper | 200/5 A |
| 4,245,311 | 1/1981 | Nakamura | 364/405 |
| 4,255,697 | 3/1981 | Buhler, III | 320/6 |
| 4,261,036 | 4/1981 | Nagasaka et al. | 364/405 |
| 4,262,333 | 4/1981 | Horigome et al. | 364/408 |
| 4,276,598 | 6/1981 | Inoue et al. | 364/405 |
| 4,285,043 | 8/1981 | Hashimoto et al. | 364/707 |
| 4,289,943 | 9/1981 | Sado | 200/159 B |
| 4,293,911 | 10/1981 | Oonishi | 364/405 |
| 4,295,039 | 10/1981 | Stuckert | 235/380 |
| 4,307,268 | 12/1981 | Harper | 200/5 A |
| 4,312,037 | 1/1982 | Yamakita | 364/405 |
| 4,314,116 | 2/1982 | Gordon | 200/5 A |
| 4,317,172 | 2/1982 | Nakano | 364/405 |
| 4,320,387 | 3/1982 | Powell | 340/825.34 |
| 4,321,671 | 3/1982 | Ohsako | 364/405 |
| 4,322,587 | 3/1982 | Burns et al. | 200/5 R |
| 4,322,796 | 3/1982 | Uchida et al. | 364/405 |
| 4,325,441 | 4/1982 | Nakatani et al. | 177/25 |

(List continued on next page.)

Primary Examiner—Kevin A. Kriess
Attorney, Agent, or Firm—Steven F. Caserza

[57] ABSTRACT

A method and structure are provided for automating the collection of information from a customer and providing a specification of a transaction system to fullfil the customer's needs and desires. An ordering step is used in order to obtain information via a convenient user interface to determine the customer's intended use of the machine and the performance desired. As a result of this ordering process, the system hardware configuration is determined automatically. During the implementation process, the system is used to assemble a package of software, to run the hardware thus configured and implement the chosen user functions. If desired, this information is stored for later use in the event the user wishes to modify the configuration of his system, or to order additional system configurations different than that of the initial system.

24 Claims, 3 Drawing Sheets

U.S. PATENT DOCUMENTS

| | | | |
|---|---|---|---|
| 4,328,544 | 5/1982 | Baldwin et al. | 364/405 |
| 4,360,872 | 11/1982 | Suzuki et al. | 364/405 |
| 4,369,334 | 1/1983 | Nakatani et al. | 179/1 SM |
| 4,388,689 | 6/1983 | Hayman et al. | 364/401 |
| 4,389,707 | 6/1983 | Tsuzuki | 364/405 |
| 4,396,985 | 8/1983 | Ohara | 364/405 |
| 4,398,250 | 8/1983 | Hosono | 364/404 |
| 4,399,508 | 8/1983 | Nakatani et al. | 364/405 |
| 4,408,292 | 10/1983 | Nakatani et al. | 364/405 |
| 4,412,304 | 10/1983 | Yamakita | 364/900 |
| 4,415,065 | 11/1983 | Sandstedt | 186/39 |
| 4,419,738 | 12/1983 | Takahashi et al. | 364/900 |
| 4,424,566 | 1/1984 | Tsuzuki | 364/405 |
| 4,424,567 | 1/1984 | Yasutake | 364/405 |
| 4,425,619 | 1/1984 | Matsuda et al. | 364/405 |
| 4,428,049 | 1/1984 | Miyazaki | 364/405 |
| 4,430,713 | 2/1984 | Nakatani et al. | 364/405 |
| 4,435,767 | 3/1984 | Nakatani et al. | 364/405 |
| 4,441,160 | 4/1984 | Azcua et al. | 364/900 |
| 4,443,692 | 4/1984 | Nishimura | 235/379 |
| 4,449,040 | 5/1984 | Matsuoka et al. | 235/380 |
| 4,450,526 | 5/1984 | Nakatani et al. | 364/405 |
| 4,455,620 | 6/1984 | Watanabe et al. | 364/900 |
| 4,458,317 | 7/1984 | Horigome et al. | 364/406 |
| 4,468,750 | 8/1984 | Chamoff et al. | 364/900 |
| 4,471,434 | 9/1984 | Iwawaki | 364/405 |
| 4,481,599 | 11/1985 | Ootsuka | 364/710 |
| 4,482,976 | 11/1984 | Ishikawa | 364/710 |
| 4,484,277 | 11/1984 | Uesugi | 364/405 |
| 4,485,441 | 11/1984 | Nakatani et al. | 364/405 |
| 4,493,037 | 1/1985 | Takano et al. | 364/405 |
| 4,502,119 | 2/1985 | Tsuzuki | 364/405 |
| 4,502,120 | 2/1985 | Ohnishi et al. | 364/405 |
| 4,503,503 | 3/1985 | Suzuki | 364/405 |
| 4,508,962 | 4/1985 | Yamasaki | 235/378 |
| 4,509,129 | 4/1985 | Yatsunami et al. | 364/513.5 |
| 4,512,027 | 4/1985 | Mochizuki et al. | 377/16 |
| 4,518,852 | 5/1985 | Stockburger et al. | 235/381 |
| 4,521,677 | 6/1985 | Sarwin | 235/385 |
| 4,525,799 | 6/1985 | Okawa et al. | 364/900 |
| 4,530,067 | 7/1985 | Dorr | 364/900 |
| 4,532,641 | 7/1985 | Nishimura | 377/14 |
| 4,538,057 | 8/1985 | Iwagami et al. | 235/379 |
| 4,553,222 | 11/1985 | Kurland et al. | 364/900 |
| 4,558,413 | 12/1985 | Schmidt et al. | 395/700 |
| 4,562,341 | 12/1985 | Ohmae et al. | 235/379 |
| 4,564,904 | 1/1986 | Kumagai | 364/405 |
| 4,569,421 | 2/1986 | Sandstedt | 186/39 |
| 4,570,223 | 2/1986 | Yoshimoto | 364/405 |
| 4,589,069 | 5/1986 | Endo et al. | 364/405 |
| 4,591,854 | 5/1986 | Robinson | 340/825.31 |
| 4,594,664 | 6/1986 | Hashimoto | 364/405 |
| 4,595,985 | 6/1986 | Sakakiya | 364/405 |
| 4,607,334 | 8/1986 | Shiono et al. | 364/405 |
| 4,607,335 | 8/1986 | Mizuno | 364/405 |
| 4,608,486 | 8/1986 | Berstein et al. | 235/380 |
| 4,611,286 | 9/1986 | Nishimura et al. | 364/405 |
| 4,626,844 | 12/1986 | Mann et al. | 340/825.31 |
| 4,626,990 | 12/1986 | Komai et al. | 364/405 |
| 4,628,452 | 12/1986 | Shiono et al. | 364/405 |
| 4,630,200 | 12/1986 | Ohmae et al. | 364/405 |
| 4,633,396 | 12/1986 | Komai et al. | 364/405 |
| 4,634,845 | 1/1987 | Hale et al. | 235/350 |
| 4,635,196 | 1/1987 | Nakamura et al. | 364/405 |
| 4,638,435 | 1/1987 | Matsuda et al. | 364/405 |
| 4,649,481 | 3/1987 | Takahashi | 364/405 |
| 4,651,279 | 3/1987 | Suzuki | 364/405 |
| 4,661,658 | 4/1987 | Matyas | 380/23 |
| 4,661,908 | 4/1987 | Hamano et al. | 364/405 |
| 4,672,543 | 6/1987 | Matsui et al. | 364/200 |
| 4,673,802 | 6/1987 | Ohmae et al. | 235/379 |
| 4,675,515 | 6/1987 | Lucero | 235/381 |
| 4,678,895 | 7/1987 | Tateisi et al. | 235/379 |
| 4,679,154 | 7/1987 | Blanford | 364/525 |
| 4,680,707 | 7/1987 | Iida | 364/405 |
| 4,683,536 | 7/1987 | Yamamoto | 364/408 |
| 4,688,173 | 8/1987 | Mitarai et al. | 364/405 |
| 4,688,174 | 8/1987 | Sakamoto | 364/405 |
| 4,689,478 | 8/1987 | Hale et al. | 235/380 |
| 4,691,283 | 9/1987 | Matsuda et al. | 364/405 |
| 4,707,785 | 11/1987 | Takagi | 364/405 |
| 4,713,760 | 12/1987 | Yamada et al. | 364/405 |
| 4,713,785 | 12/1987 | Antonelli et al. | 364/569 |
| 4,714,992 | 12/1987 | Gladney et al. | 364/200 |
| 4,722,054 | 1/1988 | Yorozu et al. | 364/401 |
| 4,725,949 | 2/1988 | Dreher | 364/405 |
| 4,729,097 | 3/1988 | Takaoka et al. | 364/405 |
| 4,734,857 | 3/1988 | Fujiwara et al. | 364/405 |
| 4,747,049 | 5/1988 | Richardson et al. | 364/405 |
| 4,750,120 | 6/1988 | Takahashi | 364/405 |
| 4,751,635 | 6/1988 | Kret | 395/700 |
| 4,751,641 | 6/1988 | Collins, Jr. et al. | 364/405 |
| 4,752,874 | 6/1988 | Meyers | 364/405 |
| 4,752,875 | 6/1988 | Takebayashi | 364/405 |
| 4,757,448 | 7/1988 | Takagi | 364/405 |
| 4,758,714 | 7/1988 | Carlson et al. | 235/380 |
| 4,766,295 | 8/1988 | Davis et al. | 235/383 |
| 4,771,382 | 9/1988 | Shiono et al. | 364/405 |
| 4,771,383 | 9/1988 | Takahashi | 364/405 |
| 4,771,461 | 9/1988 | Matyas | 380/24 |

U.S. PATENT DOCUMENTS

| | | | |
|---|---|---|---|
| 4,776,540 | 8/1988 | Mizuno | 364/405 |
| 4,786,788 | 11/1988 | Noji | 235/383 |
| 4,787,037 | 11/1988 | Ootsuka | 364/404 |
| 4,788,418 | 11/1988 | Tsuki | 235/379 |
| 4,788,637 | 11/1988 | Tamaru | 364/200 |
| 4,797,540 | 1/1989 | Kimizu | 235/383 |
| 4,800,493 | 1/1989 | Takagi | 364/405 |
| 4,811,219 | 3/1989 | Touji et al. | 364/405 |
| 4,814,985 | 3/1989 | Swistak | 364/405 |
| 4,817,041 | 3/1989 | Sakamoto | 364/405 |
| 4,821,186 | 4/1989 | Munakata et al. | 364/405 |
| 4,825,045 | 4/1989 | Humble | 235/383 |
| 4,829,429 | 5/1989 | Komai et al. | 364/405 |
| 4,833,308 | 5/1989 | Humble | 235/383 |
| 4,833,608 | 5/1989 | Aya | 364/404 |
| 4,833,609 | 5/1989 | Grulke, Jr. | 364/405 |
| 4,840,344 | 6/1989 | Moroe | 248/676 |
| 4,841,441 | 6/1989 | Nixon et al. | 395/50 |
| 4,841,442 | 6/1989 | Hosoyama | 364/405 |
| 4,843,547 | 6/1989 | Fuyama et al. | 364/405 |
| 4,843,560 | 6/1989 | Ichikawa | 364/464.02 |
| 4,847,762 | 7/1989 | Suzuki | 364/405 |
| 4,851,650 | 7/1989 | Kitade | 235/379 |
| 4,853,853 | 8/1989 | Yamamura et al. | 364/405 |
| 4,855,908 | 8/1989 | Shimoda et al. | 364/405 |
| 4,859,838 | 8/1989 | Okiharu | 235/383 |
| 4,870,577 | 9/1989 | Karasawa et al. | 364/405 |
| 4,873,631 | 10/1989 | Nathan et al. | 364/405 |
| 4,875,163 | 10/1989 | Ishii | 364/405 |
| 4,877,947 | 10/1989 | Mori | 235/381 |
| 4,879,649 | 11/1989 | Ishii | 364/405 |
| 4,879,650 | 11/1989 | Kurimoto et al. | 364/405 |
| 4,880,493 | 1/1989 | Takagi | 364/405 |
| 4,887,209 | 12/1989 | Sugishima | 364/405 |
| 4,887,210 | 12/1989 | Nakamura et al. | 364/405 |
| 4,888,771 | 12/1989 | Benignus et al. | 395/916 |
| 4,893,236 | 1/1990 | Ohnishi et al. | 364/405 |
| 4,893,237 | 1/1990 | Unno | 364/405 |
| 4,903,200 | 2/1990 | Mook, Jr. | 364/405 |
| 4,907,227 | 3/1990 | Unno | 371/11.2 |
| 4,910,672 | 3/1990 | Off et al. | 364/405 |
| 4,916,699 | 4/1990 | Ohashi | 371/17 |
| 4,949,278 | 8/1990 | Davies et al. | 395/50 |
| 4,972,328 | 11/1990 | Wu et al. | 395/75 |
| 5,133,045 | 7/1992 | Gaither et al. | 395/51 |

METHOD AND STRUCTURE FOR DETERMINING TRANSACTION SYSTEM HARDWARE AND SOFTWARE CONFIGURATIONS

CROSS-REFERENCE TO RELATED APPLICATIONS

The following co-pending applications are related to this application, and are hereby incorporated by reference:

| USSN | Filing Date | Title | |
|---|---|---|---|
| 07/639,584 | 1/9/91 | Novel Transaction System Architecture | Now Abandoned |
| 07/639,583 | 1/9/91 | Transaction System Including Novel Memory Architecture & Management | Now Abandoned |
| 07/639,572 | 1/9/91 | Transaction System Including Novel Program Structure | Now Abandoned |
| 07/639,838 | 1/9/91 | Emulator for Use with a Transaction System | Now Abandoned |

BACKGROUND OF THE INVENTION

This invention pertains to transaction systems, such as point of sale terminals, inventory control systems, and the like. More particularly, this invention pertains to a method and structure for determining the specific hardware and software configuration needed to meet an end users' needs and desires.

DESCRIPTION OF THE PRIOR ART

Transaction systems are well known in the prior art and consist to a large extent of sales systems such as electronic cash registers and associated peripherals. Typical prior art systems include an electronic cash register of pre-determined hardware configuration running specific application software. For example, in a supermarket an electronic cash register is utilized in conjunction with a bar code scanner, a change machine, a produce scale, and the like. The electronic cash register is typically a general purpose electronic cash register including ports for connecting the peripheral devices. The application software is stored in the electronic cash register in order to meet the needs of the particular retail or professional environment. In some environments, such as a medical office or certain billing departments, a computer system is used in lieu of an electronic cash register. However, as with prior art electronic cash register systems the computer system is configured with application software and hardware to perform the desired functions of the particular environment.

In order to configure the system and software for a particular use, prior art systems leave few choices. In many situations, the electronic cash register provided no opportunities for being tailored to the specific environment of the end-user. In those instances in which the electronic cash register could be tailored, tailoring the electronic cash register for a specific need was accomplished by a salesperson or the like who selected from the few options available based upon his experience with end user needs.

The situation with respect to application software is no better in the prior art. Although there is generally greater diversity in application software than hardware in the prior art, much of it is custom tailored by the particular end user for use in their applications. Thus, for example, a supermarket chain would often prepare, or have prepared, application software intended for their specific use. While a number of features might be common among various supermarket chains, or end users in general, it was up to the end user to determine which applications were needed for their particular purposes, and how best to implement those application softwares.

Accordingly, it is seen that in the prior art relatively few choices of hardware configuration and application software configurations are available on a standardized basis. From the relatively small selection of standardized application software, a selection is made in a non-standard manner by a sales or marketing person which hopefully best meets the end users' needs.

SUMMARY OF THE INVENTION

In accordance with the teachings of this invention, a method and structure are provided for automating the collection of information from a customer and providing a specification of a transaction system to fullfil the customer's needs and desires. In one embodiment of this invention, an ordering step is used in order to obtain information via a convenient user interface to determine the customer's intended use of the machine and the performance desired. As a result of this ordering process, the system hardware configuration is determined automatically. During the implementation process, the configuration system of this invention is used to assemble a package of software, which may include both programs and data files, to run the hardware thus configured and implement the chosen user functions.

If desired, this information is stored for later use in the event the user wishes to modify the configuration of his system, or to order additional system configurations different than that of the initial system.

TABLES AND APPENDICES

Table 1 lists a plurality of user functions capable of being performed by a transaction system. This configuration is determined in accordance with the teachings of this invention.

Appendix A is a software listing of C source code suitable for compilation and running on an MS DOS platform in order to serve as one embodiment of a configuration system in accordance with the teachings of this invention.

DESCRIPTION OF THE SPECIFIC EMBODIMENTS

Transaction system end users (i.e. customers of transaction system vendors) understand their environments and can describe their needs in looking for solutions to their problems. Customers (and vendor marketing personnel) need help, however, in selecting the appropriate choice of hardware and software options provided by a modern transaction system.

In accordance with the teachings of this invention, a method and structure are provided for automating the collection of information from a customer and providing a specification of a transaction system that will fulfill the customer's needs. Information on a customer's system is retained for maintaining and updating the customer's system at a later date, as customer needs change.

Figure 1:
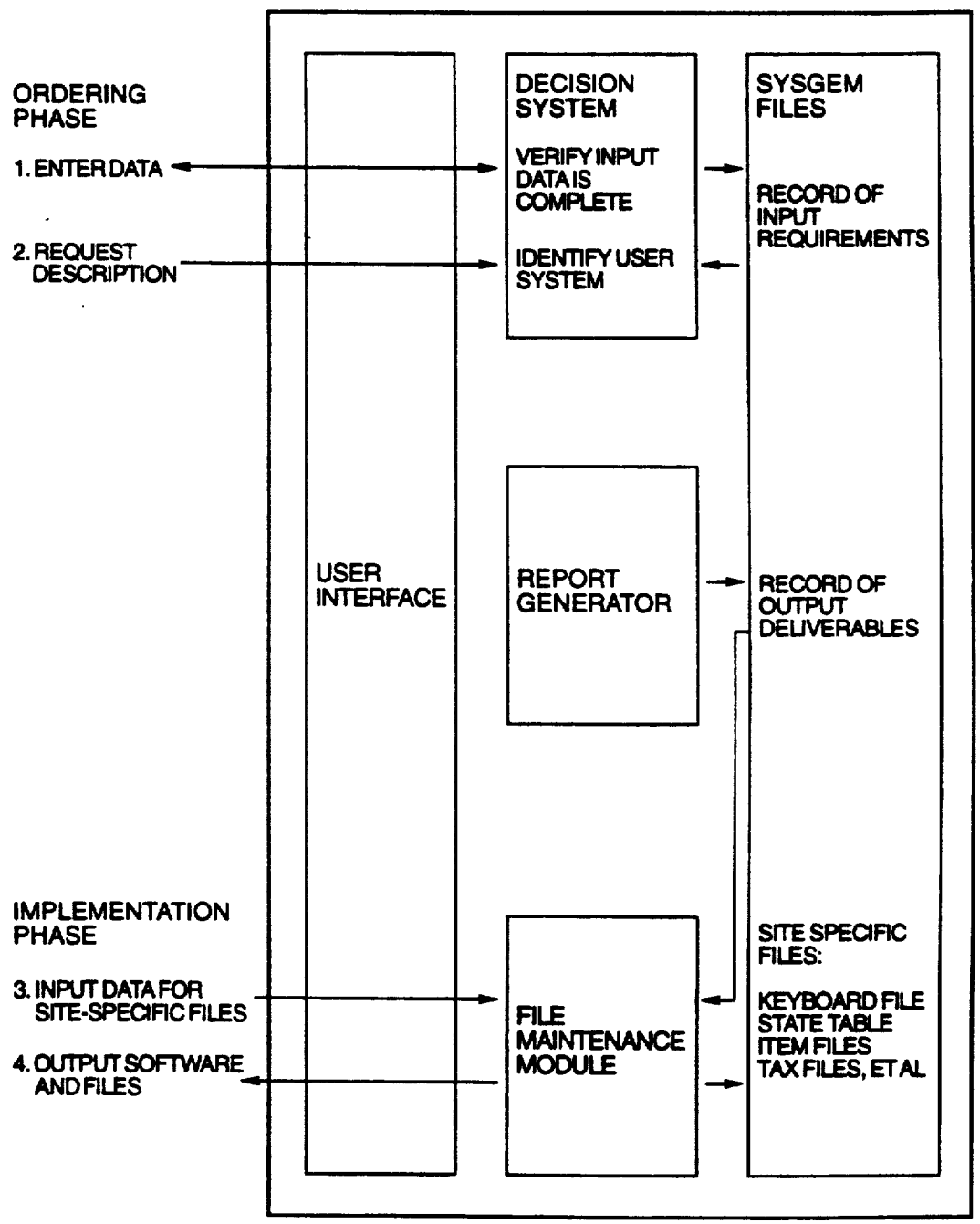
FIG. 1 is a block diagram depicting one embodiment of a configuration system of this invention.
Figure 2:
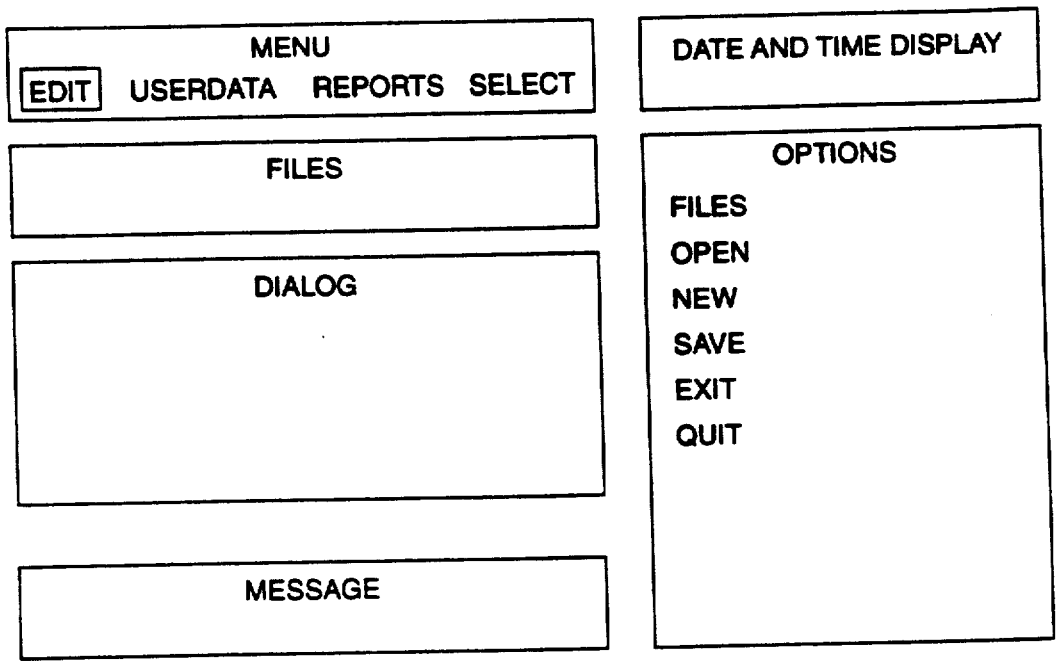
FIGS. 2-5 depict various display screens utilized in accordance with one embodiment of this invention.
Figure 3:
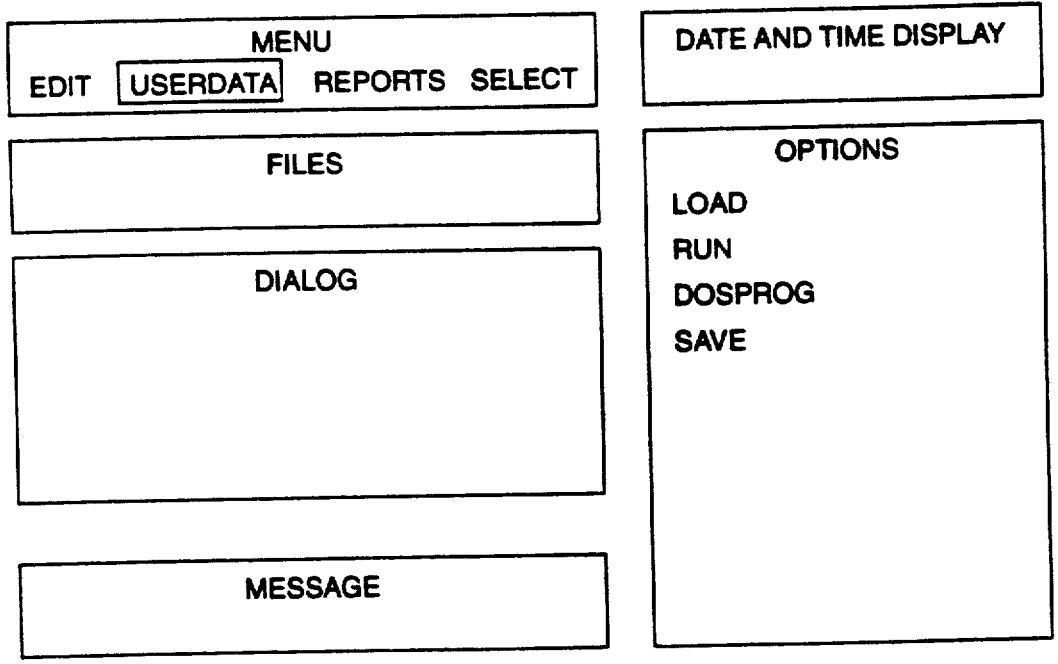
Figure 4:
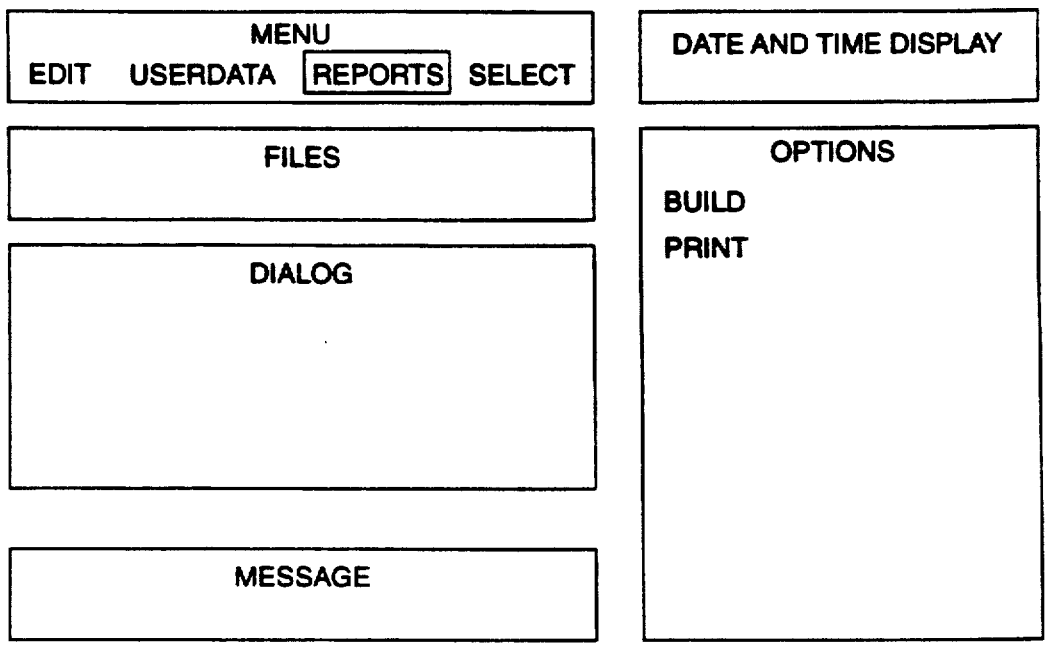
Figure 5:
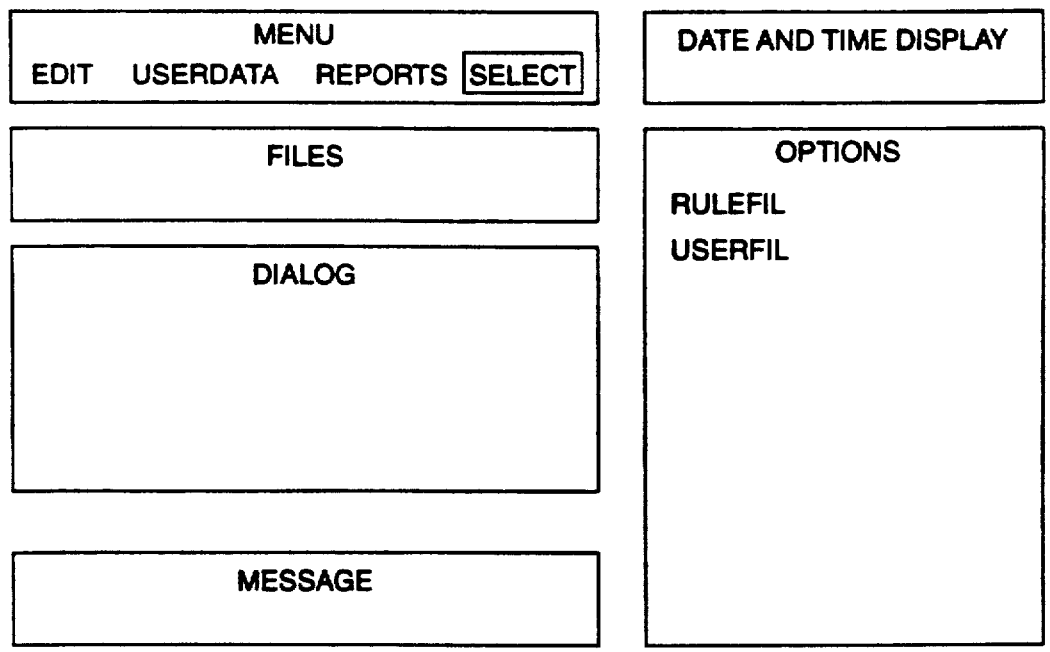

The use of the configuration system of the present invention may be described as follows, with reference to FIG. 1 which depicts one embodiment of a configuration system constructed in accordance with the teachings of this invention.

1. Ordering process: The configuration system of this invention is used to insure functional completeness of the user's system and specify the hardware configuration to implement those functions. System specification includes the user's choices for the user interface (e.g. keyboard definition) and the order and presentation of functions to be performed by the transaction system (e.g. scroll through a menu, select function by pressing a single key).

2. Implementation process: The configuration system is used to assemble a package of software (programs and data files) to run the hardware and implement the chosen user functions.

3. Maintenance: The information produced by the configuration system is available for various maintenance activities and the configuration system itself is used for updating the user's system.

ORDERING PROCESS

In the ordering phase, input from the user will typically be in response to questions and consist generally of yes/no choices and some numbers or ranges of numbers. This information is easily provided as it is the customer who is most familiar with his business and his specific needs.

The customer supplied information is used to specify the functions which the user has indicated his customized system needs to perform. From these functions the configuration system derives the system description.

The user functions include, for example, some or all of those given in Appendix A. The choices are presented to the user in a form most appropriate for the user which may, if desired, differ from the organization of the material in Table 1. The ordering phase of the configuration system preferably takes into account defaults (functions a user will get automatically in various circumstances, unless specifically renounced), probable contingencies ("if you have chosen A, then you might want B"), and the user viewpoint in general. If desired, the form of presentation can be made dependent on the type of business and activity which will be served by the transaction system being configured.

In one embodiment, program queries and user input of data is through a user-friendly interface of menus and windows. The interface works off of one or more templates that allow for easy alteration of the interface for different markets and to respond to feedback from sales personnel and customers in order to make the ordering process as simple and responsive as possible. This is described in greater detail later under the heading "Setting up and Modifying the Configuration System."

The configuration system performs two operations with respect to the input data: determining the completeness of the data and determining the system(s) that will meet the requirements of the data. The configuration system first decides whether the information given is complete. If not, it calls for the information needed. This functionality is closely integrated with the user interface and has a "shell" form allowing for the easy alteration of the input requirements and the decision rules.

Various reports are capable of being provided following the ordering process. For example, a hardware report comprises a hardware component list, including the required amounts of memory. If desired, this hardware report can also include product pricing based upon the hardware configuration required. If desired, one or more reports pertaining to the desired functions and the software modules required is also provided; in one embodiment pricing of the software required is also provided. If desired, the system automatically generates purchase orders, and provides shipping information as well.

One or more data files are created during the ordering process in response to the customer supplied information. Such one or more data files are then provided to the implementation process, which is now described.

IMPLEMENTATION PROCESS

Step 1: Based upon the configuration and functionality defined in the ordering process, additional information is obtained, for example in a similar manner as information is obtained during the ordering process, to obtain specific information needed to implement the desired functionality. For example, once the functionality is defined in the ordering process, this step obtains information defining the specific location of keys on a keyboard, which keys are required by the desired functionality. A user's specific data is also obtained, such as the sales tax table, price look up files, department definitions, gasoline storage pump configurations, which are needed as defined during the ordering process.

Step 2: The software component package, consisting of application programs and specific data files, is generated based upon the determined configuration. The package is presented for installation in an appropriate mode, such as via modem, diskette, JEDIA card, or as a file on the salesperson's or customer's computer, such as a personal computer. In one embodiment, an operational state table (OST) is generated in order to tie together the application software selected for this configuration and the user defined keys. For example, a master state table (MST) is used which includes a large number of possible combinations of states and key entries, from which are selected those state transitions required to form the OST for the specific configuration being developed.

MAINTENANCE

If desired, the "raw" information input by the customer and/or the information generated by the configuration system is saved for future use in the event the customer determines that his needs or desires have changed. In this manner, only changes need be input to the configuration system, rather than a complete set of data, thereby making the task of modifying the configured system quite simple, fast, and inexpensive as well as less prone to error. Furthermore, this allows a customer to explore various alternative systems based upon slightly changed functionality such that, for example, new comparisons can be made.

SETTING UP AND MODIFYING THE CONFIGURATION SYSTEM

An ASCII file is used as a template to determine the content and flow of the process by which the configuration is defined. This file is easily constructed and altered with a simple text editor. In one embodiment of this invention, a template editor is included which is invoked via the Edit selection on the main menu. If desired, separate templates are used for different types of users in order to make the configuration process as simple as possible for each user. Thus, for example, one template is used to configure supermarket transaction systems, another template is used to configure gasoline station transaction systems, etc.

1. Template Control of Input

The template lists the data required for a given running of the configuration system. It supplies a list of the data required, its type and format, and the text of the prompt to obtain the data. When the data is a selection among alternatives, the template supplies the text describing the alternatives that appear in the window. The I/O shell takes the template data and uses it to ask the right questions.

In one embodiment, there are six types of data elements ("facts").

1. Integer
2. String
3. Boolean (e.g. yes/no or true/false)
4. Attribute—e.g. select one choice from a list of choices
5. Multivariable—e.g. select a plurality of choices
6. Real The list of required input data fulfills the function of determining if all the data has been received. In one embodiment, the list of required input data is cycled through and each question must be answered. Where appropriate, the template includes certain default input data values.

2. Template Specification of Decision Rules

The template contains the rules relating the input elements. The template is divided into three sections. The first section is called the Facts, the second section is called the Rules, which defines the relationship(s) between the facts, and the third section is called the Reports which specifies the output data and output format.

The criteria used for the selection of a system configuration is based upon a combination of the rules and the facts specific to that user.

3. The Use of Different Templates

Different templates are appropriate for different users. Different templates can adapt the use of the configuration system of this invention to different natural languages. Different levels of generality for templates are, if desired, employed. For example, a high level of generality might cover one kind of store for different companies, a more specific level might be for different stores for the same company. If desired, templates can be configured for use for different types of end users, e.g. a given template is used which is specifically tailored for a supermarket application, another template is used which is specifically tailored for a department store situation, and another set of template is used which is specifically tailored to apply to the data gathering with respect to a professional office environment. In one embodiment, a record of a customer profile includes a record of the template with which it was collected.

In one embodiment of this invention, the configuration system includes programs written in C and compiled using a Microsoft C compiler to run on a DOS based personal computer, such as an IBM AT or equivalent. One such embodiment includes the following modules:

Modules
3.1 The I/O Interface
3.2 The Shell
3.3 File Maintenance
   3.3.1 Keyboard Program
   3.3.2 State Table
   3.3.3 Miscellaneous Site Files
3.4 Report Generators
3.5 Communications Media

USER INTERFACE

FIGS. 2 through 5 depict the user interface screen for the edit, user data, reports, and select screens, respectively, in accordance with one embodiment of this invention. In each of these screens, the user interface presents six windows as follows:

1 MENU: 1st level of user choice.

2 OPTIONS: 2nd level of user choice.

3 DIALOG: 3rd level of user choice.

4 FILES: This window indicates the current template file in use and the current active user file.

5 MESSAGE: This is a message window where the shell puts messages conforming to whatever processing is currently being carried out. Error messages also appear in this window.

6 DATE & TIME: Presents the date and time

1 MENU. The Menu window presents the four choices:

EDIT (FIG. 2) is used to edit the choices presented to the user

USERDATA (FIG. 3) used to enter user data and run DOS programs

REPORTS (FIG. 4) is used to generate reports based on the user data

SELECT (FIG. 5) can be used, if desired, to select a different template or user file. Alternatively, this selection is achieved via the Load option of the Userdata menu.

Highlighting is moved among the choices by the use of the left and right cursor arrows. The highlighted choice is activated by pressing the TAB key. When a selection is activated, the OPTIONS window presents the options appropriate to the menu selection.

The EDIT Function

This function is used to edit the choices presented to the user. The following options are available:

FILES—Used to select an existing template file.

OPEN—Provides same function as FILES.

NEW—Used to create a new template file; prompts for a file name.

SAVE—Saves the currently selected file; prompts for a filename if n file name was specified earlier.

EXIT—Saves the currently selected file and returns to Main Menu.

QUIT—Returns to the Main Menu without saving changes.

The USERDATA Function

This function is used to enter user data and run DOS programs. Four options are currently available:

LOAD—Loads a selected template file. The loading of the template file forms a base upon which questions can be asked and the required information queried and stored. The user is also prompted to select an existing user file that contains previously saved information.

RUN—Starts the User session and evaluates the Rules.

DOSPROG—Used to select and execute those DOS programs that are defined in the template file.

SAVE—Used to save new and updated information.

The REPORTS Function

This function is used to generate reports based on the user data entered. Two options are available:

BUILD—Used to build the Reports specified in the template file.

PRINT—Sends the reports built using the above option to the printer.

The SELECT Function

This function is used to select available files. The current options are:

RULEFIL—Initially LOAD prompts for a Rulefile, however, if the user wants to load a different template file after a session, this option can be used to select another file.

USERFIL—Same as RULEFIL, except for User files.

FILES Window

The FILES window displays the name of the current activated file.

DIALOG Window—The DIALOG window displays the questions/choices used to identify the system that will best satisfy the needs outlined by the user. A sample of these questions/choices is listed in Appendix B according to file type (Fact, Rule, Report).

MESSAGE Window—The MESSAGE window displays error messages or other user instructions.

OPTIONS Window—The OPTIONS window lists the options available for each MENU function (refer to FIGS. 2 through 5). To select an option, use the up-/down cursor arrows. When the desired option is highlighted, activate it using the ENTER key.

TABLE 1

Applications and Functions (Classified by Session and Service Type)

1. Sales Sessions
   1.1 The Sales Application
      1.1.1 Entering sales manually, with designation of department, e.g. taxable, nontaxable, deli, bakery
      1.1.2 Entering sales automatically using all relevant information from the item file (item file: the information on an item recorded within the system)
         1.1.2.1 Scanning the UPC or EAN of an item
         1.1.2.2 Recording sales of fast moving, promotional, or non-coded products by use of predefined buttons (item definition keys, IDKs) on the keyboard
         1.1.2.3 Identifying products by a numeric entry, other than the above
      1.1.3 Modifying the effects of other entries by special keys
         1.1.3.1 Modifying the effect of UPC, EAN, IDK and numeric entry keys by a series of keys to take account of sizes or quantities: small, medium, large, single, 6-pack, case, etc.
         1.1.3.2 Using a multiplier key for the sale of more than one of an item
         1.1.3.3 Calculating the split price on multiple unit priced items, mix and match or specially priced combinations: 3 for $1, coffee & danish
         1.1.3.4 Overriding the price of an item at the time of sale
      1.1.4 Calculating taxes automatically to the extent possible
         1.1.4.1 Calculating the sales tax in accordance with the various state and local requirements, using multiple tables as necessary
         1.1.4.2 Adding in any appropriate excise taxes or value added tax as required by law
         1.1.4.3 Overriding the tax or the tax amount for tax exempt organizations
      1.1.5 Modifying transactions
         1.1.5.1 Incorporating a discount into the sales transaction for a single sales item or for an entire receipt
         1.1.5.2 Voiding for a single sales item or for an entire receipt
         1.1.5.3 Including a high amount lockout (HALO) and a low amount lockout (LALO), with the facility for override
      1.1.6 Handling various tender media: cash, checks, charge, debit, credit, manufacturers coupons, store coupons, food stamps, cash card, etc.
         1.1.6.1 Separate accounting for different media
         1.1.6.2 Automatic handling of special rules for different media such as laws governing the use of food stamps
      1.1.7 Printing sales receipts with options for modes: full receipt, abbreviated receipt and no receipt
      1.1.8 Opening the cash drawer by use of a NOSALE key
      1.1.9 Interfacing with various models of [Bscales and proper handling of tare (the weight added by packaging)
      1.1.10 Accounting for returned merchandise and refunds
      1.1.11 Handling different or special forms of sales (Session Subtypes)
         1.1.11.1 Lottery Sessions: Handling the selling of lottery tickets and the redemption of lottery winners, as defined by the state commission
            1.1.11.1.1 Handling up to 12 scratch lottery books
            1.1.11.1.2 Handling lotto
         1.1.11.2 Gasoline sessions: see item 2 below
         1.1.11.3 Customer Sessions: to be dealt with in later phases of Gemstone
   1.2 The Time Clock Application
      1.2.1 Recording employee clock in/out data
      1.2.2 Presenting clock information to store management for verification and approval prior to payroll processing Note: this is an example of a functionality that reside in different sessions (clerk or administrative) for different users
   1.3 The Inventory Application
      1.3.1 Handling deliveries of merchandise by vendors, to include the cost of goods received and the increased retail accountability
      1.3.2 Recording and accounting for merchandise that is:
         1.3.2.1 Not appropriate for sale or use in the store or facility (bad merchandise: damaged, spoiled or any other condition which might prohibit if from being sold)
- 1.3.2.2 Used in upkeep of store/facility and thereby removed from the retail stock
- 1.3.2.3 Transferred out of the facility to an affiliated facility
- 1.3.2.4 Transferred in from an affiliated facility
- 1.3.2.5 Returned to vendor
- 1.3.2.6 Used as ingredients for retail items
- 1.4 The Accounting Application
  - 1.4.1 Accounting for various tender media and coupons
  - 1.4.2 Accounting for loans from safes or cash controllers
  - 1.4.3 Accounting for tender transfers:
    - 1.4.3.1 Removed from the cash drawer and secured in a safe or cash controller (drops)
    - 1.4.3.2 Removed from the cash drawer or facility to be deposited in the bank
    - 1.4.3.3 Brought into the facility from the bank
  - 1.4.4 Accounting for the payment of vendor invoices from the financial resources in the facility (paid outs)
  - 1.4.5 Accounting for miscellaneous income
    - 1.4.5.1 U.S. Postage Stamps, game machines, etc.
    - 1.4.5.2 Deposits and deposit returns for soft drink bottles and other containers
    - 1.4.5.3 Rentals such as video tapes and electronic equipment
- 1.5 Closing Applications
  - 1.5.1 Terminal Close
  - 1.5.2 Shift Close
  - 1.5.3 Day Close
2. Gasoline Session (a subtype of the Clerk Session)
  - 2.1 Controlling the gasoline dispensers from the terminal
    - 2.1.1 Controlling the pumps either via the PAM (pump access module) provided by the manufacturer or directly via the current loop.
    - 2.1.2 Determining problems at terminal or in-store computer that are currently handled in the console incorporated in the system
    - 2.1.3 Shutting down dispensers in emergency situations at the terminal
  - 2.2 Providing direct cash accounting control over gasoline sales and dispensing, at the terminal upon which the sale was initiated
  - 2.3 Providing for payment:
    - 2.3.1 Made by prepayment or postpayment with same information available on both for customer receipt
    - 2.3.2 Made by specific dollar amount or for unlimited dispensing.
  - 2.4 Providing for multiple delayed sales (gas queuing)
  - 2.5 Providing for sales initiated on one console and concluded on another
  - 2.6 Recording on the customer receipt, the pertinent data involving the sale of gasoline, including:
    - 2.6.1 dollar amount of the sale,
    - 2.6.2 the gallons sold,
    - 2.6.3 the grade of gasoline
  - 2.7 Provide for deliveries and other inventory adjustments of the gasoline inventory
  - 2.8 Allowing attachment of any pump to any gasoline storage tank and, hence, to any grade of gasoline for:
    - 2.8.1 up to eight grades of gasoline
    - 2.8.2 up to eight gasoline storage tank
    - 2.8.3 up to 32 pumps as a normal configuration in a gasoline retail store
  - 2.9 Interfacing with any of the various gasoline tank monitors and making that information available for reporting
  - 2.10 Requiring minimal hardware modification to interface with pumps of various manufacturers such as user replacement of a single component. Suggested manufacturers of dispensers include: Gilbarco, Tolkeim, Dresser-Wayne, Bennett and Southwest Pump
3. Administration Sessions
  - 3.1 Reporting and Displaying Application
    - 3.1.1 Accounting totals for the current period (since the last time the totals were cleared)
      - 3.1.1.1 Providing the option to clear after printing
      - 3.1.1.2 Providing the capability to adjust the period accounting summaries for "over-rings" and errors by a "Post Void" function
    - 3.1.2 Displaying various types of system data Note: the display functionality is one that may be divided up in different ways and appear in different session types according to what is to be displayed and the customer's preferences.

- 3.2 Site
    - 3.2.1 Modifying the store and terminal numbers
    - 3.2.2 Modifying the date and the time maintained by the system
    - 3.2.3 Modifying the tax computation tables used for the calculation of the sales tax
    - 3.2.4 Modifying the information about a product, such as UPC, source, description, price, food stamp eligibility and tax indicator
  - 3.3 Maintaining and enhancing applications
    - 3.3.1 The accounting summaries is maintained by operator, by terminal, or by system.
    - 3.3.2 The means of recording sales, deliveries, bad merchandise, refunds, in-store use, transfers in and out, returns to vendors, and any other means of inventory adjustment.
4. Internal Services
  - 4.1 Database services
    - 4.1.1 Maintaining an accounting of all activities for reporting through the administrative sessions
    - 4.1.2 Handling the on-line updates of all accumulator files for accounting purposes
    - 4.1.3 Providing data for reporting and for upload tasks
    - 4.1.4 Providing integrity of updates at the field level
  - 4.2 Communication services. Communication services are integral to automation efforts and are available at various levels, from the terminals to in-store personal computers to the host mainframes.
    - 4.1.1 Causing minimal interference with normal activities
    - 4.1.2 Establishing connection with PNC330 for remote communication to financial services via telephone line
    - 4.1.3 Passing information to a higher level utilizing a "state of the art" communications discipline
    - 4.1.4 Interrogate internal LAN/files to determine availability of additional functionality for purpose of migrating to full system capability
    - 4.1.5 The operational mode of the system, terminals and the in-store computer (including the sequence of entry and/or the information captured at the store) are modifiable from the host computer 4.3 Diagnostic services
  4.3.1 Analyzing and reporting problems relating to system components (self-diagnosis)
Security Services
5.1 Local Application Security
  5.1.1 Authorizing by password, the applications authorized by a given password are set in an administrative session
  5.1.2 Cash drawer accountability
5.2 Remote Access Security The invention now being fully described, it will be apparent to one of ordinary skill in the art that many changes and modifications can be made thereto without departing from the spirit or scope of the appended claims.

All publications and patent applications mentioned in this specification are herein incorporated by reference to the same extent as if each individual publication or patent application was specifically and individually indicated to be incorporated by reference.

APPENDIX A

```
:ND.C
/*******************************************************************
*                                                                  *
* MODULE:   BIND.C                                                 *
*                                                                  *
* TITLE:    X                                                      *
*                                                                  *
*        VV   VV EEEEEE RRRRRR IIIIII FFFFFFF OOOOO NNN  NN EEEEEE *
*        VV   VV EE     RR - RR   II    FF    OO  OO NNNN NN EE    *
*        VV   VV EEEEEE RRRRRR    II    FFFFF OO  OO NN NN NN EEEEE*
*         VV VV  EE     RR RR     II    FF    OO  OO NN  NNNN EE   *
*          VVV   EEEEEE RR   RR IIIIII  FF    OOOOO  NN   NNN EEEEEE*
*                                                                  *
*        COPYRIGHT 1990 VERIFONE, INC.                             *
*                                                                  *
*        This program is the property of VERIFONE, INC. and is copyright *
*        protected.  The user is authorized solely to read the program  *
*        from its media into the memory of the computer and  execute the *
*        program.  No additional rights with respect to this program are *
*        granted. COPYING, REPRODUCTION, OR DISTRIBUTION of this program *
*        is strictly PROHIBITED.                                   *
*                                                                  *
* PRODUCT: SYSGEM                                                  *
*                                                                  *
* VERSION: 1.00                                                    *
*                                                                  *
* AUTHOR:  RAJESH P. HALARNKAR                                     *
*                                                                  *
* DATE:    7-1-91                                                  *
*                                                                  *
* PURPOSE: The executable modules required by Gemstone are determined and *
*          transferred to the target directory/disc by this file. Some    *
*       costing calculations are also done here.                   *
* INPUT:   User.prg                                                *
*          Progdef.tbl                                             *
* OUTPUT:  Executable modules required by Gemstone.                *
*                                                                  *
* ENTRY:   X                                                       *
*                                                                  *
* PROGRAM: X                                                       *
* LOGIC                                                            *
*                                                                  *
* RESTRICT:X                                                       *
*                                                                  *
* FILES:   User.prg                                                *
*          Progdef.tbl                                             *
*       Executable modules as specified by User.prg                *
* EXIT:    X                                                       *
*                                                                  *
* CHANGES: #   Date      Who       Why & What                      *
*          --- --------- --------- ------------------------------- *
*          #01                                                     *
*                                                                  *
*******************************************************************/
include <stdio.h>
include <errno.h>
include <fcntl.h>
```

```c
#include <process.h>
#include <conio.h>
#include <sys\types.h>
#include <sys\stat.h>
include <io.h>
#include <string.h>
#include "shell.h"
#include "costing.h"
#include "proto.h"

void handle_error(char * str);

#define PROGNAME_LENGHT  3
#define PROGDEF_FILE     "PROGDEF.TBL"
#define PREFIX "ga000"
#define SUFFIX ".prg"
#define EXECUTE       ".exe"
#define NOITEMS "NO_OF_ITEMS"
#define MEMORY "MEMORY"

bind()
{
    int prgfile;
    int sorfile;
    int datafile;
    char progval;
    char name[20];
    int size;
    struct {
            char progname[PROGNAME_LENGHT];
            char value ;
            } progdef ;

char error_str[80];
    char buf[65];
    char destfile[65];
    char source_dir[40];
    char dest_dir[40];
    char str[80];

get_fil_nam(userfil, name);
    source_dir[0] = (char )NULL;
    dest_dir[0] = (char )NULL;
    getstr("Enter source directory : ", 39, source_dir);
    getstr("Enter destination directory : ", 39, dest_dir);

sprintf(buf, "%s%s", name, SUFFIX);
    if((prgfile = open( buf, O_RDWR | O_BINARY)) < 0){
            if(errno == ENOENT)
                sprintf(error_str,"File %s does not exist, please create",
                                                                      buf);
            else
                sprintf(error_str,"File open failed of file %s, Error = %d",
                                                            buf, errno);
            handle_error(error_str);
            return(-1);
    } if((datafile = open( PROGDEF_FILE, O_RDWR | O_BINARY)) < 0){
            if(errno == ENOENT)
                sprintf(error_str,"File %s does not exist, please create",
PROGDEF_FILE);
            else
                sprintf(error_str,"File open failed of file %s, Error = %d",
                                                        PROGDEF_FILE, errno);
            handle_error(error_str);
            return(-1);
    }
```

```
        size = sizeof(progdef);
        while(read(prgfile, &progval, 1) == 1){
            lseek( datafile, 01, SEEK_SET);
            while(read(datafile, &progdef, size) == size){
                if(progval == progdef.value){
                    sprintf(buf,"%s\\%s.*s%s", source_dir, PREFIX, PROGNAME_LENGHT,
                                                 progdef.progname, EXECUTE);
                    Message(buf);
                    sprintf(destfile,"%s\\%s.*s%s", dest_dir, PREFIX, PROGNAME_LENGHT,
                                                 progdef.progname, EXECUTE);
                    Message(destfile);

if((sorfile = open( buf, O_RDWR | O_BINARY)) < 0){
                        if(errno == ENOENT)
                            sprintf(error_str,"File %s does not exist, please create",
                                                                                      buf);
                        else
                            sprintf(error_str,"File open failed of file %s, Error = %d",
                                                                                      buf, errno);
                        handle_error(error_str);
                        return(-1);
                    }
                    close(sorfile);
                    sprintf(str, "copy %s %s > nul", buf, destfile);
                    system(str);
                    break;
                }
            }
        }
        close(prgfile);
        close(datafile);
        return(0);
} unsigned long costing(unsigned long noitems, int * memry, long * unitcost)
{
        int prgfile;
        int count = 0;
        char name[20];
        char error_str[80];
        char buf[65];
        char progval;

get_fil_nam(userfil, name);
        sprintf(buf, "%s%s", name, SUFFIX);
        if((prgfile = open( buf, O_RDWR | O_BINARY)) < 0){
                if(errno == ENOENT)
                    sprintf(error_str,"File %s does not exist, please create",
                                                                                  buf);
                else
                    sprintf(error_str,"File open failed of file %s, Error = %d",
                                                                                  buf, errno);
                handle_error(error_str);
                return(-1);
        } while(read(prgfile, &progval, 1) == 1)
            count++;
        close(prgfile);
        return(cost(count, noitems, memry, unitcost));
} void handle_error(char * str)
{
        Message(str);
} unsigned long cost( int count, unsigned long noitems, int * mem,
                                                     long * unitcost)
```

```
{
    float cost;
    int memry; long ucost,tcost;
    float partcost;

partcost = (GEMOS + SYSGEN - TERMINAL);
    memry = (EACHMODULE * count) + (IDPDTMODULE * NOIDPDTMODULE) + OPSYS
                                  + (noitems / ITEMSPERK);

if(memry > ONEMEG){
        handle_error("Sorry no costing available for > 1M memry");
        *mem = memry;
    }
    else if ( memry > FIVEONETWO){
        *mem = ONEMEG;
        cost = costing1000(noitems);
    }
    else if ( memry > TWOFIFTYSIX){
        *mem = FIVEONETWO;
        cost = costing512(noitems);
    }
    else if ( memry > ONETWENTYEIGHT){
        *mem = TWOFIFTYSIX;
        cost = costing256(noitems);
    }
    else{
        *mem = ONETWENTYEIGHT;
            cost = costing128(noitems);
        }
        ucost = (long) ((cost+partcost)*100);
        *unitcost = ucost;
        tcost = ucost*noitems;
        return(tcost);
} float costing1000 ( unsigned long  noitems)
{
    if(noitems > QFIVETHOUSAND)
        return(FIVETHOUSANDPLUS1000);
    else if(noitems > QTWOTHOUSAND)
        return(TWOTHOUSANDPLUS1000);
    else if(noitems > QTHOUSAND)
        return(THOUSANDPLUS1000);
    else if(noitems > QTWOSIXTY)
        return(TWOSIXTYPLUS1000);
    else if(noitems > QSIXTY)
        return(SIXTYPLUS1000);
    else
        return(ONEPLUS1000);
} float costing512 ( unsigned long noitems)
{
    if(noitems > QFIVETHOUSAND)
        return(FIVETHOUSANDPLUS512);
    else if(noitems > QTWOTHOUSAND)
        return(TWOTHOUSANDPLUS512);
    else if(noitems > QTHOUSAND)
        return(THOUSANDPLUS512);
    else if(noitems > QTWOSIXTY)
        return(TWOSIXTYPLUS512);
    else if(noitems > QSIXTY)
        return(SIXTYPLUS512);
    else
        return(ONEPLUS512);
} float costing256 ( unsigned long  noitems)
{
    if(noitems > QFIVETHOUSAND)
        return(FIVETHOUSANDPLUS256);
    else if(noitems > QTWOTHOUSAND)
        return(TWOTHOUSANDPLUS256);
```

```c
        else if(noitems > QTHOUSAND)
            return(THOUSANDPLUS256);
        else if(noitems > QTWOSIXTY)
            return(TWOSIXTYPLUS256);
        else if(noitems > QSIXTY)
            return(SIXTYPLUS256);
        else
            return(ONEPLUS256);
} float costing128 ( unsigned long   noitems)
{
    if(noitems > QFIVETHOUSAND)
        return(FIVETHOUSANDPLUS128);
    else if(noitems > QTWOTHOUSAND)
        return(TWOTHOUSANDPLUS128);
    else if(noitems > QTHOUSAND)
        return(THOUSANDPLUS128);
    else if(noitems > QTWOSIXTY)
        return(TWOSIXTYPLUS128);
    else if(noitems > QSIXTY)
        return(SIXTYPLUS128);
    else
        return(ONEPLUS128);
} unsigned memsize()
{
    int prgfile;
    int count = 0,memry;
    char name[20];
    char error_str[80];
    char buf[65];
    char progval,type;
        unsigned long noitems;
    get_fil_nam(userfil, name);
    sprintf(buf, "%s%s", name, SUFFIX);
    if((prgfile = open( buf, O_RDWR | O_BINARY)) < 0){
     if(errno == ENOENT)
      sprintf(error_str,"File %s does not exist, please create",buf);
     else
      sprintf(error_str,"File open failed of file %s, Error = %d",buf, errno);
     handle_error(error_str);
     return(-1);
    }
    type = locate_fact(NOITEMS);
    if(type != NUMERIC){
    Message("NO_OF_ITEMS sould be numeric"); return(-1); }
        noitems = p2$->num_val;
    while(read(prgfile, &progval, 1) == 1)
        count++;
    memry = (EACHMODULE * count) + (IDPDTMODULE * NOIDPDTMODULE) + OPSYS
                    + (noitems / ITEMSPERK);
    type = locate_fact(MEMORY);
    if(type == NUMERIC){
    p2$->num_val = (unsigned long) memry;
    p2$->status = DEFINED;
    }
    else
    Message("MEMORY sould be numeric");

close(prgfile);
    return(memry);
}

^Z                                                      COST.H define INPUTERROR   1
define REPORTERROR  2
#define RPTWRITE     3
#define MISSINGITEM  4
```

```
#define COSTFILEERROR 5
#define HELPFILEERROR 6
define INVALIDSYSTEM 7 define MAXSYSTEM    5 define TRUE    1
define FALSE   2 define SYSTEMDEF     "SYSOPT"
define    SYSTEMTABLE        "USER.PTS"
#define COSTTABLE          "COST.TBL"
#define COSTREPORT         "COST.RPT"
#define HELPFILE           "PARTS.HLP"

char partno[25],user[25],index,systementry;
unsigned long totalcost,systemcost[MAXSYSTEM];
FILE *fInput;
FILE *fCost;
FILE *fRpt;
FILE *fHelp;^Z define GEMOS              50.00
define SYSGEN             15.00
define TERMINAL           50.00 define ONETWENTYEIGHT         128
define TWOFIFTYSIX         256
#define FIVEONETWO          512
#define ONEMEG              1000
#define EACHMODULE          20
#define OPSYS               64
#define IDPDTMODULE         15
#define NOIDPDTMODULE          2
#define ITEMSPERK           20
#define ONEPLUS128          958.00
#define SIXTYPLUS128            905.47
#define    TWOSIXTYPLUS128          815.43
#define    THOUSANDPLUS128          776.55
#define TWOTHOUSANDPLUS128    741.04
#define    FIVETHOUSANDPLUS128 708.50
#define ONEPLUS256          958.00
#define SIXTYPLUS256            905.47
#define    TWOSIXTYPLUS256          815.43
#define    THOUSANDPLUS256          776.55
#define TWOTHOUSANDPLUS256     741.04
#define    FIVETHOUSANDPLUS256 708.50
#define ONEPLUS512          958.00
#define SIXTYPLUS512            905.47
#define    TWOSIXTYPLUS512          815.43
#define    THOUSANDPLUS512          776.55
#define TWOTHOUSANDPLUS512     741.04
#define    FIVETHOUSANDPLUS512 708.50
#define ONEPLUS1000         958.00
#define SIXTYPLUS1000           905.47
#define    TWOSIXTYPLUS1000    815.43
#define    THOUSANDPLUS1000    776.55
#define TWOTHOUSANDPLUS1000    741.04
#define    FIVETHOUSANDPLUS1000        708.50
#define QONE                1
#define QSIXTY              60
#define QTWOSIXTY           260
#define QTHOUSAND           1000
#define QTWOTHOUSAND           2000
#define QFIVETHOUSAND          5000
```

^Z

```
/*****************************************************************************
 *                                                                           *
 * MODULE:  GLIB.C                                                           *
 *                                                                           *
 * TITLE:   X                                                                *
 *                                                                           *
 *          VV    VV EEEEEEE RRRRRR  IIIIII FFFFFFF  OOOOO  NNN   NN EEEEEEE *
 *          VV    VV EE      RR  RR    II   FF      OO  OO NNNN  NN EE      *
 *          VV    VV EEEEEE  RRRRRR    II   FFFFFF  OO  OO NN NN NN EEEEE   *
 *           VV  VV  EE      RR RR     II   FF      OO  OO NN  NNNN EE      *
 *            VVV    EEEEEEE RR   RR IIIIII FF       OOOOO NN   NNN EEEEEEE *
 *                                                                           *
 *          COPYRIGHT  1990  VERIFONE, INC.                                  *
 *                                                                           *
 *          This program is the property of VERIFONE, INC. and is copyright  *
 *          protected.  The user is authorized solely to read the program    *
 *          from its media into the memory of the computer and  execute the  *
 *          program.  No additional rights with respect to this program are  *
 *          granted. COPYING, REPRODUCTION, OR DISTRIBUTION of this program  *
 *          is strictly PROHIBITED.                                          *
 *                                                                           *
 * PRODUCT: SYSGEM                                                           *
 *                                                                           *
 * VERSION: 1.00                                                             *
 *                                                                           *
 * AUTHOR:  SRINIVASAN RAO                                                   *
 *                                                                           *
 * DATE:    12 DEC 1990                                                      *
 *                                                                           *
 * PURPOSE: CONTAINS GRAPHICS FUNCTIONS AND FONT SELECTION ROUTINES          *
 *                                                                           *
 * INPUT:   X                                                                *
 *                                                                           *
 * OUTPUT:  X                                                                *
 *                                                                           *
 * ENTRY:   X                                                                *
 *                                                                           *
 * PROGRAM: X                                                                *
 * LOGIC                                                                     *
 *                                                                           *
 * RESTRICT:X                                                                *
 *                                                                           *
 * FILES:   X                                                                *
 *                                                                           *
 * EXIT:    X                                                                *
 *                                                                           *
 * CHANGES: #   Date       Who        Why & What                             *
 *          --- ---------- ---------- ------------------------------------   *
 *          #01                                                              *
 *                                                                           *
 *****************************************************************************/
include <stdio.h>
#include <stdlib.h>
#include <stdarg.h>
#include <string.h>
#include <conio.h>
#include <graph.h>
#include "glib.h"
/*#include "proto.h"*/

/*  SprintAt - Format a string, using sprintf() and output to screen
 *             using PrintAt.
 *
 *  Parms: iRow  - Row at which to begin display
 *         iCol  - Column at which to begin display
 *         szFmt - Format string (see run-time library documentation for
 *                 correct formation of a format string)
 *         ...   - Variables to output
 */
void SprintAt( int iRow, int iCol, char * szFmt, ... )
{
    char szTmp[81];
    va_list Marker;
```

```c
va_list saveMarker;

va_start( Marker, szFmt );
    saveMarker = Marker;
    vsprintf( szTmp, szFmt, Marker );
    va_end( Marker );

PrintAt( iRow, iCol, szTmp, -1 );
}

/* PrintAt - Prints a string at the row/column coordinates
 *           specified, in the specified color.
 *
 * Params: row        - row at which to begin output of string
 *         col        - column at which to begin output of string
 *         lpszString - zero (null) terminated string
 *         sColor     - color in which to output string (-1 if
 *                      PrintAt should leave color alone)
 */
void PrintAt( int row, int column, char _far *lpszString, short sColor )
{
    if( sColor != -1 )
        _settextcolor( sColor );
    _settextposition( row, column );
    _outtext( lpszString );
}

/* PrintChar - Prints a character at the row/column coordinates
 *             specified, in the specified color.
 *
 * Params: row    - row at which to begin output of string
 *         col    - column at which to begin output of string
 *         cChar  - character to print
 *         sColor - color in which to output string (-1 if
 *                  PrintChar should leave color alone)
 */
void PrintChar(int row, int column, char cChar, short sColor)
{
    char szTiny[2];

szTiny[0] = cChar;
    szTiny[1] = '\0';
    PrintAt( row, column, szTiny, sColor );
}

/* ChooseFont - Chooses a font from the font library.
 *
 * Params: WhichFont - A member of the set [COURIER, HELV, TMS_RMN,
 *                    MODERN, SCRIPT, ROMAN, NOFONT]
 *         Height    - The desired height of the text (in pixels)
 */ void ChooseFont( int WhichFont, int Height )
{
    static char *FontIds[] =
    {
        "courier", "helv", "tms rmn", "modern", "script", "roman"
    };
    char SetCommand[30];

/* Construct the command to send to _setfont. */
    sprintf( SetCommand, "t'%s'h%dw0b", FontIds[WhichFont], Height );

if( _setfont( SetCommand ) < 0 )
    {
        _outtext( "Could not set. Try different font or size" );
        getch();
    }
} int RegFont()
{
```

```
   if( _registerfonts( "*.FON" ) < 0 )
    _unregisterfonts();

ifdef TEST
oid displayframe(xl,yl,xh,yh)
nt xl,yl,xh,yh;

int row,col; char oldclr;
row = yl;
for (col= xl+1;col<xh;col++)
 {
  _settextposition(row,col);      /*horizontal line*/
  putchar(196);
  _settextposition(row+(yh-yl),col);
  putchar(196);
 } col =xl;
for (col= xl,row=yl+1;row<yh;row++)
 {
  _settextposition(row,col);      /*vertical line*/
  putchar(179);
  _settextposition(row,col+(xh-xl));
  putchar(179);
 }

_settextposition(yl,xl);
putchar(218);              /*left upper corner */
_settextposition(yl,xh);
putchar(191);              /*right upper corner */
_settextposition(yh,xl);
putchar(192);              /*left lower corner */
_settextposition(yh,xh);
putchar(217);              /*right lower corner */ id displaydframe(xl,yl,xh,yh)
it xl,yl,xh,yh;

int row,col; char oldclr;
row = yl;
for (col= xl+1;col<xh;col++)
 {
  _settextposition(row,col);      /*horizontal line*/
  putchar(205);
  _settextposition(row+(yh-yl),col);
  putchar(205);
 } ol =xl;
or (col= xl,row=yl+1;row<yh;row++)
 {
  _settextposition(row,col);      /*vertical line*/
  putchar(186);
  _settextposition(row,col+(xh-xl));
  putchar(186);
 } settextposition(yl,xl);
utchar(201);               /*left upper corner */
_settextposition(yl,xh);
utchar(187);               /*right upper corner */
_settextposition(yh,xl);
utchar(200);               /*left lower corner */
_settextposition(yh,xh);
utchar(188);               /*right lower corner */ ndif
```

GLIB.H

```
/*******************************************************************
 *                                                                  *
 * MODULE:  GLIB.H                                                  *
 *                                                                  *
 * TITLE:   X                                                       *
 *                                                                  *
 *         VV   VV EEEEEE RRRRRR IIIIII FFFFFFF OOOOO NNN   NN EEEEEE *
 *         VV   VV EE     RR  RR   II   FF       OO  OO NNNN  NN EE    *
 *         VV   VV EEEEEE RRRRRR   II   FFFFF    OO  OO NN NN NN EEEEE  *
 *          VV VV  EE     RR RR    II   FF       OO  OO NN  NNNN EE    *
 *           VVV   EEEEEE RR   RR IIIIII FF      OOOOO  NN   NNN EEEEEE *
 *                                                                  *
 *         COPYRIGHT  1990  VERIFONE, INC.                          *
 *                                                                  *
 *         This program is the property of VERIFONE, INC. and is copyright *
 *         protected.  The user is authorized solely to read the program *
 *         from its media into the memory of the computer and  execute the *
 *         program.  No additional rights with respect to this program are *
 *         granted. COPYING, REPRODUCTION, OR DISTRIBUTION of this program *
 *         is strictly PROHIBITED.                                  *
 *                                                                  *
 * PRODUCT: SYSGEM                                                  *
 *                                                                  *
 * VERSION: 1.00                                                    *
 *                                                                  *
 * AUTHOR:  SRINIVASAN RAO                                          *
 *                                                                  *
 * DATE:    5 DEC 1990                                              *
 *                                                                  *
 * PURPOSE: CONTAINS DECLARATIONS FOR GRAPHICS FUNCTIONS            *
 *                                                                  *
 * CHANGES: #   Date       Who        Why & What                    *
 *          --- ---------- ---------- -----------------------------  *
 *          #01                                                     *
 *                                                                  *
 *******************************************************************/
void PrintAt(int row, int column, char far * lpszString, short sColor);
void PrintChar(int row, int column, char cChar, short sColor);
void SprintAt( int iRow, int iCol, char * szFmt, ... );
void displayframe(int lrow, int lcol, int hrow, int hcol);
void displaydframe(int lrow, int lcol, int hrow, int hcol);
^Z
```

HELP.C

```
/*******************************************************************
 *                                                                  *
 * MODULE:  HELP.C                                                  *
 *                                                                  *
 * TITLE:   X                                                       *
 *                                                                  *
 *         VV   VV EEEEEE RRRRRR IIIIII FFFFFFF OOOOO NNN   NN EEEEEE *
 *         VV   VV EE     RR  RR   II   FF       OO  OO NNNN  NN EE    *
 *         VV   VV EEEEEE RRRRRR   II   FFFFF    OO  OO NN NN NN EEEEE  *
 *          VV VV  EE     RR RR    II   FF       OO  OO NN  NNNN EE    *
 *           VVV   EEEEEE RR   RR IIIIII FF      OOOOO  NN   NNN EEEEEE *
 *                                                                  *
 *         COPYRIGHT  1990  VERIFONE, INC.                          *
 *                                                                  *
 *         This program is the property of VERIFONE, INC. and is copyright *
 *         protected.  The user is authorized solely to read the program *
 *         from its media into the memory of the computer and  execute the *
 *         program.  No additional rights with respect to this program are *
 *         granted. COPYING, REPRODUCTION, OR DISTRIBUTION of this program *
 *         is strictly PROHIBITED.                                  *
 *                                                                  *
 * PRODUCT: SYSGEM                                                  *
 *                                                                  *
 * VERSION: 1.00                                                    *
 *                                                                  *
```

```
* AUTHOR:  RAJESH P. HALARNKAR
*
* DATE:    7-1-91
*
* PURPOSE: The main purpose of this file is to display the context sensitive
*          help upon the screen. Saving and restoring of the screen are also
*          accomplished by this routine.
* INPUT:   From the Global Helpbuf which indicates for which item help is
*          desired.
* OUTPUT:  None
*
* ENTRY:   X
*
* PROGRAM: X
* LOGIC
*
* RESTRICT:X
*
* FILES:   Help file
*
* EXIT:    X
*
* CHANGES: #   Date       Who         Why & What
*          --- ---------- ----------- ------------------------------------
*              #01
*
*********************************************************************/
#include <stdio.h>
#include <graph.h>
#include <string.h>
#include "win.h"
#include "menu.h"
#include "shell.h"
#include "proto.h"

char * getmess(void);
char fullbuf[1024];

help()
{
    char * ptr;
    char * message;
    struct rccoord curses;
    int color;
    long bkcolor;
    int r1, c1, r2, c2;
    int strow = 8;
    int stcol = 4;
    int enrow = 21;
    int encol = 63;
    char * ptr1;
    _gettextwindow(&r1, &c1, &r2, &c2);
    curses = _gettextposition();
    ptr = savscr();
    _wrapon(_GWRAPON);
    color = _settextcolor(2);
    bkcolor = _setbkcolor(41);
    displayframe(stcol - 1, strow - 1, encol + 1, enrow + 1);
    _settextposition(strow - 1, ((encol + stcol) - strlen ("H E L P"))/2);
    _outtext("H E L P");
    _settextwindow(strow, stcol, enrow, encol);
    _clearscreen(_GWINDOW);
    message = getmess();
    while(((ptr1 = strstr(message, "\n")) != (char *)NULL))
            *ptr1 = (char)0x20;
    _settextcolor(14);
    _outtext(message);
    getch();
    restore(ptr);
    _settextcolor(color);
    _setbkcolor(bkcolor);
    _settextposition(curses.row, curses.col);
    _settextwindow(r1, c1, r2, c2);
```

```
}
char * getmess()
{
    char buf[100];
    FILE *fp;
    char helperbuf[128];
    char * ptr;
    char * ptr1;

strcpy(helperbuf, "[");
    strcat(helperbuf,helpbuf);
    strcat(helperbuf, "]");

if ( (fp=fopen("sys.hlp","r")) == (char *)NULL ){
        Message("Unable to open Help File");
        return((char *)NULL);
    }
    while(fgets(fullbuf, 99, fp) != (char *)NULL){
        ptr = strstr(fullbuf,helperbuf);
        if(ptr != (char *)NULL){
            while(fgets(buf, 99,fp) != (char *)NULL){
                ptr1 = strstr(buf,("["));
                if(ptr1 != (char *)NULL){
                    *ptr1 = (char)NULL;
                    strcat(fullbuf, buf);
                                    fclose(fp);
                    return(fullbuf);
                }
                strcat(fullbuf, buf);
            }
        }
    }
    return("Sorry, no help is available for this item");
}
^z
```

MENU

```
/*****************************************************************************
*                                                                            *
* MODULE:   MENU.H                                                           *
*                                                                            *
* TITLE:    X                                                                *
*                                                                            *
*         VV    VV EEEEEEE RRRRRR  IIIIII FFFFFFF OOOOO  NNN   NN EEEEEEE    *
*         VV    VV EE      RR  RR    II   FF      OO  OO NNNN  NN EE        *
*         VV    VV EEEEEE  RRRRRR    II   FFFFFF  OO  OO NN NN NN EEEEE     *
*          VV  VV  EE      RR RR     II   FF      OO  OO NN  NNNN EE        *
*           VVV    EEEEEEE RR  RR  IIIIII FF       OOOOO  NN   NNN EEEEEEE   *
*                                                                            *
*         COPYRIGHT 1990 VERIFONE, INC.                                      *
*                                                                            *
*         This program is the property of VERIFONE, INC. and is copyright    *
*         protected.  The user is authorized solely to read the program     *
*         from its media into the memory of the computer and  execute the    *
*         program.  No additional rights with respect to this program are   *
*         granted. COPYING, REPRODUCTION, OR DISTRIBUTION of this program    *
*         is strictly PROHIBITED.                                            *
*                                                                            *
* PRODUCT: SYSGEM                                                            *
*                                                                            *
* VERSION: 1.00                                                              *
*                                                                            *
* AUTHOR:  SRINIVASAN RAO                                                    *
*                                                                            *
* DATE:    5 DEC 1990                                                        *
*                                                                            *
```

```
* PURPOSE: CONTAINS MENU AND OPTIONS DECLARATIONS                      *
*                                                                       *
* CHANGES:  #    Date       Who        Why & What                      *
*              ---------  ----------  ------------------------------   *
*          #01                                                          *
*                                                                       *
*************************************************************************/ define MENU 0
define OPTIONS 5

/* Main Menu */
#define EDIT 0
#define PROFILE 1
#define REPORTS 2
#define INSTALL 3
#define FILEMAINT 4
/*User data options */
#define LOAD 0
#define RUN 1
#define DOSPROG 2
#define SAVE 3
#define GROUP 4
/* Report Options */
#define BUILD 0
#define PRINT 1
#define VIEW 2
#define PARTS 3
/* Install Options */
#define PROGRAMS 0
/*File Maint Options */
#define BUILD_OST 0
#define KEYBOARD 1
^z
```

PROG.H

```
#define OST "OST"
#define KEYB "KEY"
#define KEYRPT "KEY"
#define KEYEXT ".KEY"
#define MNURPT "MENU"
#define MNUEXT ".MNU"
#define PRTSLST "PARTS"
#define PRTSEXT ".PTS"
#define PRTSPRG "COST"
```

^z

PROTO.H

```
char get_fact_type(char * buf, char * name, char * mode, char * valstr);
PCONCL parser(char * buf);
POPRND next(POPRND ptr);
/*unsigned char search_tree(char * str, FACTPTR ptr, int index);*/
/*char locate_fact(char *name) ;*/
PCONCL locate_conc(char *name) ;
unsigned char eval_and(int * ret);
unsigned char eval_or(int * ret);
/* void * malloc(int size); */
void add_oprnd(),prnt_conc(),prnt_facts(), prnt_rpts();
void get_str_facts(),get_bool_facts(),store_str_facts();
void get_num_facts(),store_num_facts(),store_bool_facts();
void get_atrb_facts(),get_mult_facts(),null_str();
void store_atrb_facts(),store_mult_facts(),restore(char *ptr);
char set_list(),*get_msg_name(),*get_msg(),*savscr(),*get_nxt_name();
int bind(void);
int coster(void);
unsigned long costing(unsigned long noitems, int * memory,
                                                                long *
unitcost);
float costing1000 ( unsigned long noitems);
float costing512 ( unsigned long noitems);
float costing256 ( unsigned long noitems);
```

```
float costing128 ( unsigned long noitems);
unsigned long cost( int count, unsigned long noitems, int * memory,
                                                                          long *
unitcost);
int eval_multiply(int * ret);
int eval_divide(int * ret);
int eval_positive(int * ret);
int eval_minus(int * ret);
unsigned char eval_gt(int * ret);
unsigned char eval_lt(int * ret);

^z
```

SH1.C

```
/***************************************************************************
*                                                                          *
* MODULE:   SH1.C                                                          *
*                                                                          *
* TITLE:    X                                                              *
*                                                                          *
*           VV    VV EEEEEE RRRRRR  IIIIII FFFFFFF  OOOOO  NNN   NN EEEEEE *
*           VV    VV EE     RR  RR    II   FF      OO   OO NNNN  NN EE     *
*           VV    VV EEEEE  RRRRRR    II   FFFFFF  OO   OO NN NN NN EEEEE  *
*            VV  VV  EE     RR RR     II   FF      OO   OO NN  NNNN EE     *
*             VVV    EEEEEE RR   RR IIIIII FF       OOOOO  NN   NNN EEEEEE *
*                                                                          *
*           COPYRIGHT  1990  VERIFONE, INC.                                *
*                                                                          *
*           This program is the property of VERIFONE, INC. and is copyright *
*           protected.  The user is authorized solely to read the program  *
*           from its media into the memory of the computer and  execute the *
*           program.  No additional rights with respect to this program are *
*           granted. COPYING, REPRODUCTION, OR DISTRIBUTION of this program *
*           is strictly PROHIBITED.                                        *
*                                                                          *
* PRODUCT:  SYSGEM                                                         *
*                                                                          *
* VERSION:  1.00                                                           *
*                                                                          *
* AUTHOR:   SRINIVASAN RAO                                                 *
*                                                                          *
* DATE:     6 NOV 1990                                                     *
*                                                                          *
* PURPOSE:  CONTAINS THE SHELL SUBROUTINES                                 *
*                                                                          *
* INPUT:    USER.FRL AND USER.FCT FILES                                    *
*                                                                          *
* OUTPUT:   USER.FRL AND USER.FCT FILES                                    *
*                                                                          *
* ENTRY:    X                                                              *
*                                                                          *
* PROGRAM:  X                                                              *
* LOGIC                                                                    *
*                                                                          *
* RESTRICT:X                                                               *
*                                                                          *
* FILES:    X                                                              *
*                                                                          *
* EXIT:     X                                                              *
*                                                                          *
* CHANGES:  #    Date       Who         Why & What                         *
*                ---   ----------   ----------   ------------------------------------
*                #01                                                       *
*                                                                          *
****************************************************************************/

For internal functions.
```

```
/*****************************************************************************
 * PURPOSE: X                                                                 *
 *                                                                            *
 * INPUT:   X                                                                 *
 *                                                                            *
 * OUTPUT:  X                                                                 *
 *                                                                            *
 * PROGRAM: X                                                                 *
 * LOGIC                                                                      *
 *****************************************************************************/ include <stdio.h>
include "shell.h"
#include "proto.h"

/*#define DEBUG 1*/

/* Global variables */

/*******************************************************/
/* Open FRL File                                       */
/*******************************************************/ getfrlfil()
{
 char filnam[20];
 filnam[0] = 0;
 selectfile("*.FRL",filnam);
 /*
 getstr("Enter Rule File name : ",10,filnam);
 if (open_frl_file(filnam))
   {
    sprintf(msgbuf,"Current FRL File is %s",frlfil); File_Msg('A',msgbuf);
    return(1);
   }*/
 if ((frlfp==0)&&(filnam[0]==0))
    { Message("No FRL File selected"); getfrlfil(); return(1);}
 if ( (frlfp!=0)&&(filnam[0]==0) ) return(0);
 if ( strcmp(filnam,frlfil)!=0 ) frlfp = 0; else return(0);
 strcpy(frlfil,filnam);
 if(frlfp==0)
   {
   frlfp = fopen (filnam, "r");
   if (frlfp == NULL)
   Message("Unable to open FRL File");
   sprintf(msgbuf,"Current FRL File is %s",frlfil); File_Msg('A',msgbuf);
   return(1);
   }
} getuserfil()
{
 char filnam[20];
 filnam[0] = 0;
 selectfile("*.FCT",filnam);
 /*
 getstr("Enter User File name : ",10,filnam);
 if (open_dat_file(filnam))
    {
     sprintf(msgbuf,"Current FCT File is %s",userfil); File_Msg('B',msgbuf);
     return(1);
    }*/
 if ((datfp==0)&&(filnam[0]==0))
    { Message("No FCT File selected"); return(0); }
 if ( (datfp!=0)&&(filnam[0]==0) ) return(0);
 if ( strcmp(filnam,userfil)!=0 ) datfp = 0; else return(0);
 strcpy(userfil,filnam);
 if (datfp==0)
```

```
  {
  datfp = fopen (filnam, "r+");
    if (datfp == NULL)
      {
      Message("Unable to open FCT File");
      }
    else
      {
      fgets(userfrl,20,datfp);
      null_str(userfrl);
      sprintf(msgbuf,"Current FCT File is %s",userfil); File_Msg('B',msgbuf);
      return(1);
      }
  }
} getnewfil()
{
 char filnam[20];
 filnam[0]=0;
 getstr("Enter New User File name : ",10,filnam);
 open_new_dat_file(filnam);
} check_dat_fil()
{
 if (strcmp(userfrl,frlfil)!=0 )
   { Message("Incompatible User and FRL Files"); return(0); }
 if (datfp==0) return(0); else return(1);
} check_frl_fil()
{
 if (frlfp==0) return(0); else return(1);
} open_frl_file(filnam)
char *filnam;
{
 char buf[20];
 strcpy(buf,filnam);
 strcat(buf,".FRL");
#ifdef DEBUG
 printf("In open FRL File %s %s\n",filnam,buf);
#endif
 frlfp = fopen (buf, "r");
   if (frlfp == NULL)
     messag (0);
   else
   {
    strcpy(frlfil,buf);
    return(1);
   }
} close_frl_file()
{
 fclose(frlfp);
}

/****************************************************************/
/* Data File operations                                         */
/****************************************************************/ open_dat_file(filnam)
char *filnam;
{
 char buf[20];
 strcpy(buf,filnam);
 strcat(buf,".FCT");
```

```
#ifdef DEBUG
 printf("In open DATA File %s %s\n",filnam,buf);
#endif
 datfp = fopen (buf, "r+");
   if (datfp == NULL)
      return (0);
   else
    {
     strcpy(userfil,buf);
     return(1);
    }
} open_new_dat_file(filnam)
char *filnam;
{
 char buf[20];
 strcpy(buf,filnam);
 strcat(buf,".FCT");
#ifdef DEBUG
 printf("In open DATA File %s %s\n",filnam,buf);
#endif
 datfp = fopen (buf, "w");
   if (datfp == NULL)
       return (0);
   else
      {
       strcpy(userfil,buf);
       return(1);
      }
}
close_dat_fil()
{
 fclose(datfp); datfp = 0;
} reset_dat_fil()
{
 datfp = 0;
 userfil[0] = 0;
}

/****************************************************/
/* Routines to decode FRL File                      */
/****************************************************/ char get_fact_type(dstr,nam,mode,buf)
char *dstr,*nam,*mode,*buf;
{
 int i; char type;
#ifdef DEBUG
 printf("in get fact =  %s\n",dstr);
#endif
 i = skip_blanks(dstr);  dstr+=i;
 type = *dstr; dstr++;
 if ( *dstr!=' ')
  {
   sprintf(msgbuf,"1Invalid Format \n");
   Message(msgbuf);
    return('U');
  }
 i = skip_blanks(dstr); dstr+=i;
 while( (*dstr!=' ')&&(*dstr!=0) ) *nam++ = *dstr++; *nam = 0;
 i = skip_blanks(dstr);  dstr+=i;
 *mode = *dstr;  dstr++;
 if (*dstr==0) return(type);
 if ( *dstr!=' ')
   {
#ifdef DEBUG
```

```
    printf("2Invalid Format \n");
#endif
   return('U');
  }
  i = skip_blanks(dstr); dstr+=i;
#ifdef DEBUG
 printf("%d\n",i);
#endif
 while ( (*dstr!=0) ) *buf++ = *dstr++; *buf = 0;
 return(type);
}

/****************************************************************
 *    Name     : SKIP_BLANKS
 *    Comments : This routine counts leading blanks in a string.
 ****************************************************************/
int skip_blanks(s)
char *s;
{
   int i;
   /*printf("%s",s);*/
   i=0;
   if (*s!=' ') return(i);
   while (*(s+i) == ' ') if (*(s+i++) == 0) break;
#ifdef DEBUG
   printf(" in skip blnks %d ",i);
#endif
   return(i);
}
/****************************************************************
 *    Name     : MESSAG
 *    Comments : This routine will display error messages relating to the
 *               parameter passing.
 ****************************************************************/
messag(mess_no)
int mess_no;
{
   switch (mess_no) {
      case 0 :
         sprintf (msgbuf,"Unable to open FRL file");
      Message(msgbuf);
      break;
      case 1 :
      printf ("Error in converting to a numeric value");
      break;
      case 2 :
      printf ("Attempt to read more parameters than passed");
      break;
      case 3 :
      printf ("Parameter type mismatch");
      break;
      case 4 :
      /*printf ("Attempt to return more than %d bytes of data",max_call);*/
      break;
      }
   /*printf("Press return to continue");getchar();
   exit(3);*/
}

/****************************************************************/
/*          Tree manipulation routines                          */
/****************************************************************/

/****************************************************************/
/* Name  insert string fact in to String Tree                  */
/* inputs:   root ---> root node of the String Tree            */
/*           new  ---> new string fact to be added             */
/****************************************************************/
```

```
insert_str(p,new)
PSTRFACT p,new;
{
 new->rptr = 0;
 new->lptr = 0;
 if (strncmp(new->name,p->name,NAM_LEN)<=0)
 {
   if (p->lptr==0)
   {
#ifdef DEBUG
       printf("Fact %s enterd\n",new->name);
#endif
       p->lptr = new; return(1);
   }
   else insert_str(p->lptr,new);
 }
 else
   {
   if (p->rptr==0)
   {
#ifdef DEBUG
       printf("Fact %s enterd\n",new->name);
#endif
       p->rptr = new; return(1);
   }
   else insert_str(p->rptr,new);
   }
}

/***************************************************************/
/* Name insert numeric fact in to Numeric Tree                 */
/* inputs:   root ---> root node of the Numeric Tree           */
/*           new  ---> new numeric fact to be added            */
/***************************************************************/ insert_num(p,new)
PNUMFACT p,new;
{
 new->rptr = 0;
 new->lptr = 0;
 if (strncmp(new->name,p->name,NAM_LEN)<=0)
 {
  if (p->lptr==0)
   {
#ifdef DEBUG
      printf("Fact %s enterd\n",new->name);
#endif
      p->lptr = new;
      return(1);
   }
   else insert_num(p->lptr,new);
 }
 else
   {
   if (p->rptr==0)
   {
#ifdef DEBUG
      printf("Fact %s enterd\n",new->name);
#endif
      p->rptr = new;
      return(1);
   }
   else insert_num(p->rptr,new);
   }
}
/***************************************************************/
/* Name insert bool fact in to Boolean Tree                    */
/* inputs:   root ---> root node of the Boolean Tree           */
/*           new  ---> new boolean fact to be added            */
/***************************************************************/
```

```
insert_bool(p,new)
PBOOLFACT p,new;
{
 new->rptr = 0;
 new->lptr = 0;
 if (strncmp(new->name,p->name,NAM_LEN)<=0)
  {
   if (p->lptr==0)
    {
#ifdef DEBUG
     printf("Fact %s enterd\n",new->name);
#endif
     p->lptr = new;
     return(1);
    }
   else insert_bool(p->lptr,new);
  }
 else
  {
   if (p->rptr==0)
    {
#ifdef DEBUG
     printf("Fact %s enterd\n",new->name);
#endif
     p->rptr = new;
     return(1);
    }
   else insert_bool(p->rptr,new);
  }
}

/*****************************************************************/
/* Name insert atrb fact in to Atrb  Tree                        */
/* inputs:   root ---> root node of the Atrb Tree                */
/*           new  ---> new atrb fact to be added                 */
/*****************************************************************/ insert_atrb(p,new)
PATRBFACT p,new;
{
 new->rptr = 0;
 new->lptr = 0;
 if (strncmp(new->name,p->name,NAM_LEN)<=0)
  {
   if (p->lptr==0)
    {
#ifdef DEBUG
     printf("Fact %s enterd\n",new->name);
#endif
     p->lptr = new;
     return(1);
    }
   else insert_atrb(p->lptr,new);
  }
 else
  {
   if (p->rptr==0)
    {
#ifdef DEBUG
     printf("Fact %s enterd\n",new->name);
#endif
     p->rptr = new;
     return(1);
    }
   else insert_atrb(p->rptr,new);
  }
}

/*****************************************************************/
/* Name insert mult fact in to Mult  Tree                        */
/* inputs:   root ---> root node of the Mult Tree                */
/*           new  ---> new mult fact to be added                 */
/*****************************************************************/
```

```c
insert_mult(p,new)
PMULTFACT p,new;
{
 new->rptr = 0;
 new->lptr = 0;
 if (strncmp(new->name,p->name,NAM_LEN)<=0)
  {
   if (p->lptr==0)
    {
#ifdef DEBUG
     printf("Fact %s enterd\n",new->name);
#endif
     p->lptr = new;
     return(1);
    }
   else insert_mult(p->lptr,new);
  }
 else
  {
   if (p->rptr==0)
    {
#ifdef DEBUG
     printf("Fact %s enterd\n",new->name);
#endif
     p->rptr = new;
     return(1);
    }
   else insert_mult(p->rptr,new);
  }
}

/******************************************************************/
/* Name null_str inserts a null to CRLF terminated string removing */
/*          CRLF                                                 */
/* inputs:   root ---> root node of the String Tree              */
/*           new  ---> new string fact to be added               */
/******************************************************************/ void null_str(buf)
char *buf;
{
 int i;
 while( (*buf++!=CR)&&(*buf!=LF)&&(*buf!=0) ) ;
 *buf = 0;
}

/******************************************************************/
/* Name  : goto_facts positions to Facts part of a File           */
/* inputs:  ftype File type FRL or DATA                           */
/* outputs: returns True if Facts part found                      */
/*                  False if not found                            */
/******************************************************************/ goto_facts(ftype)
char ftype;
{
 char buf[BUF_LEN]; FILE *fp;
 switch(ftype)
  {
   case FRL:  fp = frlfp; break;
   case DATA: fp = datfp; break;
   default:   sprintf(msgbuf,"goto facts??? Invalid file type\n");
              Message(msgbuf); break;
  }
 rewind(fp);
 while(!feof(fp))
  {
   fgets(buf,BUF_LEN,fp);
   if (*buf=='.')
```

```
   if( (strncmp(&buf[1],"FACTS",5)==0) ) return(1);
 }
 return(0);
}

/****************************************************************/
/*  Name    : goto_rules positions to Rules part of a File      */
/*  inputs:   ftype File type FRL or DATA                       */
/*  outputs:  returns True if Reports part found                */
/*                    False if not found                        */
/****************************************************************/ goto_rules(ftype)
char ftype;
{
 char buf[BUF_LEN]; FILE *fp;
 switch(ftype)
 {
  case FRL:  fp = frlfp; break;
  case DATA: fp = datfp; break;
  default:   sprintf(msgbuf,"goto rules??? Invalid file type\n");
             Message(msgbuf); break;
 }
 rewind(fp);

while(!feof(fp))
 {
  fgets(buf,BUF_LEN,fp);
  if (*buf=='.')
    if( (strncmp(&buf[1],"RULES",5)==0) ) return(1);
 }
 return(0);
}

/****************************************************************/
/*  Name    : goto_reports positions to Rules part of a File    */
/*  inputs:   ftype File type FRL or DATA                       */
/*  outputs:  returns True if Reports part found                */
/*                    False if not found                        */
/****************************************************************/ goto_reports(ftype)
char ftype;
{
 char buf[BUF_LEN]; FILE *fp;
 switch(ftype)
 {
  case FRL:  fp = frlfp; break;
  case DATA: fp = datfp; break;
  default:   sprintf(msgbuf,"goto reports??? Invalid file type\n");
             Message(msgbuf); break;
 }
 rewind(fp);
 while(!feof(fp))
 {
  fgets(buf,BUF_LEN,fp);
  if (*buf=='.')
    if( (strncmp(&buf[1],"REPORTS",5)==0) ) return(1);
 }
 return(0);
}

/****************************************************************/
/*  Name    : check_end checks for end of a Part and fills the buffer */
/*            with the next input string                        */
/*  inputs:   buf ---> pointer to buf in which to fill          */
/*            ftype ---> file type FRL or DATA                  */
/*  outputs:  returns True if END or EOF encountered            */
/****************************************************************/
```

```
check_end(buf,type)
char *buf,type;
{
 FILE *fp;
 switch(type)
   {
   case FRL:   fp = frlfp; break;
   case DATA:  fp = datfp; break;
   default:    sprintf(msgbuf,"check end??? Invalid file type\n");
            Message(msgbuf); break;
   }
  fgets(buf,BUF_LEN,fp);
  if (feof(fp)) return(1);
#ifdef DEBUG
   printf("In check_end  %s\nPress return to continue\n",buf);
   getchar();
#endif
   if (*buf=='.')
     {
     if( (strncmp(&buf[1],"END",3)==0) ) return(1);
     }
   else
     { null_str(buf); return(0); }

}

/*******************************************************************/
/*  Name : str_prnt  Prints the String tree                        */
/*  inputs:    p ---> root node of the String Tree                 */
/*  outputs:  prints string fact tree on display                   */
/*******************************************************************/ void str_prnt(p)
PSTRFACT p;
{
 if (p!=0)
    {
    str_prnt(p->lptr);
    sprintf(msgbuf,"NAME %s STATUS %c \n",p->name,p->status);
    Message(msgbuf);
    str_prnt(p->rptr);
    }
 }

/*******************************************************************/
/*  Name : num_prnt  Prints the Numeric tree                       */
/*  inputs:    p ---> root node of the Numeric Tree                */
/*  outputs:  prints num fact tree on display                      */
/*******************************************************************/ void num_prnt(p)
PNUMFACT p;
{
 if (p!=0)
    {
    num_prnt(p->lptr);
    sprintf(msgbuf,"NAME %s STATUS %c \n",p->name,p->status);
    Message(msgbuf);
    num_prnt(p->rptr);
    }
 }

/*******************************************************************/
/*  Name : bool_prnt  Prints the Boolean tree                      */
/*  inputs:    p ---> root node of the Boolean Tree                */
/*  outputs:  prints boolean fact tree on display                  */
/*******************************************************************/ void bool_prnt(p)
  PBOOLFACT p;
```

```
{
 if (p!=0)
   {
     bool_prnt(p->lptr);
     sprintf(msgbuf,"NAME %s STATUS %c \n",p->name,p->status);
     Message(msgbuf);
     bool_prnt(p->rptr);
   }
}

/**************************************************************/
/* Name : atrb_prnt  Prints the Attrb tree                    */
/* inputs:   p ---> root node of the Attrb Tree               */
/* outputs:  prints attrb fact tree on display                */
/**************************************************************/ void atrb_prnt(p)
PATRBFACT p;
{
 PLIST pl;
 if (p!=0)
   {
     atrb_prnt(p->lptr);
     sprintf(msgbuf,"NAME %s STATUS %c ",p->name,p->status);
     Message(msgbuf);
     pl = p->head;
     while(pl!=0)
        {
          sprintf(msgbuf," %s ",pl->lname);
          Message(msgbuf);pl= pl->next_nam;
        }
     /*printf("\n");*/
     atrb_prnt(p->rptr);
   }
}

/**************************************************************/
/* Name : mult_prnt  Prints the Multivalue tree               */
/* inputs:   p ---> root node of the Multivalue Tree          */
/* outputs:  prints multi fact tree on display                */
/**************************************************************/ mult_prnt(p)
PMULTFACT p;
{
 PLIST pl;
 if (p!=0)
   {
     mult_prnt(p->lptr);
     sprintf(msgbuf,"NAME %s STATUS %c ",p->name,p->status);
     Message(msgbuf);
     pl = p->head;
     while(pl!=0)
       {
         sprintf(msgbuf," %s ",pl->lname);
         Message(msgbuf); pl= pl->next_nam;
       }
     /*printf("\n");*/
     mult_prnt(p->rptr);
   }
}

/**************************************************************/
/* Name : check_list  assigns a valid list to the Multi fact  */
/* inputs:   type ----> Atrb or Multi                         */
/*           name ----> pointer to the name to be checked     */
/*           fcptr ---> pointer to the Multi fact             */
/* returns:  true if found in the list                        */
/**************************************************************/
```

```c
check_list(type,name,p)
char *name,type;
FACT p;
{
 PLIST p1; int val,found;
    switch(type)
      {
       case ATTRB: p1 = p.patrb->head; break;
       case MULTI: p1 = p.pmult->head; break;
          default:   return(-1); break;
      }
    found = val = 0;
    while(p1!=0)
      {
       if ( strncmp(name,p1->lname,NAM_LEN) == 0) {found = 1; break;}
       else p1= p1->next_nam;
       val++;
      }
    if (found)
      {
       switch(type)
         {
          case ATTRB: if (p.patrb->cur_val==val) return(1);
                  break;
          case MULTI: return(p1->val);
         }
      }
  return(0);
}

/****************************************************************/
/* Name : set_list_name   assigns a valid list to the Attrb fact */
/* inputs:   type ----> Atrb or Multi                            */
/*           name ----> pointer to the name to be assigned       */
/*           fcptr ---> pointer to the Attrb fact                */
/* returns: true if found in the list                            */
/****************************************************************/ set_list_name(type,name,p)
char *name,type;
FACT p;
{
 PLIST p1; char val;
    val = 0;
    switch(type)
    {
     case ATTRB:  p1 = p.patrb->head; break;
     case MULTI:  p1 = p.pmult->head; break;
     deafult:     {sprintf(msgbuf,"Invalid type \n");Message(msgbuf); return(-1); }
    }
    while(p1!=0)
      {
       if ( strncmp(name,p1->lname,NAM_LEN) == 0)
       {
        switch(type)
           {
            case ATTRB: p.patrb->cur_val = val; p.patrb->status = DEFINED;
                     break;
            case MULTI: p1->val = 1; p.pmult->status = DEFINED;
                     break;
            default:   break;
           }
        return(1);
       }
       else { p1= p1->next_nam; val++; }
      }
  return(-1);
}
```

```
/***************************************************************/
/* Name : unset_list_name  deassigns a valid list to the Attrb fact  */
/* inputs:   type ----> Atrb or Multi                            */
/*           name ----> pointer to the name to be assigned       */
/*           fcptr ---> pointer to the Attrb fact                */
/* returns:  true if found in the list                           */
/***************************************************************/ unset_list_name(type,name,p)
char *name,type;
FACT p;
{
 PLIST pl; char val;
    val = 0;
    switch(type)
    {
      case ATTRB:  pl = p.patrb->head; break;
      case MULTI:  pl = p.pmult->head; break;
      deafult:     {sprintf(msgbuf,"Invalid type \n");Message(msgbuf); return(-1);}
    }
    while(pl!=0)
    {
      if ( strncmp(name,pl->lname,NAM_LEN) == 0)
      {
        switch(type)
         {
           case ATTRB: /*p.patrb->cur_val = val;*/ p.patrb->status = DEFINED;
                       break;
           case MULTI: pl->val = 0; p.pmult->status = DEFINED;
                       break;
           default:    break;
         }
       return(1);
      }
      else { pl= pl->next_nam; val++; }
    }
  return(-1);
}

/***************************************************************/
/* Name : set_listp_name  assigns a valid list to the Attrb fact   */
/* inputs:   type ----> Atrb or Multi                            */
/*           name ----> pointer to the name to be assigned       */
/*           fcptr ---> pointer to the Attrb fact                */
/* returns:  true if found in the list                           */
/***************************************************************/ set_listp_name(type,name,p)
char *name;
FACT p;
{
 PLIST pl; char val;
    val = 0;
    switch(type)
    {
      case ATTRB:  pl = p.patrb->head; break;
      case MULTI:  pl = p.pmult->head; break;
      deafult:     {sprintf(msgbuf,"Invalid type \n");Message(msgbuf); return(-1);}
    }
    while(pl!=0)
    {
      if ( strncmp(name,pl->lname,NAM_LEN) == 0)
      {
        switch(type)
         {
           case ATTRB: p.patrb->cur_val = val; p.patrb->status = DEFINED;
                       break;
           case MULTI: pl->val = 1; p.pmult->status = DEFINED;
                       break;
```

```
        default:    break;
        }
      return(1);
      }
      else { p1= p1->next_nam; val++; }
    }
  return(-1);
 }

/************************************************************************/
/*  Name : get_cust_data gets customer data and stores in the           */
/*       corresponding tree                                             */
/*  inputs:                                                             */
/*  outputs:  prints boolean fact tree on display                       */
/************************************************************************/

/*void get_cust_data()
{
 fflush(stdin);
 if(root_str!=0)
   {get_str_facts(root_str); fflush(stdin); }
 if(root_num!=0)
   {get_num_facts(root_num); fflush(stdin); }
 if(root_bool!=0)
   {get_bool_facts(root_bool); fflush(stdin); }
 if(root_atrb!=0)
   {get_atrb_facts(root_atrb); fflush(stdin); }
 if(root_mult!=0)
   {get_mult_facts(root_mult); fflush(stdin); }
}
*/ void get_cust_data()
{
 int i;
 fflush(stdin);
 for (i=0;i<grp_cnt;i++)
   {
    if(root_str!=0)
      {get_str_facts(root_str,grp_name[i]); fflush(stdin); }
    if(root_num!=0)
      {get_num_facts(root_num,grp_name[i]); fflush(stdin); }
    if(root_bool!=0)
      {get_bool_facts(root_bool,grp_name[i]); fflush(stdin); }
    if(root_atrb!=0)
      {get_atrb_facts(root_atrb,grp_name[i]); fflush(stdin); }
    if(root_mult!=0)
      {get_mult_facts(root_mult,grp_name[i]); fflush(stdin); }
   }
} void get_str_facts(p,gname)
PSTRFACT p; char *gname;
{
 char *msg;
 if (p!=0)
    {
     get_str_facts(p->lptr,gname);
#ifdef TEST
     printf(" Enter the value for %s [string] : ",p->name);
     scanf("%s",p->str_val);
      p->status = DEFINED;
#else
     if( (p->mode==QUERY)&&(strcmp(gname,p->gname)==0) )
       {
        if (*p->mname==0)
           sprintf(msgbuf," Enter the value for %s [string] : ",p->name);
```

```c
          else
            {
             msg = get_msg(p->mname);
             sprintf(msgbuf," %s %s ",msg,p->name);
            }
          strcpy(helpbuf,p->name);
          getstr(msgbuf,32,p->str_val);
          p->status = DEFINED;
         }
endif
      get_str_facts(p->rptr,gname);
     }
  } void get_num_facts(p,gname)
PNUMFACT p; char *gname;
{
 char *msg;
 if (p!=0)
     {
      get_num_facts(p->lptr,gname);
#ifdef TEST
      printf(" Enter the value for %s [numeric] : ",p->name);
      scanf("%lu",&p->num_val);
      p->status = DEFINED;
#else
      if( (p->mode==QUERY)&&(strcmp(gname,p->gname)==0) )
        {
         if (*p->mname==0)
           sprintf(msgbuf," Enter the value for %s [numeric] : ",p->name);
         else
           {
            msg = get_msg(p->mname);
            sprintf(msgbuf," %s %s ",msg,p->name);
           }
         strcpy(helpbuf,p->name);
         getint(msgbuf,4,&p->num_val);
         p->status = DEFINED;
        }
endif
      get_num_facts(p->rptr,gname);
     }
  } void get_bool_facts(p,gname)
PBOOLFACT p; char *gname;
{
 char *msg;
 if (p!=0)
     {
      get_bool_facts(p->lptr,gname);
#ifdef TEST
      printf(" Enter the value for %s [Y/N] : ",p->name);
      fflush(stdin);
      scanf("%c",&p->bool_val);
      p->status = DEFINED;
#else
      if( (p->mode==QUERY)&&(strcmp(gname,p->gname)==0) )
{
 if (*p->mname==0)
   sprintf(msgbuf," Enter the value for %s [Y/N] : ",p->name);
 else
   {
    msg = get_msg(p->mname);
    sprintf(msgbuf," %s %s ",msg,p->name);
   }
 strcpy(helpbuf,p->name);
 getcon(msgbuf,1,&p->bool_val);
 p->status = DEFINED;
}
```

```
#endif
    get_bool_facts(p->rptr,gname);
   }
 } void get_atrb_facts(p,gname)
PATRBFACT p; char *gname;
{
 int cnt,val; PLIST pl; char *msg;
 if (p!=0)
   {
    get_atrb_facts(p->lptr,gname);
    if( (p->mode==QUERY)&&(strcmp(gname,p->gname)==0) )
     {
      cnt = 0;
      pl = p->head;
      if (*p->mname==0)
         sprintf(msgbuf," For %s select an item from list : ",p->name);
      else
        {
         msg = get_msg(p->mname);
         sprintf(msgbuf," %s %s ",msg,p->name);
        }
      while(pl!=0)
          {
           mlist[cnt++] = pl->lname;
           pl= pl->next_nam;
          }
      p->status = DEFINED;
      strcpy(helpbuf,p->name);
      val = getlist(msgbuf,cnt,mlist,p->cur_val);
      if (val != -1) p->cur_val = (char) val;
     }
    get_atrb_facts(p->rptr,gname);
   }
 } void get_mult_facts(p,gname)
PMULTFACT p; char *gname;
{
 int cnt,i,val; PLIST pl; char *msg;
 if (p!=0)
   {
    get_mult_facts(p->lptr,gname);
    if( (p->mode==QUERY)&&(strcmp(gname,p->gname)==0) )
     {
      cnt = 0;
      pl = p->head;
      if (*p->mname==0)
        sprintf(msgbuf,"For %s select items from list : ",p->name);
      else
       {
        msg = get_msg(p->mname);
        sprintf(msgbuf," %s %s ",msg,p->name);
       }
      while(pl!=0)
          {
           mlist[cnt] = pl->lname;
           ilist[cnt++] = pl->val;
           pl= pl->next_nam;
          }
      p->status = DEFINED;
      val = getmlist(msgbuf,cnt,mlist,ilist);
      if (val != -1)
       {
        pl = p->head; i = 0;
        while(pl!=0)
            {
```

```
            if (ilist[i++]) p1->val=1; else p1->val=0;
            p1= p1->next_nam;
          }
        }
      }
      strcpy(helpbuf,p->name);
      get_mult_facts(p->rptr,gname);
    }
  }
```

```
/******************************************************************/
/* Name : store_cust_data gets customer data and stores in the    */
/*       corresponding file                                        */
/* inputs:                                                         */
/* outputs:  prints boolean fact tree on display                   */
/******************************************************************/ void store_cust_data()
{
 rewind(datfp);
 fprintf(datfp,"%s\n",frlfil);
 fprintf(datfp,".FACTS\n");
 if(root_str!=0)
 store_str_facts(root_str);
 if(root_num!=0)
 store_num_facts(root_num);
 if(root_bool!=0)
 store_bool_facts(root_bool);
 if(root_atrb!=0)
 store_atrb_facts(root_atrb);
 if(root_mult!=0)
 store_mult_facts(root_mult);
 fprintf(datfp,".END\n");
} void store_str_facts(p)
PSTRFACT p;
{
 if (p!=0)
    {
      store_str_facts(p->lptr);
      fprintf(datfp,"%c %s %s\n",p->type,p->name,p->str_val);
      store_str_facts(p->rptr);
    }
} void store_num_facts(p)
PNUMFACT p;
{
 if (p!=0)
    {
      store_num_facts(p->lptr);
      fprintf(datfp,"%c %s %d\n",p->type,p->name,p->num_val);
      store_num_facts(p->rptr);
    }
} void store_bool_facts(p)
PBOOLFACT p;
{
 if (p!=0)
    {
      store_bool_facts(p->lptr);
      fprintf(datfp,"%c %s %c\n",p->type,p->name,p->bool_val);
      store_bool_facts(p->rptr);
    }
} void store_atrb_facts(p)
```

```c
PATRBFACT p;
{
 PLIST pl; int found,i;
 if (p!=0)
    {
      store_atrb_facts(p->lptr);
      fprintf(datfp,"%c %s ",p->type,p->name);
      pl = p->head; found = 0; i=0;
      while(pl!=0)
        {
          if (p->cur_val==i++) { found = 1; break; }
          pl = pl->next_nam;
        }
      if (found) fprintf(datfp," %s ",pl->lname);
      Fprintf(datfp,"\n");
      store_atrb_facts(p->rptr);
    }
} void store_mult_facts(p)
PMULTFACT p;
{
 PLIST pl;
 if (p!=0)
    {
      store_mult_facts(p->lptr);
      fprintf(datfp,"%c %s ",p->type,p->name);
      pl = p->head;
      while(pl!=0)
        {
          if (pl->val) fprintf(datfp," %s ",pl->lname);
          pl = pl->next_nam;
        }
      fprintf(datfp,"\n");
      store_mult_facts(p->rptr);
    }
}

/****************************************************/
/* Routines to decode User data File                */
/****************************************************/

PSTRFACT locate_str(name,p)
PSTRFACT p;
char *name;
{
 if (p==0) return( (PSTRFACT) 0);
 if ( strncmp(name,p->name,NAM_LEN) == 0) return(p);
 if ( strncmp(name,p->name,NAM_LEN) < 0) locate_str(name,p->lptr);
 else locate_str(name,p->rptr);
}

PNUMFACT locate_num(name,p)
PNUMFACT p;
char *name;
{
 if (p==0) return( (PNUMFACT) 0);
 if ( strncmp(name,p->name,NAM_LEN) == 0) return(p);
 if ( strncmp(name,p->name,NAM_LEN) < 0) locate_num(name,p->lptr);
 else locate_num(name,p->rptr);
}

PBOOLFACT locate_bool(name,p)
PBOOLFACT p;
char *name;
{
 if (p==0) return( (PBOOLFACT) 0);
 if ( strncmp(name,p->name,NAM_LEN) == 0) return(p);
 if ( strncmp(name,p->name,NAM_LEN) < 0) locate_bool(name,p->lptr);
 else locate_bool(name,p->rptr);
}
```

```c
PATRBFACT locate_atrb(name,p)
PATRBFACT p;
char *name;
{
 if (p==0) return( (PATRBFACT) 0);
 if ( strncmp(name,p->name,NAM_LEN) == 0) return(p);
 if ( strncmp(name,p->name,NAM_LEN) < 0) locate_atrb(name,p->lptr);
 else locate_atrb(name,p->rptr);
}

PMULTFACT locate_mult(name,p)
PMULTFACT p;
char *name;
{
 if (p==0) return( (PMULTFACT) 0);
 if ( strncmp(name,p->name,NAM_LEN) == 0) return(p);
 if ( strncmp(name,p->name,NAM_LEN) < 0) locate_mult(name,p->lptr);
 else locate_mult(name,p->rptr);
}

/****************************************************************/
/* Name : load_cust_facts gets customer data and stores in the  */
/*        corresponding tree                                    */
/* inputs: none                                                 */
/* outputs:  prints boolean fact tree on display                */
/****************************************************************/ load_cust_facts()
{
 char get_user_data();
 char buf[BUF_LEN],name[NAM_LEN],valstr[BUF_LEN],type; FACT p;
 if (datfp==0) { sprintf(msgbuf,"No data file opened");Message(msgbuf);return(-1);
 if (!goto_facts(DATA)) {sprintf(msgbuf,"Fact part not present in Data File");
Message(msgbuf);return(-1); }
  while(!check_end(buf,DATA))
    {
     type = get_user_data(buf,name,valstr);
     switch (type)
       {
        case STRING: p1$ = locate_str(name,root_str);
           if (p1$==0) { sprintf(msgbuf,"Fact %s not found",name);Message(msgbuf); }
                else {
            /*sscanf(valstr,"%s",p1$->str_val);*/
                    strcpy(p1$->str_val,valstr);
               p1$->status = DEFINED;
                }
          break;
case NUMERIC: p2$ = locate_num(name,root_num);
       if (p2$==0) { sprintf(msgbuf,"Fact %s not found",name);Message(msgbuf); }
                else {
            sscanf(valstr,"%lu",&p2$->num_val);
               p2$->status = DEFINED;
                }
          break;
case BOOLEAN: p3$ = locate_bool(name,root_bool);
       if (p3$==0) { sprintf(msgbuf,"Fact %s not found",name);Message(msgbuf); }
                else {
                   if(p3$->mode!=EQUALS)
                   {
            sscanf(valstr,"%c",&p3$->bool_val);
               p3$->status = DEFINED;
                   }
                }
          break;
case ATTRB : p4$ = locate_atrb(name,root_atrb); p.patrb = p4$;
       if (p4$==0) { sprintf(msgbuf,"Fact %s not found",name);Message(msgbuf); }
                else
                   {
              set_list(ATTRB,p,valstr);
              p4$->status = DEFINED;
                   }
```

```
                break;
case MULTI:    p5$ = locate_mult(name,root_mult); p.pmult = p5$;
     if (p5$==0) { sprintf(msgbuf,"Fact %s not found",name);Message(msgbuf); }
            else
            {
       set_list(MULTI,p,valstr);
       p5$->status = DEFINED;
            }
                break;
    default:    sprintf(msgbuf,"Invalid Fact type in User File\n");
                Message(msgbuf);
            break;
   } /* end of switch type */
  }/* end of while check_end */
  sprintf(msgbuf,"Cust facts loaded!!!!\n"); Message(msgbuf);
} char get_user_data(dstr,nam,buf)
char *dstr,*nam,*buf;
{
 int i; char type;
#ifdef DEBUG
 printf("in get fact =  %s\n",dstr);
#endif
 i = skip_blanks(dstr);  dstr+=i;
 type = *dstr; dstr++;
 if ( *dstr!=' ')
 {
  sprintf(msgbuf,"1Invalid Format \n"); Message(msgbuf);
  return('U');
 }
 i = skip_blanks(dstr); dstr+=i;
 while( (*dstr!=' ') ) *nam++ = *dstr++; *nam = 0;
 if ( *dstr!=' ')
 {
#ifdef DEBUG
    printf("2Invalid Format \n");
#endif
    return('U');
 }
 i = skip_blanks(dstr); dstr+=i;
#ifdef DEBUG
printf("%d\n",i);
#endif
 while (*dstr!=0) *buf++ = *dstr++; *buf = 0;
 return(type);
}
unsigned char locate_fact(name)
char *name; /*FACTPTR fctptr;*/
{
/*return(-1);*/
if ( (p1$=locate_str(name,root_str))!= 0)
 return(p1$->type);
if ( (p2$=locate_num(name,root_num))!= 0)
 return(p2$->type);
if ( (p3$=locate_bool(name,root_bool))!= 0)
 return(p3$->type);
if ( (p4$=locate_atrb(name,root_atrb))!= 0)
 return(p4$->type);
if ( (p5$=locate_mult(name,root_mult))!= 0)
 return(p5$->type);
return(-1);
}

/*******************************************************************/
/* Name : put_list gets a list from inout str and stores in the    */
/*        fact data as a linked list                               */
/*  inputs:   Type ATTRB or MULTI                                  */
/*            pointer to ATTRB or MULTI Fact                       */
/*            input str                                            */
/*  outputs:  Returns the no of elements in the list               */
/*******************************************************************/
```

```
char put_list(type,p,buf)
char type,*buf;
FACT p;
{
 int i,j; char cnt,name[NAM_LEN];
 PLIST pl;
#ifdef DEBUG
 printf(" get_list *** %c %s \n",type,buf); getchar();
#endif
 switch(type)
   {
    case ATTRB:  p.patrb->head = p.patrb->tail = 0;
          break;
    case MULTI:  p.pmult->head = p.pmult->tail = 0;
          break;
    default:    sprintf(msgbuf,"put list *** Invalid type");
           Message(msgbuf); return(0);
          break;
   }
 while(1)
  {
   i = skip_blanks(buf);
   buf+=i;
   if (*buf==0) break;
   j = 0;
   while (*buf!=' ')
     {
      name[j++] = *buf++;
      if (*buf==0) break;
     }
   name[j]=0;
   if (j!=0)
     {
#ifdef DEBUG
      printf("get list ***   %s ",name);getchar();
#endif
      pl = (PLIST) malloc(LISTSIZE);
      if (pl==0) {sprintf(msgbuf,"Insufficient memory\n");Message(msgbuf);return(-1)}
      strcpy(pl->lname,name); pl->val = 0;
      if(add_list(type,p,pl)) cnt++;
     }
  }
  return(cnt);
}

/*******************************************************************/
/* Name : set_list gets a list from inout str and stores in the    */
/*        fact data as a linked list                               */
/* inputs:   Type ATTRB or MULTI                                   */
/*           pointer to ATTRB or MULTI Fact                        */
/*           input str                                             */
/* outputs:  Returns the no of elements in the list                */
/*******************************************************************/ char set_list(type,p,buf)
char type,*buf;
FACT p;
{
 int i,j; char cnt,name[NAM_LEN];
 PLIST pl;
#ifdef DEBUG
 printf(" get_list *** %c %s \n",type,buf); getchar();
#endif
 switch(type)
   {
    case ATTRB: pl = p.patrb->head; break;
    case MULTI: pl = p.pmult->head; break;
    default:    return(-1);
   }
 while(1)
  {
```

```
    i = skip_blanks(buf);
    buf+=i;
    if (*buf==0) break;
    j = 0;
    while (*buf!=' ')
     {
      name[j++] = *buf++;
      if (*buf==0) break;
     }
    name[j]=0;
    if (j!=0)
     {
#ifdef DEBUG
      printf("get list ***   %s ",name);getchar();
#endif
      set_list_name(type,name,p);

}
   }
 } add_list(type,p1,p2)
char type;
FACT p1;
PLIST p2;
{
 p2->next_nam = 0;
 switch(type)
    {
     case ATTRB: if (p1.patrb->head==0) p1.patrb->head = p2;
          else
             {
              if (p1.patrb->tail==0)
                 {
                  p1.patrb->tail = p2;
                  p1.patrb->head->next_nam = p2;
                 }
                else
                 {
                  p1.patrb->tail->next_nam = p2;
                  p1.patrb->tail = p2;
                 }
             }
          break;
     case MULTI: if (p1.pmult->head==0) p1.pmult->head = p2;
          else
             {
              if (p1.pmult->tail==0)
                 {
                  p1.pmult->tail = p2;
                  p1.pmult->head->next_nam = p2;
                 }
                else
                 {
                  p1.pmult->tail->next_nam = p2;
                  p1.pmult->tail = p2;
                 }
             }
          break;
     default:   sprintf(msgbuf,"add list --- Invalid fact type \n");
                Message(msgbuf);
          return(0);
          break;
    }
 return(1);
} add_item(p1)
PMLIST p1;
{
```

```
  p1->next_nam = 0;
  if (msg_head==0) msg_head = p1;
   else
     {
     if (msg_tail==0)
        {
        msg_tail = p1;
        msg_head->next_nam = p1;
        }
     else
        {
        msg_tail->next_nam = p1;
        msg_tail = p1;
        }
     }
   return(1);
} char *get_msg(char *name)
{
 PMLIST p;
 p = msg_head;
 while(p!=0) { if (strcmp(name,p->name)==0) break; p = p->next_nam; }
 if (p!=0) return(p->messg); else return(0);
}
```

SH2.C

```
/************************************************************************
*                                                                       *
* MODULE:   SH2.C                                                       *
*                                                                       *
* TITLE:    X                                                           *
*                                                                       *
*           VV    VV EEEEEE RRRRRR  IIIIII FFFFFFF  OOOOO  NNN   NN EEEEEEE  *
*           VV    VV EE     RR  RR    II   FF       OO  OO NNNN  NN EE       *
*           VV    VV EEEEE  RRRRRR    II   FFFFF    OO  OO NN NN NN EEEEE    *
*            VV VV   EE     RR RR     II   FF       OO  OO NN  NNNN EE       *
*             VVV    EEEEEE RR   RR IIIIII FF        OOOOO NN   NNN EEEEEEE  *
*                                                                       *
*           COPYRIGHT  1990  VERIFONE, INC.                             *
*                                                                       *
*           This program is the property of VERIFONE, INC. and is copyright *
*           protected.  The user is authorized solely to read the program   *
*           from its media into the memory of the computer and  execute the *
*           program.  No additional rights with respect to this program are *
*           granted. COPYING, REPRODUCTION, OR DISTRIBUTION of this program *
*           is strictly PROHIBITED.                                     *
*                                                                       *
* PRODUCT: SYSGEM                                                       *
*                                                                       *
* VERSION: 1.00                                                         *
*                                                                       *
* AUTHOR:  SRINIVASAN RAO                                               *
*                                                                       *
* DATE:    6 NOV 1990                                                   *
*                                                                       *
* PURPOSE: CONTAINS MAJOR FUNCTIONS LIKE CREATING FACT AND RULE TREES   *
*          GENERATING REPORTS , LOADING AND STORING FACTS AND CONCLUSIONS *
* INPUT:   USER.FRL AND USER.FCT FILES                                  *
*                                                                       *
* OUTPUT:  USER.FRL AND USER.FCT FILE                                   *
*                                                                       *
* ENTRY:   X                                                            *
*                                                                       *
```

```
 * PROGRAM: X                                                              *
 * LOGIC                                                                   *
 *                                                                         *
 * RESTRICT:X                                                              *
 *                                                                         *
 * FILES:   X                                                              *
 *                                                                         *
 * EXIT:    X                                                              *
 *                                                                         *
 * CHANGES: #   Date        Who         Why & What                         *
 *              ---  ----------  ----------  -------------------------------
 *              #01
 *                                                                         *
 ***************************************************************************/ include <stdio.h>
include "shell.h"
#include "proto.h"
#define WIN2 2

/*extern char *mnu[128];*/

/* convert a pointer to its segment and offset */ void segoff(val,seg,off)
int *val,*seg,*off;
{
    *seg = *(val + 1);
    *off = *val;
    /*if( debug )
        printf( "\r\nVal=%lx, *off=%x==*Val=%x, *seg=%x==*(val+1)=%x\r\n",
             val, *off, *val, *seg, *(val+1) );*/
}

/* given a segment and offset, make a pointer */
void makptr(seg,off,adrptr)
int seg, off;
int *adrptr;
{
    *(adrptr+1) = seg;
    *adrptr     = off;
}

/*************************************************************************/
/*  Name : create_fact_tree creates the fact trees from FRL file         */
/*         corresponding tree                                            */
/*  inputs: none                                                         */
/*  outputs:  prints boolean fact tree on display                        */
/*************************************************************************/ create_fact_tree()
{
 char buf[BUF_LEN];
 char mode,type,valstr[BUF_LEN],name[NAM_LEN],*pvalstr;
 FACT p; PLIST p1; PMLIST p2;
 int i;
 root_str = 0;
 root_num = 0;
 root_bool = 0;
 root_atrb = 0;
 if(frlfp==0) {sprintf(msgbuf,"No RULE File opened");Message(msgbuf);return(-1);}
 if (!goto_facts(FRL)) { sprintf(msgbuf,"Fact info not present in Rule File");
Message(msgbuf);exit(3); }
 while(!check_end(buf,FRL))
  {
    valstr[0] = 0;
#ifdef DEBUG
    printf("after check %s \n",buf);
```

```
#endif
    type = get_fact_type(buf,name,&mode,valstr);
#ifdef DEBUG
    printf("type = %c name = %s  mode = %c val = %s\n",type,name,mode,valstr);
    getchar();
#endif
    switch (type)
       {
        case STRING: p1$ = (PSTRFACT) malloc(STRSIZE);
                if (p1$==0) {sprintf(msgbuf,"Insufficient memory");
Message(msgbuf);break;}
                p1$->status = UNKNOWN;
                p1$->type = type;
                p1$->mode = mode;
                    if(mode==EQUALS)
                       {
                p1$->status = DEFINED;
                       assgn_str(valstr,&p1$->str_val);
                       }
                       else p1$->str_val[0] = 0;
                strcpy(p1$->name,name);
                       pvalstr = get_msg_name(valstr,name); /* message name */
                       if (*name!=0) strcpy(p1$->mname,name);
                       else p1$->mname[0]=0;
                       pvalstr = get_msg_name(pvalstr,name); /* group name */
                       if (*name!=0) strcpy(p1$->gname,name);
                       else p1$->gname[0]=0;
                if (root_str==0)
                    {
                 root_str = p1$;
                 root_str->lptr = root_str->rptr = 0;
                    }
                    else insert_str(root_str,p1$);
                    break;
         case NUMERIC: p2$ = (PNUMFACT) malloc(NUMSIZE);
                if (p2$==0) {sprintf(msgbuf,"Insufficient memory");
Message(msgbuf);break;}
                p2$->status = UNKNOWN;
                p2$->type = type;
                p2$->mode = mode;
                    if(mode==EQUALS)
                       {
                p2$->status = DEFINED;
                       assgn_num(valstr,&p2$->num_val);
                       }
                       else p2$->num_val = -1;
                strcpy(p2$->name,name);
                       pvalstr = get_msg_name(valstr,name); /* message name */
                       if (*name!=0) strcpy(p2$->mname,name);
                       else p2$->mname[0] = 0;
                       pvalstr = get_msg_name(pvalstr,name); /* group name */
                       if (*name!=0) strcpy(p2$->gname,name);
                       else p2$->gname[0] = 0;
                if (root_num==0)
                    {
                 root_num = p2$;
                 root_num->lptr = root_num->rptr = 0;
                    }
                    else insert_num(root_num,p2$);
                    break;
         case BOOLEAN: p3$ = (PBOOLFACT) malloc(BOOLSIZE);
                if (p3$==0{sprintf(msgbuf,"Insufficient memory");Message(msgbuf);
break;}
                p3$->status = UNKNOWN;
                p3$->type = type;
                p3$->mode = mode;
                    if(mode==EQUALS)
                       {
                p3$->status = DEFINED;
                       assgn_bool(valstr,&p3$->bool_val);
                       }
                       else p3$->bool_val = UNKNOWN;
```

```
                    strcpy(p3$->name,name);
                        pvalstr = get_msg_name(valstr,name); /* message name */
                        if (*name!=0) strcpy(p3$->mname,name);
                    else p3$->mname[0] = 0;
                        pvalstr = get_msg_name(pvalstr,name); /* group name */
                        if (*name!=0) strcpy(p3$->gname,name);
                    else p3$->gname[0] = 0;
                    if (root_bool==0)
                {
                 root_bool = p3$;
                 root_bool->lptr = root_bool->rptr = 0;
                }
                    else insert_bool(root_bool,p3$);
                    break;
        case ATTRB:   p4$ = (PATRBFACT) malloc(ATRBSIZE);
                if (p4$==0) {sprintf(msgbuf,"Insufficient memory");
Message(msgbuf);break;}
                    p4$->status = UNKNOWN;
                    p4$->type = type;
                    p4$->mode = mode;
                        p4$->cur_val = -1;
                    strcpy(p4$->name,name);
                        pvalstr = get_msg_name(valstr,name); /* message name */
                        if (*name!=0) strcpy(p4$->mname,name);
                    else p4$->mname[0] = 0;
                        pvalstr = get_msg_name(pvalstr,name); /* group name */
                        if (*name!=0) strcpy(p4$->gname,name);
                    else p4$->gname[0] = 0;
                    p.patrb = p4$;
                    p4$->lcount = put_list(ATTRB,p,pvalstr);
                    if (root_atrb==0)
                {
                 root_atrb = p4$;
                 root_atrb->lptr = root_atrb->rptr = 0;
                }
                    else insert_atrb(root_atrb,p4$);
                    break;
        case MULTI:   p5$ = (PMULTFACT) malloc(MULTSIZE);
                if (p5$==0) {sprintf(msgbuf,"Insufficient memory");Message(msgbuf);
break;}
                    p5$->status = UNKNOWN;
                    p5$->type = type;
                    p5$->mode = mode;
                    strcpy(p5$->name,name);
                        pvalstr = get_msg_name(valstr,name); /* message name */
                        if (*name!=0) strcpy(p5$->mname,name);
                        else p5$->mname[0] = 0;
                        pvalstr = get_msg_name(pvalstr,name); /* group name */
                        if (*name!=0) strcpy(p5$->gname,name);
                        else p5$->gname[0] = 0;
                    p.pmult = p5$;
                    p5$->lcount = put_list(MULTI,p,pvalstr);
                    p1 = p5$->head;
                    while(p1!=0)
                {
                    p1->val=0;
                       p1= p1->next_nam;
                       }
                    if (root_mult==0)
                {
                 root_mult = p5$;
                 root_mult->lptr = root_mult->rptr = 0;
                }
                    else insert_mult(root_mult,p5$);
                    break;
        case MESSAGE: p2 = (PMLIST) malloc(MLISTSIZE);
                    if (p2==0) {sprintf(msgbuf,"Insufficient memory");Message(msgbuf);
                    break;}
                        p2->val = mode;
                        strcpy(p2->name,name);
                        strcpy(p2->messg,valstr);
                        add_item(p2);
                        break;
```

```
            case GROUPS:  i = 0; pvalstr = valstr;
                          while ( (pvalstr = get_nxt_name(pvalstr,name))!=0 )
                             {
                               grp_name[i] = (char *) malloc(strlen(name)+1);
                               strcpy(grp_name[i],name);
                               i++;
                               if (i==MAX_GRPS)
                                  {
                                    Message("No of Groups exceeded Max Groups");
                                    break;
                                  }
                               grp_cnt = i;
                             }
                          break;
     default:             sprintf(msgbuf,"Invalid type in FRL file");
                          Message(msgbuf);
                   break;
      }
  }
  sprintf(msgbuf,"Fact tree generated"); Message(msgbuf);
  /*prnt_facts();*/

}

/*******************************************************************/
/* Name : create_rule_tree creates the fact trees from FRL file    */
/*        corresponding tree                                       */
/* inputs: none                                                    */
/* outputs:  prints rule tree on display                           */
/*******************************************************************/ ifdef RULES create_rule_tree()
{
 int i,cnt;
 POPRND p11,p12;
 PCONCL p,pc1;
 char buf[BUF_LEN],name[NAM_LEN],valstr[BUF_LEN],mode,type,*pstr;
 if(frlfp==0) { sprintf(msgbuf,"No RULE File opened"); Message(msgbuf); return(-1); }
 if (!goto_rules(FRL)) { sprintf(msgbuf,"No RULES part in FRL File");Message(msgbuf);
return(-1); }
 cnt = 0;
 while(!check_end(buf,FRL) )
   {
     get_fact_type(buf,name,&mode,valstr);
     pstr = valstr;
     p = (PCONCL) malloc(CONCLSIZE);
     if (p==0) { sprintf(msgbuf,"create rule *** Insufficient memory");Message(msgbuf);
return(-1); }
     strncpy(p->name,name,NAM_LEN);
     p->operator[0] = mode;
     p->type = UNDEFINED;
     p->oprnds[0] = 0;
     conc[cnt] = p;  cnt ++;
     while(1)
       {
         i = 0;
         while( (*pstr!=' ')&&(*pstr!=0) )
           name[i++] = *pstr++;
         name[i] = 0;
         type = locate_fact(name);
         if (type != -1)
         { p11 = (POPRND) malloc(OPRNDSIZE);
         if (p11==0) { sprintf(msgbuf,"create rules *** Insufficient memory");
Message(msgbuf);return(-1); }
         p11->type = type;
```

```c
      switch(type)
        {
        case STRING:  pll->oprnd_ptr.pstr  = pl$; break;
        case NUMERIC: pll->oprnd_ptr.pnum  = p2$; break;
        case BOOLEAN: pll->oprnd_ptr.pbool = p3$; break;
        case ATTRB:   pll->oprnd_ptr.patrb = p4$; break;
        case MULTI:   pll->oprnd_ptr.pmult = p5$; break;
          default: break;
        }
      pll->nxt_oprnd = 0;
      if (p->oprnds[0]==0) p->oprnds[0] = pll;
      else add_oprnd(p->oprnds[0],pll);

}
      else
        {
        if ((pcl=locate_conc(name))!=0)
        { pll = (POPRND) malloc(OPRNDSIZE);
          if (pll==0) { sprintf(msgbuf,"create rules *** Insufficient memory");
Message(msgbuf);return(-1); }
          /*printf("pll = %x pcl = %x\n",pll,pcl);*/
        pll->type = CONCLUSION;
          /*printf("oprnd_ptr %x %x \n",pll->oprnd_ptr,&pll->oprnd_ptr.pcon);*/
        pll->oprnd_ptr.pcon = pcl;
          pll->nxt_oprnd = 0;
          if (p->oprnds[0]==0) p->oprnds[0] = pll;
          else add_oprnd(p->oprnds[0],pll);

}
         else
         {
        sprintf(msgbuf,"create rule *** :%s: not found as Fact or Rule \n",name);
          Message(msgbuf);
        pll = (POPRND) malloc(OPRNDSIZE);
          if (pll==0) { sprintf(msgbuf,"create rules *** Insufficient memory\n");
Message(msgbuf);return(-1); }
        pl$ = (PSTRFACT) malloc(STRSIZE);
          if (pl$==0) { sprintf(msgbuf,"create rules *** Insufficient memory\n");
Message(msgbuf);return(-1); }
        pl$->type = CONSTANT;
        strncpy(pl$->name,name,NAM_LEN);
        pll->oprnd_ptr.pstr = pl$;
        pll->nxt_oprnd = 0;
        if (p->oprnds[0]==0) p->oprnds[0] = pll;
        else add_oprnd(p->oprnds[0],pll);

}
      }
      i = skip_blanks(pstr);
      pstr+=i;
      if(*pstr==0) break;
    } /* end while(1) */
  /*prnt_oprnds(p->oprnds[0]);*/
  }/* while check_end */ sprintf(msgbuf,"Rule tree created \n"); Message(msgbuf);
  /*prnt_conc();*/
}
endif
/***************************************************************/
/* Name : add_oprnds adds the oprnd ptr to the oprnd listin CONC */
/*        node                                                  */
/* inputs: none                                                 */
/* outputs:                                                     */
/***************************************************************/ void add_oprnd(p,new)
 POPRND p,new;
```

```
  {
   while(p->nxt_oprnd!=0) p = p->nxt_oprnd;
   if   (p!=0) p->nxt_oprnd = new;
  }
ifdef PAIN
/****************************************************************/
/*  Name : locate_conc locates a conclusion from conclusion chain  */
/*                                                               */
/*  inputs: name pointer to the name                             */
/*  outputs: returns pointer to conclusion if found else returns */
/*           NULL                                                */
/****************************************************************/

PCONCL locate_conc(name)
  char *name;
  {
   unsigned int i;
   for (i=0;i<MAXRULES;i++)
     {
      if (conc[i]==0) break;
      if ( strncmp(name,conc[i]->name,NAM_LEN) == 0)
       {
        return(conc[i]);
       }
     }
    return( (PCONCL) 0);
  }
endif /****************************************************************/
/*  Name : prnt_oprnds prints the oprnd list in a conclusion      */
/*                                                               */
/*  inputs: pointer to start of oprnd chain                      */
/*  outputs:  prints oprnd list  on display                      */
/****************************************************************/ prnt_oprnds(p)
POPRND p;
{
 int i;
 if (p==0) return(-1);
 while(1)
   {
    /*printf(" %s %x %x : ",p->oprnd_ptr.pstr->name,p,p->nxt_oprnd);*/
    sprintf(msgbuf," %s : ",p->oprnd_ptr.pstr->name); Message(msgbuf);
    if (p->nxt_oprnd==0) break;
    p = p->nxt_oprnd;
   }
/* printf("\n");*/
}

/****************************************************************/
/*  Name : prints conclusion chain                                */
/*        corresponding tree                                     */
/*  inputs: none                                                 */
/*  outputs:  prints conclusion list on display                  */
/****************************************************************/ void prnt_conc()
{
 unsigned int i;
 for (i=0;i<MAXRULES;i++)
    {
     if (conc[i]==0) break;
     sprintf(msgbuf," %d. %s ",i,conc[i]->name); Message(msgbuf);
     prnt_oprnds(conc[i]->oprnds[0]);
    }
}
```

```
/****************************************************************/
/* Name : prints reports chain                                  */
/*        corresponding tree                                    */
/* inputs: none                                                 */
/* outputs: prints reports list on display                      */
/****************************************************************/ void prnt_rpts()
{
 int i;
 for (i=0;i<128;i++)
   {
    if (rpts[i]==0) break;
    sprintf(msgbuf," %d. %s ",i,rpts[i]->name); Message(msgbuf);
    prnt_oprnds(rpts[i]->oprnds[0]);
   }
}

/****************************************************************/
/* Name : prints the Fact tree                                  */
/*                                                              */
/* inputs: none                                                 */
/* outputs: prints Fact tree  on display                        */
/****************************************************************/ void prnt_facts()
 {
  if (root_str!=0)
   {
    sprintf(msgbuf," The String Fact tree print is "); Message(msgbuf);
    str_prnt(root_str);
    /*getchar();*/
   } if (root_num!=0)
   {
    sprintf(msgbuf," The Numeric Fact tree print is "); Message(msgbuf);
    num_prnt(root_num);
    /*getchar();*/
   } if (root_bool!=0)
   {
    sprintf(msgbuf," The Boolean Fact tree print is ");Message(msgbuf);
    bool_prnt(root_bool);
    /*getchar();*/
   } if (root_atrb!=0)
   {
    sprintf(msgbuf," The Attribute Fact tree print is "); Message(msgbuf);
    atrb_prnt(root_atrb);
    /*getchar();*/
   } if (root_mult!=0)
   {
    sprintf(msgbuf," The Multivalue Fact tree print is "); Message(msgbuf);
    mult_prnt(root_mult);
    /*getchar();*/
   }
}
ifdef PAIN /****************************************************************/
/* Name : evaluates conclusions with menu options               */
/*                                                              */
/* inputs: none                                                 */
/* outputs: none                                                */
```

```
/***************************************************************/
eval_conc()
{
 int i,cnt,k;
 for (i=0;i<128;i++)
   {
    if (conc[i] ==0) break;
    /*printf(" eval %d ",i);*/
    mnu[i] = conc[i]->name;
   }
 cnt = i;
 while(1)
   {
    k = menu(mnu,cnt);
    if(k==-1) break;
    printf("Item no %d selected \n",k);
   }
}
endif
/***************************************************************/
/*  Name : evaluates reports                                 */
/*                                                           */
/*  inputs: none                                             */
/*  outputs:  none                                           */
/***************************************************************/ eval_rpts()
{
 int i,cnt,k; POPRND p1,p2;
 for (i=0;i<32;i++)
   {
    if (rpts[i] ==0) break;
    /*printf(" eval %d ",i);*/
    mlist[i] = rpts[i]->name;
   } cnt = i;
  while(1)
   {
    k = getlist("Select a report ",cnt,mlist,0);
    if(k<0) break;
    sprintf(msgbuf,"Item no %d selected ",k); Message(msgbuf);
    p1 = rpts[k]->oprnds[0];
    if (p1==0)
      { sprintf(msgbuf,"Repts *** Invalid no of params"); Message(msgbuf);}
    else
      {
       if (p1->nxt_oprnd!=0)
         gen_rep(FIL,p1->oprnd_ptr.pstr->name,p1->nxt_oprnd->oprnd_ptr.pstr->name);
       else
         gen_rep(SCREEN,p1->oprnd_ptr.pstr->name);
       sprintf(msgbuf,"Report %s generated ",mlist[k]);
       Message(msgbuf);
      }
   }
}

/***************************************************************/
/*  Name : print reports                                     */
/*                                                           */
/*  inputs: none                                             */
/*  outputs:  none                                           */
/***************************************************************/ print_rpts()
{
```

```
int i,cnt,k; POPRND p1,p2;
for (i=0;i<32;i++)
 {
  if (rpts[i] ==0) break;
  /*printf(" eval %d ",i);*/
  mlist[i] = rpts[i]->name;
 } cnt = i;

while(1)
 {
  k = getlist("Select a report ",cnt,mlist,0);
  if(k<0) break;
  sprintf(msgbuf,"Item no %d selected ",k); Message(msgbuf);
  p1 = rpts[k]->oprnds[0];
  if (p1==0)
   { sprintf(msgbuf,"Repts *** Invalid no of params"); Message(msgbuf);}
  else
   {
    if (p1->nxt_oprnd!=0)
     {
      if (print_file(p1->nxt_oprnd->oprnd_ptr.pstr->name))
       {
        sprintf(msgbuf,"Report %s printed ",mlist[k]);
        Message(msgbuf);
       }
     }
    else
     Message("Report File not specified in FRL File");
   }
 }
}

/****************************************************************/
 *  Name : view reports                                         */
 *                                                              */
 *  inputs: none                                                */
 *  outputs: none                                               */
/****************************************************************/ iew_rpts()

int i,cnt,k; POPRND p1,p2; char *scrptr,fil[20];
for (i=0;i<32;i++)
 {
  if (rpts[i] ==0) break;
  /*printf(" eval %d ",i);*/
  mlist[i] = rpts[i]->name;
 } cnt = i;

while(1)
 {
  k = getlist("Select a report ",cnt,mlist,0);
  if(k<0) break;
  sprintf(msgbuf,"Item no %d selected ",k); Message(msgbuf);
  p1 = rpts[k]->oprnds[0];
  if (p1==0)
   { sprintf(msgbuf,"Repts *** Invalid no of params"); Message(msgbuf);}
  else
   {
    if (p1->nxt_oprnd!=0)
     {
      strcpy(fil,p1->nxt_oprnd->oprnd_ptr.pstr->name);
      make_user_fil(fil);
      sprintf(msgbuf,"type %s|more",fil);
      scrptr = savscr();
```

```c
      system("cls");
      system(msgbuf);
      /*display_file(WIN2,fil);*/
      getch(); fflush(stdin);
      restore(scrptr);
      sprintf(msgbuf,"Report %s printed ",mlist[k]);
      Message(msgbuf);
      }
    else
     Message("Report File not specified in FRL File");
   }
 }
}

/***************************************************************/
/*  Name : menu displays a menu and waits for a choice          */
/*  inputs: pointer to the menu list                            */
/*  outputs:  prints reports list on display                    */
/***************************************************************/ ifdef PAIN
menu(mnu,cnt)
char **mnu; int cnt;
{
 char **p;
 int i,k;
 while(1)
  {
   system("cls");
   p = mnu;
   for (i=0;i<cnt;i++)
     {
      printf("\t\t\t %d. %s \n",i,*p);
      p++;
     }
   printf("\n\n    Enter choice: ");
   if ( (scanf("%d",&k)!=1) )
    {
     printf("\g Invalid Choice \n");
     printf("Press return to continue");/* getchar();*/
    }
    else
    {
     if (k>=cnt) return(-1);
     else return(k);
    }
   }
}
endif /***************************************************************/
/*  Name : gen_rep generates the report specified in the FRL File */
/*        corresponding tree                                    */
/*  inputs: mode SCREEN or FILE                                 */
/*          rptfil pointer to name of RPT File                  */
/*          fil  pointer to name of output File                 */
/*  outputs: none                                               */
/***************************************************************/ gen_rep(mode,rpfil,fil)
char mode,*rpfil,*fil;
{
 FILE *filfp; char buf[BUF_LEN],name[NAM_LEN];
 unsigned char type,ch,cflag,found; PLIST pl;
 int i;
 if (!open_rpt_fil(rpfil)) { Message("RPT File not found"); return(-1); }
 if(mode==SCREEN)
   filfp = stdout;
 else
   {
    strcpy(name,fil);
```

```c
    make_user_fil(name);
    sprintf(msgbuf,"Generating report %s ",name); Message(msgbuf);
    filfp = fopen(name,"w");
}
while(!feof(rptfp))
{
 ch = (char) fgetc(rptfp);
 if( (ch!='[')&&(ch!='{') )
  fputc(ch,filfp);
 else
  {
   i = 0; cflag = 0; if (ch == '{') cflag = 1;
   while( ((ch=fgetc(rptfp))!='}')&&(ch!=']') )
    { name[i]=ch; i++; if (i>NAM_LEN-2) break; }
   name[i]=0;
   type = locate_fact(name);
   if ( type == 0xff){
        locate_conc(name);
        if( p6$ != (PCONCL)NULL)
          type = p6$->type;
} switch(type)
 {
 case STRING: if (p1$->status==DEFINED) fprintf(filfp," %s ",p1$->str_val);
         else fprintf(filfp," ??? ");
         break;
 case NUMERIC: if (p2$->status==DEFINED) fprintf(filfp," %ld ",p2$->num_val);
         else fprintf(filfp," ??? ");
         break;
 case BOOLEAN: if (cflag&&(p3$->status==DEFINED))
                {
                 if (p3$->bool_val=='T'||p3$->bool_val=='Y')
                   fprintf(filfp," %s",name);
                }
                else
         if (p3$->status==DEFINED) fprintf(filfp," %c ",p3$->bool_val);
          else fprintf(filfp," ??? ");
         break;
 case CONCLUSION: if (cflag&&(p6$->status==DEFINED))
                {
                 if (p6$->con_val=='T'||p6$->con_val=='Y')
                   fprintf(filfp," %s",name);
                }
                else
         if (p6$->status==DEFINED) fprintf(filfp," %c ",p6$->con_val);
           else fprintf(filfp," ??? ");
         break;
 case RESULT: if (p6$->status==DEFINED) fprintf(filfp," %ld ",p6$->result);
         else fprintf(filfp," ??? ");
         break;
 case ATTRB : if (p4$->status==DEFINED)
                 {
                  found = 0; i = 0;
                      p1 = p4$->head;
                  while(p1!=0)
                      {
                       if (p4$->cur_val==i++) { found = 1; break; }
                  p1 = p1->next_nam;
                      }
                      if (found) fprintf(filfp," %s ",p1->lname);
                 }
             else fprintf(filfp," ??? ");
             break;
 case MULTI: if (p5$->status==DEFINED)
                 {
                  p1 = p5$->head;
                  while(p1!=0)
                      {
                       if (p1->val) fprintf(filfp," %s ",p1->lname);
                   p1 = p1->next_nam;
                      }
```

```
                }
          else fprintf(filfp," ??? ");
          break;

default:    sprintf(msgbuf,"Reports *** %s Invalid type ",name);
Message(msgbuf);
                        break;
     }/* end switch */
   }
  }/* end while(!eof) */
  fclose(filfp);
}

/* forms a user file */ make_user_fil(char *fil)
{
 char nam[20],ext[8]; int i;
 i = 0;
 if (*fil!='.') return(0);
 strcpy(ext,fil);
 if (userfil[0]==0) strcpy(nam,"User");
 else
   {
    while (userfil[i]!='.')
    {
     nam[i] = userfil[i]; i++;
     if(i==8) break;
    }
    nam[i] = 0;
   }
 strcat(nam,ext);
 strcpy(fil,nam);
} get_fil_nam(char *file, char *name)
{
 int i;
 i = 0;
 while (file[i]!='.')
   {
    name[i] = userfil[i]; i++;
    if(i==8) break;
   }
   name[i] = 0;
} open_rpt_fil(filnam)
char *filnam;
{
 char buf[20];
 strcpy(buf,filnam);
 strcat(buf,".RPT");
#ifdef DEBUG
 printf("In open FRL File %s %s\n",filnam,buf);
#endif
 rptfp = fopen (buf, "r");
    if ((frlfp == NULL)||(rptfp == NULL))
       return(0);
    else return(1);
}

/***************************************************************/
/* Name : create_rpts_tree creates the fact trees from FRL file */
/*       corresponding tree                                     */
/* inputs: none                                                 */
/* outputs: prints reports tree on display                      */
/***************************************************************/ create_rpts_tree()
{
```

```
int i,cnt;
POPRND pl1,pl2;
PCONCL p,pcl;
char buf[BUF_LEN],name[NAM_LEN],valstr[BUF_LEN],mode,type,*pstr;
if(frlfp==0) { sprintf(msgbuf,"No RULE File opened"); Message(msgbuf); return(-1); }
if (!goto_reports(FRL)) { sprintf(msgbuf,"No REPORTS part in FRL File");Message(msgbuf);
return(-1); }
cnt = 0;
while(!check_end(buf,FRL) )
  {
  get_fact_type(buf,name,&mode,valstr);
  pstr = valstr;
  p = (PCONCL) malloc(CONCLSIZE);
  if (p==0) { sprintf(msgbuf,"create rule *** Insufficient memory");Message(msgbuf);
return(-1); }
  strncpy(p->name,name,NAM_LEN);
  p->mode  = mode;
  p->type  = UNDEFINED;
  p->oprnds[0] = 0;
  rpts[cnt] = p;  cnt ++;   )
  while(1)
    {
    i = 0;
    while( (*pstr!=' ')&&(*pstr!=0) )
       name[i++] = *pstr++;
    name[i] = 0;
    pl1 = (POPRND) malloc(OPRNDSIZE);
    if (pl1==0) { sprintf(msgbuf,"create reports *** Insufficient
memory");Message(msgbuf); return(-1); }
    pl1->type = CONSTANT;
       /*printf("RL TREE type = %c %x %x %x %x %x \n",type,p1,p2,p3,p4,p5);*/
    pl$ = (PSTRFACT) malloc(STRSIZE);
    if (pl$==0) { sprintf(msgbuf,"create rules *** Insufficient memory");Message(msgbuf);
return(-1); }
    pl$->type = CONSTANT;
    pl$->mode = mode;
    strncpy(pl$->name,name,NAM_LEN);
    pl1->oprnd_ptr.pstr = pl$;
    pl1->nxt_oprnd = 0;
    if (p->oprnds[0]==0) p->oprnds[0] = pl1;
    else add_oprnd(p->oprnds[0],pl1);
    i = skip_blanks(pstr);
    pstr+=i;
    if(*pstr==0) break;
    } /* end while(1) */
  /*prnt_oprnds(p->oprnds[0]);*/
  }/* while check_end */ sprintf(msgbuf,"Reports tree created "); Message(msgbuf); /*getchar();*/
  /*prnt_rpts();*/
} get_user_info()
{
char con; int ret;
con = UNKNOWN;
if (frlfp!=0)
  {
  if (datfp!=0)
     {
     ret = getcon("Do You wish to modify existing Database",1,&con);
     if ((ret!=-1)&&(con==YES)) get_cust_data();
     }
  else
  get_cust_data();
  Message("User info complete"); return(1);
}
else { Message("No FRL File opened"); return(0); } char *get_msg_name(char *valstr,char *name)
{
int i;
```

```
 if (*valstr!='"') { *name=0; return(valstr); }
 else
  {
   valstr++;
   while (*valstr != ' ') { if (*valstr==0) break;  *name++ = *valstr++; }
   *name=0;
   i = skip_blanks(valstr);
   valstr+=i;
   return(valstr);
  }
 } char *get_nxt_name(char *valstr,char *name)
{
 int i;
 if (*valstr==0) { *name=0; return((char *)0); }
    while (*valstr != ' ') { if (*valstr==0) break;  *name++ = *valstr++; }
    *name=0;
    i = skip_blanks(valstr);
    valstr+=i;
    return(valstr);
} assgn_str(char *valstr, char *strval)
{
 strcpy(strval,valstr);
} assgn_num(char *valstr, int *numval)
{
 sscanf(valstr,"%lu",numval);
} assgn_bool(char *valstr, char *boolval)
{
  if ( (*valstr=='T')||(*valstr=='Y') ) *boolval = 'T';
  else *boolval = 'F';
} free_fact_mem()
{
 if(root_str!=0) free_str_facts(root_str);
 if(root_num!=0) free_num_facts(root_num);
 if(root_bool!=0) free_bool_facts(root_bool);
 if(root_atrb!=0) free_atrb_facts(root_atrb);
 if(root_mult!=0) free_mult_facts(root_mult);
 system("cls");
 heap();
} free_str_facts(p)
PSTRFACT p;
{
 if (p!=0)
    {
     free_str_facts(p->lptr);
     free(p);
     free_str_facts(p->rptr);
    }
} free_num_facts(p)
PNUMFACT p;
{
 if (p!=0)
    {
     free_num_facts(p->lptr);
     free(p);
     free_num_facts(p->rptr);
    }
```

```
free_bool_facts(p)
BOOLFACT p;

if (p!=0)
   {
    free_bool_facts(p->lptr);
    free(p);
    free_bool_facts(p->rptr);
   } free_atrb_facts(p)
ATRBFACT p;

if (p!=0)
   {
    free_atrb_facts(p->lptr);
    free(p);
    free_atrb_facts(p->rptr);
   } free_mult_facts(p)
MULTFACT p;

if (p!=0)
   {
    free_mult_facts(p->lptr);
    free(p);
    free_mult_facts(p->rptr);
   } print_file(char *file)

struct pkt_buf { char val; char *filnam; } pkt;
 char pstat,*scrptr;
 /* check printer status */
 inregs.h.ah = 2;
 inregs.x.dx = 0;
 int86(0x17, &inregs, &outregs);

if ( (outregs.h.ah&0x10)==0) { Message("Printer not selected "); return(0); }
 if ( (outregs.h.ah&0x80)==0) { Message("Printer busy "); return(0); }
 if ( (outregs.h.ah&0x20)==0x20) { Message("Out of Paper "); return(0); }
 if ( (outregs.h.ah&0x08)==0x08) { Message("I/O error on Printer "); return(0); }
 sprintf(msgbuf,"Printer stat = %x ",outregs.h.ah); Message(msgbuf);
 pkt.val = 0;
 pkt.filnam = file;
 /* load file to print spooler */
 /*selectdospage();*/ sprintf(msgbuf,"print %s\n",file);
 scrptr = savscr();
 system(msgbuf);
 cursor_on();
 restore(scrptr); cursor_off();
 /*selectuserpage();*/

/*inregs.h.ah = 1;
 inregs.h.al = 1;
 segoff( &pkt, &(segregs.ds), &(inregs.x.dx));
 int86x(0x2f, &inregs, &outregs, &segregs);
 if (outregs.x.cflag==1)
   {
    sprintf(msgbuf,"Error in spooler service ret = %x ",outregs.x.ax);
    Message(msgbuf); return(0);
   }*/ return(1);

^z
```

SH3.C

```
/******************************************************************************
 *                                                                            *
 * MODULE:   SH3.C                                                            *
 *                                                                            *
 * TITLE:    X                                                                *
 *                                                                            *
 *           VV    VV EEEEEE RRRRRR IIIIII FFFFFFF OOOOO  NNN   NN EEEEEE     *
 *           VV    VV EE     RR  RR   II   FF      OO  OO NNNN  NN EE         *
 *           VV    VV EEEEE  RRRRRR   II   FFFFF   OO  OO NN NN NN EEEEE      *
 *            VV  VV  EE     RR RR    II   FF      OO  OO NN  NNNN EE         *
 *             VVV    EEEEEE RR   RR IIIIII FF      OOOOO  NN   NNN EEEEEE    *
 *                                                                            *
 *           COPYRIGHT  1990  VERIFONE, INC.                                  *
 *                                                                            *
 *           This program is the property of VERIFONE, INC. and is copyright  *
 *           protected.   The user is authorized solely to read the program   *
 *           from its media into the memory of the computer and  execute the  *
 *           program.  No additional rights with respect to this program are  *
 *           granted. COPYING, REPRODUCTION, OR DISTRIBUTION of this program  *
 *           is strictly PROHIBITED.                                          *
 *                                                                            *
 * PRODUCT: SYSGEM                                                            *
 *                                                                            *
 * VERSION: 1.00                                                              *
 *                                                                            *
 * AUTHORS: SRINIVASAN RAO AND N.M. SEBASTIAN                                 *
 *                                                                            *
 * DATE:    20 NOV 1990                                                       *
 *                                                                            *
 * PURPOSE: CONTAINS THE USER INTERFACE AND GRAPHICS FUNCTIONS                *
 *                                                                            *
 * INPUT:   KEYBOARD                                                          *
 *                                                                            *
 * OUTPUT:  CGA/VGA MONITOR                                                   *
 *                                                                            *
 * ENTRY:   X                                                                 *
 *                                                                            *
 * PROGRAM: X                                                                 *
 * LOGIC                                                                      *
 *                                                                            *
 * RESTRICT:X                                                                 *
 *                                                                            *
 * FILES:   X                                                                 *
 *                                                                            *
 * EXIT:    X                                                                 *
 *                                                                            *
 * CHANGES: #   Date       Who         Why & What                             *
 *          --- ---------- ----------- ---------------------------------------*
 *          #01                                                               *
 *                                                                            *
 ******************************************************************************/
#include <malloc.h>
#include <string.h>
#include <stdio.h>
#include "win.h"
#include "menu.h"
#include "shell.h"
#include "proto.h"

extern unsigned char far dots[8];
extern struct wins wind[];
init_win(win,bkcolor,highlight,textcolor)
int win,highlight,textcolor; long bkcolor;
{
wind[win].txt_high = highlight;
wind[win].txt_color = textcolor;
wind[win].bkcolor = bkcolor;
switch(win)
 {
  case WIN0: wind[win].xl = W0XL; wind[win].xh = W0XH;
             wind[win].yl = W0YL; wind[win].yh = W0YH;
```

```c
                break;
    case WIN1:  wind[win].xl = W1XL; wind[win].xh = W1XH;
                wind[win].yl = W1YL; wind[win].yh = W1YH;
                break;
    case WIN2:  wind[win].xl = W2XL; wind[win].xh = W2XH;
                wind[win].yl = W2YL; wind[win].yh = W2YH;
                break;
    case WIN3:  wind[win].xl = W3XL; wind[win].xh = W3XH;
                wind[win].yl = W3YL; wind[win].yh = W3YH;
                break;
    case WIN4:  wind[win].xl = W4XL; wind[win].xh = W4XH;
                wind[win].yl = W4YL; wind[win].yh = W4YH;
                break;
    case WIN5:  wind[win].xl = W5XL; wind[win].xh = W5XH;
                wind[win].yl = W5YL; wind[win].yh = W5YH;
                break;

oid displayframe(xl,yl,xh,yh)
int xl,yl,xh,yh;

int row,col; char oldclr;
row = yl;
oldclr = _settextcolor(BRWHITE);
for (col= xl+1;col<xh;col++)
  {
    _settextposition(row,col);        /*horizontal line*/
    /*putchar(196);*/
    outstext("\xc4");
    _settextposition(row+(yh-yl),col);
    /*putchar(196);*/
    outstext("\xc4");
  } col =xl;
for (col= xl,row=yl+1;row<yh;row++)
  {
    _settextposition(row,col);        /*vertical line*/
    /*putchar(179);*/
    outstext("\xb3");
    _settextposition(row,col+(xh-xl));
    /*putchar(179);*/
    outstext("\xb3");
  }

_settextposition(yl,xl);
  /*putchar(218);*/              /*left upper corner */
  outstext("\xda");
  _settextposition(yl,xh);
  /*putchar(191);*/              /*right upper corner */
  outstext("\xbf");
  _settextposition(yh,xl);
  /*putchar(192);*/              /*left lower corner */
  outstext("\xc0");
  _settextposition(yh,xh);
  /*putchar(217);*/              /*right lower corner */
  outstext("\xd9");
  _settextcolor(oldclr);
} void displaydframe(xl,yl,xh,yh)
int xl,yl,xh,yh;

{
  int row,col; char oldclr;
  oldclr = _settextcolor(BRWHITE);
  row = yl;
  for (col= xl+1;col<xh;col++)
    {
```

```c
    _settextposition(row,col);      /*horizontal line*/
 /*putchar(205);*/
    outstext("\xcd");
    _settextposition(row+(yh-yl),col);
 /*putchar(205);*/
    outstext("\xcd");
 } col =xl;
for (col= xl,row=yl+1;row<yh;row++)
 {
    _settextposition(row,col);      /*vertical line*/
 /*putchar(186);*/
    outstext("\xba");
    _settextposition(row,col+(xh-xl));
 /*putchar(186);*/
    outstext("\xba");
 }

_settextposition(yl,xl);
/*putchar(201);*/         /*left upper corner */
outstext("\xc9");
_settextposition(yl,xh);
/*putchar(187);*/         /*right upper corner */
 outstext("\xbb");
_settextposition(yh,xl);
/*putchar(200);*/         /*left lower corner */
outstext("\xc8");
_settextposition(yh,xh);
/* putchar(188);*/        /*right lower corner */
outstext("\xbc");
_settextcolor(oldclr);
} int get_option()
{
 int option,done=0;
 while(!done)
   {
    /*while(!kbhit())*/ prt_time();
    option = getch();
    if (option==0)
    {
         option = getch();
         switch (option)
         {
            case UP:
            case DOWN:
            case LEFT:
            case RIGHT:
                    done = 1; break;

case F7:
                 help();
                 break;
            case F10:
                 break;
         }
     }
     else
     {
         switch (option)
         {
            case TAB:
            case ESC:
            case CR: done =1;
                    break;
         }
     }
   }
   return(option);
}
```

```
nt get_ascii()

int option,done=0;
while(!done)
  {
   prt_time();
   option = getch();
   if (option==0)
   {
        option = getch();
        if (option == F7)
        {
             /*strcpy(helpbuf, "ASCII");*/
             help();
        }
    }
    else
        done = 1;
  }
  return(option);

oid highlight(x,y,line,color)
nt x,y,color; char *line;

_settextcolor(color);
_settextposition(x,y);
_outtext(line);

nt make_list(first,num,files)
struct file_list **first;
har *files;
nt *num;

struct file_list *node;
struct find_t info;
int status,size;
int count = 0;

size = sizeof(struct file_list);

*first = (struct file_list *) calloc(1,sizeof(struct file_list));
node =*first;
  node->next = NULL;
node->file_number = 0;

/* get the first filein the current directory */ status = _dos_findfirst(files,_A_RDONLY|_A_NORMAL,&info);
while(!status)
{
 /* Add the file to the list */
 node->next = (struct file_list *) calloc(1,size);
 node = node->next;
 node->next = NULL;
 node->file_number = ++count;
 memcpy(node,&info,sizeof(struct find_t));

status = _dos_findnext(&info);
}
*num = count;

how_list(win, mnu, cnt)
nt win,cnt;
```

```c
char **mnu;
{
 int firstrow,firstcol,lastrow,lastcol,row,col,i,rw,cl,lastcl;
 char **p,oldclr; long bkcolor,oldbk;
 oldclr = _settextcolor(wind[win].txt_color);
 p = mnu;
 oldbk = _setbkcolor(wind[win].bkcolor);
 switch(win)
   {
    case WIN0: firstrow = row = 2; lastrow = 2;
            firstcol = col = 2; lastcol = 55;
            break;
    case WIN1: firstrow = row = 5; lastrow = 6;
            firstcol = col = 2; lastcol = 55;
            break;
    case WIN2: firstrow = row = 11; lastrow = 19;
            firstcol = col = 4; lastcol = 55;
            break;
    case WIN5: firstrow = row = 5; lastrow = 22;
            firstcol = col = 65; lastcol = 70;
            break;
    default:   return(-1);
   }
 i = 0;
 while(1)
   {
    _settextposition(row,col);
    if ((win==WIN2)&&(i==wind[win].index)) _settextcolor(wind[win].txt_high);
    else _settextcolor(wind[win].txt_color);
    _outtext(*p);
    mrow[win][i] = row; mcol[win][i] = col;
    col+=TXTSIZE;
    i++; /*printf(" %d ",i);*/
    if (i==cnt)  break;
    if(col>lastcol)
      {
       col = firstcol;
       row++;
       if (row>lastrow) break;
      }
    p++;
   }
 mcount[win] =i; /* printf("win %d i %d ",win,i); */
 _settextcolor(oldclr);
 _setbkcolor(oldbk);
 } void fill(win)
int win;
{
 int row,col,lastrow,lastcol,firstcol;
 long oldclr;
 oldclr = _setbkcolor(wind[win].bkcolor);
 _setfillmask(dots);
 switch(win)
   {
    case WIN0: row = W0YL+1; firstcol = col = W0XL+1;
            lastrow  = W0YH; lastcol = W0XH;
            break;
    case WIN1: row = W1YL+1; firstcol = col = W1XL+1;
            lastrow  = W1YH; lastcol = W1XH;
            break;
    case WIN2: row = W2YL+1; firstcol = col = W2XL+1;
            lastrow  = W2YH; lastcol = W2XH;
            break;
    case WIN3: row = W3YL+1; firstcol = col = W3XL+1;
            lastrow  = W3YH; lastcol = W3XH;
            break;
    case WIN4: row = W4YL+1; firstcol = col = W4XL+1;
            lastrow  = W4YH; lastcol = W4XH;
            break;
    case WIN5: row = W5YL+1; firstcol = col = W5XL+1;
```

```c
            lastrow  = W5YH; lastcol = W5XH;
            break;
  }
  for (;row<lastrow;row++)
    {
     clearrow(row,firstcol,lastcol,wind[win].bkcolor);
     /*
     col = firstcol;
     for (;col<lastcol;col++)
       {
        _settextposition(row,col);
        _outtext(" ");
       } */

}
  _setbkcolor(oldclr);
}

/*
void fill(win)
int win;
{
 int row,col,lastrow,lastcol,firstcol;
 long oldclr;
 oldclr = _setbkcolor(wind[win].bkcolor);
 _setfillmask(dots);
 switch(win)
  {
   case WIN0: row = W0YL+1; firstcol = col = W0XL+1;
           lastrow  = W0YH; lastcol = W0XH;
           break;
   case WIN1: row = W1YL+1; firstcol = col = W1XL+1;
           lastrow  = W1YH; lastcol = W1XH;
           break;
   case WIN2: row = W2YL+1; firstcol = col = W2XL+1;
           lastrow  = W2YH; lastcol = W2XH;
           break;
   case WIN3: row = W3YL+1; firstcol = cql = W3XL+1;
           lastrow  = W3YH; lastcol = W3XH;
           break;
   case WIN4: row = W4YL+1; firstcol = col = W4XL+1;
           lastrow  = W4YH; lastcol = W4XH;
           break;
   case WIN5: row = W5YL+1; firstcol = col = W5XL+1;
           lastrow  = W5YH; lastcol = W5XH;
           break;
  }
  for (;row<lastrow;row++)
    {
     col = firstcol;
     for (;col<lastcol;col++)
       {
        _settextposition(row,col);
        _outtext(" ");
       }
    }
  _setbkcolor(oldclr);
}
*/
main_loop()
{
 int i,option,row,col,done;
 done = 0;
 while(!done)
  {
   option = get_option();
   switch (option)
     {
```

```
        case TAB: goto_window(curr_wind);
                break;
        case CR:  exec_menu(curr_wind);
                break;
        case UP:  go_updown(UP,curr_wind);
                break;
        case DOWN: go_updown(DOWN,curr_wind);
               break;
        case LEFT: go_leftright(LEFT,curr_wind);
                break;
        case RIGHT: go_leftright(RIGHT,curr_wind);
                  break;
        case F7:
             strcpy(helpbuf,"MAIN LOOP");
             help();
             break;
        case F10: exit_menu(curr_wind);
                break;
        case ESC: if (curr_wind==WIN0) done = 1;
                break;
/*      case F1:  help_menu(curr_wind);
                break;*/
     }
  }
  cursor_on();
  /*selectdospage(0);*/
} goto_window(int win)
{
 int i,j; long oldbk;
 int row,col,oldclr;
 i = wind[win].index;
 /*prt_time();*/
 row = mrow[win][i]; col = mcol[win][i];
  if (win == MENU_WIN)
   oldclr = _settextcolor(LRED);
  else
   oldclr = _settextcolor(wind[win].txt_color);
  oldbk  = _setbkcolor(wind[win].bkcolor);
  _settextposition(row,col);
  _outtext(mnu[win][i]);
  curr_wind = win_seq[++win_index%MAXW];
  win = curr_wind;
  if (win == SMENU_WIN) wind[win].index = 0;
  i = wind[win].index ;
  update_helpbuf(win,wind[win].index);
  row = mrow[win][i]; col = mcol[win][i];
  _setbkcolor(wind[win].bkcolor);
  _settextcolor(wind[win].txt_high);
  _settextposition(row,col);
  _outtext(mnu[win][i]);
  _settextcolor(oldclr);
  _setbkcolor(oldbk);
} go_updown(int dir,int win)
{
 int i,j;
 int row,col,oldclr; long oldbk;
 prt_time();
 i = wind[win].index;
 oldclr = _settextcolor(wind[win].txt_color);
 oldbk = _setbkcolor(wind[win].bkcolor);
 row = mrow[win][i]; col = mcol[win][i];
 _settextposition(row,col);
 _outtext(mnu[win][i]);
 j = next_row(win,dir,i);
 /* printf(" %d ",j); */
 if (j>=0)
 {
  i = wind[win].index = j; /* ++wind[win].index%mcount[win]; */
  row = mrow[win][i]; col = mcol[win][i];
```

```c
}
update_helpbuf(win,wind[win].index);
_settextcolor(wind[win].txt_high);
_settextposition(row,col);
_outtext(mnu[win][i]);
_settextcolor(oldclr);
_setbkcolor(oldbk);
} go_leftright(int dir,int win)
{
int i,j;
int row,col,oldclr; long oldbk;
prt_time();
i = wind[win].index;
oldclr = _settextcolor(wind[win].txt_color);
oldbk = _setbkcolor(wind[win].bkcolor);
row = mrow[win][i]; col = mcol[win][i];
_settextposition(row,col);
_outtext(mnu[win][i]);
j = next_col(win,dir,i);
/* printf(" %d ",j); */
if (j>=0)
  {
   i = wind[win].index = j; /* ++wind[win].index%mcount[win]; */
   row = mrow[win][i]; col = mcol[win][i];
  }
update_helpbuf(win,wind[win].index);
_settextcolor(wind[win].txt_high);
_settextposition(row,col);
_outtext(mnu[win][i]);
_settextcolor(oldclr);
_setbkcolor(oldbk);
switch(win)
   {
    case MENU_WIN: show_smenu(wind[win].index);
                   break;
   }

} exit_menu(int win)
{;}
help_menu(win)
{;} next_row(int win,int dir)
{
 int i,row,col,cnt;
 i = wind[win].index;
 row = mrow[win][i]; col = mcol[win][i];
 cnt=0;
 while(row==mrow[win][i])
   {
    cnt++; if(cnt==mcount[win]) return(-1);
    if (dir==UP) i--; else i++;
    if (i>mcount[win]-1) i = 0;
    if (i<0) i = mcount[win]-1;
    /* printf(" %d ",i); */
   }
 cnt = 0;
 while(col!=mcol[win][i])
   {
    cnt++; if(cnt> mcount[win]) return(-1);
    if (dir==UP) i--; else i++;
    if (i>mcount[win]-1) i = 0;
    if (i<0) i = mcount[win]-1;
    /* printf(" %d ",i); */
   }
```

```c
 return(i);
} next_col(int win,int dir)
{
 int i,row,col,cnt;
 i = wind[win].index;
 if (dir==LEFT) i--; else i++;
 if (i==mcount[win]) i = 0;
 if (i<0) i = mcount[win]-1;
 /* printf(" %d ",i); */
 return(i);
} show_smenu(int mnu_no)
{
 int win,i,row,col,oldclr; long oldbk;
 /* curr_wind = SMENU_WIN;*/
 win = SMENU_WIN;
 for (i=0;i<scount[mnu_no];i++)
  mnu[win][i] = smnu[mnu_no][i];
 fill(win);
 show_list(win,mnu[win],scount[mnu_no]);
 row = mrow[win][0];
 col = mcol[win][0];
 oldclr = _settextcolor(wind[win].txt_color);
 oldbk  = _setbkcolor(wind[win].bkcolor);
 _settextposition(row,col);
 _outtext(mnu[win][0]);
 _settextcolor(oldclr);
 _setbkcolor(oldbk);
} prnt_titles()
{
  int oldclr;
  _settextposition(1,29);
  _setbkcolor(BKBLK);
  oldclr = _settextcolor(LCYAN);
  _outtext("MENU");
  _settextposition(4,29);
  _settextcolor(LGREEN);
  _outtext("FILES");
  _settextposition(8,29);
  _settextcolor(BRWHITE);
  _outtext("DIALOG");
  _settextposition(22,29);
  _settextcolor(YELLOW);
  _outtext("MESSAGE");
  _settextposition(4,68);
  _settextcolor(LCYAN);
  _outtext("OPTIONS");
  _settextcolor(oldclr);
} getint(char *msg,int digits, long *value)
{
 int mrow,mcol,drow,dcol,oldclr,ch,i; long oldbk;
 char buf[100],blank[100];
 mrow = W2YL +5 ; mcol = W2XL + ((W2XH -W2XL) - strlen(msg))/2;
 oldbk =_setbkcolor(wind[DLWND].bkcolor);
 oldclr =_settextcolor(BLACK);
 _settextposition(mrow,mcol);
 _outtext(msg);

drow = W2YL + 7; dcol = W2XL +  ((W2XH -W2XL) - digits)/2;
 _setbkcolor(BKBRN);
 oldclr = _settextcolor(BLWHITE);
```

```c
    for (i=0;i<digits;i++)
        blank[i] = ' ';
    blank[i] =0;
    _settextposition(drow,dcol);
    _outtext(blank);
    _settextposition(drow,dcol);
    i = 0;
    if (*value >=0)
    {
        sprintf(buf,"%i",*value);
        i=strlen(buf);
        _outtext(buf);
    } ch = get_ascii();
    while (ch != 0x0d)
    {
      if (ch == ESC)
      {
        clearrow(mrow,W2XL+1,W2XH,wind[WIN2].bkcolor);
        clearrow(drow,W2XL+1,W2XH,wind[WIN2].bkcolor);
        _settextcolor(oldclr);
        _setbkcolor(oldbk);

return(-1);
      }
        if (ch == '\b')
        {
            i=i-1;
            if (i<0) i =0;
            if (i>digits-1) i = digits-1;
            buf[i] =0;
            _settextposition(drow,dcol);
            _outtext(blank);
            _settextposition(drow,dcol);
            _outtext(buf);

}
        else if (i<digits)
            {
                if ((isxdigit(ch)) || (ch == 'x') || (ch == 'X'))
                {
                buf[i++] =ch;buf[i] =0;
                _settextposition(drow,dcol);
                _outtext(blank);
                _settextposition(drow,dcol);
                _outtext(buf);
                }

} ch =get_ascii();
    }
    clearrow(mrow,W2XL+1,W2XH,wind[WIN2].bkcolor);
    clearrow(drow,W2XL+1,W2XH,wind[WIN2].bkcolor);
        _settextcolor(oldclr);
        _setbkcolor(oldbk);

sscanf(buf,"%lu",value);

} getstr(char *msg,int digits, char *str)
{
    int mrow,mcol,drow,dcol,oldclr,i,ch; long oldbk;
    char buf[100],blank[100];
```

```c
    mrow = W2YL +5 ; mcol = W2XL + ((W2XH -W2XL) - strlen(msg))/2;
    oldbk = _setbkcolor(wind[DLWND].bkcolor);
    oldclr = _settextcolor(BLACK);
    _settextposition(mrow,mcol);
    _outtext(msg);

drow = W2YL + 7; dcol = W2XL + ((W2XH -W2XL) - digits)/2;
    _setbkcolor(BKBRN);
    _settextcolor(BLWHITE);
    for (i=0;i<digits;i++)
        blank[i] = ' ';
    blank[i] =0;
    _settextposition(drow,dcol);
    _outtext(blank);
    _settextposition(drow,dcol);
    i=0;

sprintf(buf,"%s",str);
    i = strlen(str);
    _outtext(buf);
 ch = get_ascii();
 while (ch != 0x0d)
 {
    if (ch == ESC)
    { clearrow(mrow,W2XL+1,W2XH,wind[WIN2].bkcolor);
       clearrow(drow,W2XL+1,W2XH,wind[WIN2].bkcolor);
        _settextcolor(oldclr);
        _setbkcolor(oldbk);

return(-1);
    } if (ch == '\b')
    {
        i=i-1;
        if (i<0) i =0;
        if (i>digits-1) i = digits-1;
        buf[i] =0;
         _settextposition(drow,dcol);
         _outtext(blank);
         _settextposition(drow,dcol);
         _outtext(buf);

}
    else if (i<digits)
        {
            buf[i++] =ch;buf[i] =0;
            _settextposition(drow,dcol);
            _outtext(blank);
            _settextposition(drow,dcol);
            _outtext(buf);
        }
    ch =get_ascii();
 } strcpy(str,buf);

clearrow(mrow,W2XL+1,W2XH,wind[WIN2].bkcolor);
    clearrow(drow,W2XL+1,W2XH,wind[WIN2].bkcolor);
    _settextcolor(oldclr);
    _setbkcolor(oldbk);

} getbool(char *msg,int digits, char *result)
{
```

```c
int mrow,mcol,drow,dcol,oldclr,i,ch; long oldbk;
char buf[80],blank[80],res;
_displaycursor(_GCURSOROFF);

mrow = W2YL +5 ; mcol = W2XL + ((W2XH -W2XL) - strlen(msg))/2;
oldbk = _setbkcolor(wind[DLWND].bkcolor);
oldclr=_settextcolor(BLACK);
_settextposition(mrow,mcol);
_outtext(msg);
digits = strlen(" TRUE   FALSE ");
drow = W2YL + 7; dcol = W2XL +  ((W2XH -W2XL) - digits)/2;
_setbkcolor(BKBRN);
if ((*result == 'T') || (*result == 't'))
{
    res = TRUE;
    _settextposition(drow,dcol);
    _settextcolor(BLWHITE);
    _outtext(" TRUE ");
    _settextposition(drow,dcol+strlen(" TRUE   "));
    _settextcolor(WHITE);
    _outtext(" FALSE ");
}
if ((*result == 'F') || (*result == 'f'))
{
    res = FALSE;
    _settextposition(drow,dcol);
    _settextcolor(WHITE);
    _outtext(" TRUE ");
    _settextposition(drow,dcol+strlen(" TRUE   "));
    _settextcolor(BLWHITE);
    _outtext(" FALSE ");
} if ((*result == 'U') || (*result == 'u'))
{
    res = FALSE;
    _settextposition(drow,dcol);
    _settextcolor(WHITE);
    _outtext(" TRUE ");
    _settextposition(drow,dcol+strlen(" TRUE   "));
    _settextcolor(WHITE);
    _outtext(" FALSE ");
} ch = get_ascii();
while (ch != 0x0d)
{
    if (ch == ESC)
   { clearrow(mrow,W2XL+1,W2XH,wind[WIN2].bkcolor);
    clearrow(drow,W2XL+1,W2XH,wind[WIN2].bkcolor);
    _setbkcolor(oldbk);
    _settextcolor(oldclr);
    _displaycursor(_GCURSORON);

return(-1);
  }

_settextposition(drow,dcol);
  if ( res != TRUE)
  {
        _settextcolor(BLWHITE);
        _outtext(" TRUE ");
        _settextposition(drow,dcol+strlen(" TRUE   "));
        _settextcolor(WHITE);
        _outtext(" FALSE ");
        res = TRUE;
  }
  else
  {
```

```c
            _settextcolor(WHITE);
            _outtext(" TRUE ");
            _settextposition(drow,dcol+strlen(" TRUE  "));
            _settextcolor(BLWHITE);
            _outtext(" FALSE ");
            res = FALSE;
        }
    if (res == TRUE)
            _settextposition(drow,dcol+strlen(" TRUE"));
    else
            _settextposition(drow,dcol+strlen(" TRUE ")+strlen(" FALSE"));

ch =get_ascii();
}
_settextcolor(oldclr);

clearrow(mrow,W2XL+1,W2XH,wind[WIN2].bkcolor);
    clearrow(drow,W2XL+1,W2XH,wind[WIN2].bkcolor);
    _setbkcolor(oldbk);
    _settextcolor(oldclr);

if (res == TRUE)
{
*result = 'T';
_displaycursor(_GCURSORON);

return(TRUE);
}
else
 {
  *result = 'F';
  _displaycursor(_GCURSORON);

return(FALSE);
  }

} getcon(char *msg,int digits, char *result)

{ int mrow,mcol,drow,dcol,oldclr,i,ch; long oldbk;
 char buf[80],blank[80],res;
 _displaycursor(_GCURSOROFF);
 mrow = W2YL +5 ; mcol = W2XL + ((W2XH -W2XL) - strlen(msg))/2;
 oldbk = _setbkcolor(wind[DLWND].bkcolor);
 oldclr =_settextcolor(BLACK);
 _settextposition(mrow,mcol);
 _outtext(msg);
 digits = strlen(" YES  NO ");
 drow = W2YL + 7; dcol = W2XL +  ((W2XH -W2XL) - digits)/2;
 _setbkcolor(BKBRN);
 if ((*result == 'Y') || (*result == 'y'))
 {
    res = TRUE;
    _settextposition(drow,dcol);
    _settextcolor(BLWHITE);
    _outtext(" YES ");
    _settextposition(drow,dcol+strlen(" YES   "));
    _settextcolor(WHITE);
    _outtext(" NO ");
}
  if ((*result == 'N') || (*result == 'n'))
 {
    res = FALSE;
    _settextposition(drow,dcol);
    _settextcolor(WHITE);
    _outtext(" YES ");
    _settextposition(drow,dcol+strlen(" YES   "));
    _settextcolor(BLWHITE);
```

```c
        _outtext(" NO ");
}
if ((*result == 'U') || (*result == 'u'))
{
    res = FALSE;
    _settextposition(drow,dcol);
    _settextcolor(WHITE);
    _outtext(" YES ");
    _settextposition(drow,dcol+strlen(" YES  "));
    _settextcolor(WHITE);
    _outtext(" NO ");
}
ch =get_ascii();

while (ch != 0x0d)
{
    if (ch == ESC)
    { clearrow(mrow,W2XL+1,W2XH,wind[WIN2].bkcolor);
        clearrow(drow,W2XL+1,W2XH,wind[WIN2].bkcolor);
        _setbkcolor(oldbk);
        _settextcolor(oldclr);
        _displaycursor(_GCURSORON);

return(-1);
    }

_settextposition(drow,dcol);
    if ( res != TRUE)
    {
        _settextcolor(BLWHITE);
        _outtext(" YES ");
        _settextposition(drow,dcol+strlen(" YES  "));
        _settextcolor(WHITE);
        _outtext(" NO ");
        res = TRUE;
    }
    else
    {
        _settextcolor(WHITE);
        _outtext(" YES ");
        _settextposition(drow,dcol+strlen(" YES  "));
        _settextcolor(BLWHITE);
        _outtext(" NO ");
        res = FALSE;
    }
    if (res == TRUE)
        _settextposition(drow,dcol+strlen(" TRUE"));
    else
        _settextposition(drow,dcol+strlen(" TRUE ")+strlen(" NO"));

ch =get_ascii();
}
_settextcolor(oldclr);

clearrow(mrow,W2XL+1,W2XH,wind[WIN2].bkcolor);
    clearrow(drow,W2XL+1,W2XH,wind[WIN2].bkcolor);

_setbkcolor(oldbk);
if (res == TRUE)
{
 *result = 'Y';
 _displaycursor(_GCURSORON);
 return(TRUE);
}
else
{
 *result = 'N';
 _displaycursor(_GCURSORON);
```

```c
    return(FALSE);
  }
}
getlist(char *msg,int size, char **list,int curr_val)
{
 int row,col,oldclr,option,i,ch; long oldbk;
 char buf[80],blank[80],*resbuf;
 for (i=0;i<size;i++)
  mnu[WIN2][i] = list[i];

row = W2YL + 1; col = W2XL +((W2XH -W2XL) - strlen(msg))/2;
 _setbkcolor(wind[DLWND].bkcolor);
 _settextcolor(BLRED);
 _settextposition(row,col);
 _outtext(msg);
   _settextcolor(BLACK);
 if ((curr_val>=0)&&(curr_val<size))  wind[WIN2].index = curr_val;
 else wind[WIN2].index = 0;
 show_list(WIN2,list,size);
 option = get_option();
 while (option != 0x0d)
 {
  if (option == ESC)
  { clearrow(row,W2XL+1,W2XH,wind[WIN2].bkcolor);
     fill(WIN2);
    return(-1);
  }
  switch (option)
    {
      case UP:  go_updown(UP,WIN2);
            break;
      case DOWN: go_updown(DOWN,WIN2);
              break;
      case LEFT: go_leftright(LEFT,WIN2);
            break;
      case RIGHT: go_leftright(RIGHT,WIN2);
            break;
    } option =get_option();
 }
 _settextcolor(oldclr);

clearrow(row,W2XL+1,W2XH,wind[WIN2].bkcolor);

fill(WIN2);
 sprintf(buf,"selected item is %s index=%d",mnu[WIN2][wind[WIN2].index],
 wind[WIN2].index); /*Message(buf);*/ return(wind[WIN2].index);

} getmlist(char *msg,int size, char **list,int *res)
{
 int row,col,oldrow,oldcol,oldindex,oldclr,i,ch; long oldbk;
 char buf[80],blank[80],*resbuf;
 for (i=0;i<size;i++)
 {
  mnu[WIN2][i] = list[i];
  /*res[i] = FALSE;*/
 }
 row = W2YL + 1; col = W2XL +((W2XH -W2XL) - strlen(msg))/2;
 oldbk = _setbkcolor(wind[DLWND].bkcolor);
 oldclr = _settextcolor(BLRED);
 _settextposition(row,col);
 _outtext(msg);
   _settextcolor(BLACK);
 wind[DLWND].index = 0;
```

```
show_list(WIN2,list,size);
ch = get_option();
while (ch != ESC)
{
                oldindex = wind[WIN2].index;
                oldrow = mrow[WIN2][oldindex];
                oldcol = mcol[WIN2][oldindex];
   switch (ch)
    { case UP:
                go_updown(UP,WIN2);
                if (res[oldindex] == ONE)
setcolortext(oldrow,oldcol,mnu[WIN2][oldindex],RED,wind[WIN2].bkcolor);
                break;
      case DOWN: go_updown(DOWN,WIN2);
                if (res[oldindex] == ONE)
setcolortext(oldrow,oldcol,mnu[WIN2][oldindex],RED,wind[WIN2].bkcolor);

break;
      case LEFT: go_leftright(LEFT,WIN2);
                                if (res[oldindex] == ONE)
setcolortext(oldrow,oldcol,mnu[WIN2][oldindex],RED,wind[WIN2].bkcolor);

break;
      case RIGHT: go_leftright(RIGHT,WIN2);
                if (res[oldindex] == ONE)
setcolortext(oldrow,oldcol,mnu[WIN2][oldindex],RED,wind[WIN2].bkcolor);

break;
      case CR:  if (res[wind[WIN2].index] == ONE)
                  {
       res[wind[WIN2].index] = ZERO;

sprintf(buf," item removed is %s
index=%d",mnu[WIN2][wind[WIN2].index],wind[WIN2].index);
                    Message(buf);
                  }
                  else
                  {
        setcolortext(oldrow,oldcol,mnu[WIN2][oldindex],BLRED,wind[WIN2].bkcolor);
sprintf(buf,"selected item is %s index=%d",mnu[WIN2][wind[WIN2].index],wind[WIN2].index);
                    Message(buf);
                    res[wind[WIN2].index] = ONE;
                  }
                    break;
     } ch =get_option();
  }
 _settextcolor(oldclr);

clearrow(row,W2XL+1,W2XH,wind[WIN2].bkcolor);
 fill(WIN2);
 return(0);

}
setcolortext(int row,int col,char *buf,int tclr,long bclr)
{
 int oldtclr,i;
 long oldbclr;
 oldtclr = _settextcolor(tclr);
 oldbclr = _setbkcolor(bclr);
 _settextposition(row,col);
 _outtext(buf);
 _setbkcolor(oldbclr);
 _settextcolor(oldtclr);
} selectdospage(int save)
{
struct videoconfig video_info;
      _getvideoconfig(&video_info) ;
```

```c
        if (video_info.numvideopages >= 0)
        {
                _setactivepage(0);
                _setvisualpage(0);
                        if (save) scrptr = savscr();
                return(1);
        }
        else
                return(-1);

}
selectuserpage(int unsave)
{
struct videoconfig video_info;
        _getvideoconfig(&video_info) ;
        if (video_info.numvideopages >= 1)
        {
                _setactivepage(4);
                _setvisualpage(4);
                        if (unsave) restore(scrptr);
                return(1);
        }
        else
                return(-1);

} clearrow(int row,int start,int end,long color)
{
 char buf[80];
 int i;
 for(i=0;i<(end-start);i++)
  buf[i] = ' ';
  buf[i] = 0;
  _setbkcolor(color);
 _settextposition(row,start);
 _outtext(buf);

}

Message(char *buf)
{
 int i,j;
 int row,col,oldclr; long oldbk;
 char ch;
 oldclr = _settextcolor(wind[WIN3].txt_color);
 oldbk = _setbkcolor(wind[WIN3].bkcolor);
 row = W3YL+1; col = W3XL+1;
 fill(WIN3);
 _settextcolor(wind[WIN3].txt_high);
 _settextposition(row,col);
 _outtext(buf);
 _settextcolor(oldclr);
 get_ascii();
 clearrow(row,col,W3XH,wind[WIN3].bkcolor);
 _setbkcolor(oldbk);

}

File_Msg(char pos,char *buf)
{
 int i,j;
 int row,col,oldclr; long oldbk;
 char ch;
 oldclr = _settextcolor(wind[WIN1].txt_color);
 oldbk = _setbkcolor(wind[WIN1].bkcolor);
 if (pos=='A')
     row = W1YL+1; else row = W1YL+2; col = W1XL+1;
```

```c
    clearrow(row,col,W1XH,wind[WIN1].bkcolor);
    /*fill(WIN);*/
    _settextcolor(wind[WIN1].txt_high);
    _settextposition(row,col);
    _outtext(buf);
    _settextcolor(oldclr);
    _setbkcolor(oldbk);

}

Clear_File_Msg(char pos)
{
int row,col,oldclr; long oldbk;
 oldclr = _settextcolor(wind[WIN1].txt_color);
 oldbk = _setbkcolor(wind[WIN1].bkcolor);
 if (pos=='A')
    row = W1YL+1; else row = W1YL+2; col = W1XL+1;
 clearrow(row,col,W1XH,wind[WIN1].bkcolor);
 _settextcolor(oldclr);
 _setbkcolor(oldbk);
} makelist(char *ext,char ***list,int *cnt)
{
    struct find_t info;
    int status,i;char **first;
        first = calloc(MAXFILENOS,sizeof(char *));
        if (first == NULL)
        {
            Message("unable to allocate memory for dir list");
            return(0);
        } status = _dos_findfirst(ext,_A_RDONLY|_A_NORMAL, &info);
    i =0;
    while (!status)
    {
        first[i++] =(char *)strdup(info.name);
        if (i>=MAXFILENOS) break;
        status = _dos_findnext(&info);

}
    *cnt =i;
    *list = first;

}
    /*
selectfile(char *ext, char *filename)
{
    char ** list,buf[60]; int cnt,index,i;
    makelist(ext,&list,&cnt);
    if (cnt == 0)
    {
        sprintf(buf,"No file available %s",ext);
        Message(buf);
        return(-1);
    }
    if ((index = getlist(" SELECT FILES ",cnt,list,0)) != -1)
    {
        strncpy(filename,list[index],FILENAMELENGTH);
    }
    else
        *filename =0;

for (i=0; i<MAXFILENOS ; i++)
    {
        if (list[i] != NULL)
            free(list[i]);
        list++;
    }
```

```
        free(list);

}
*/ selectfile(char *ext, char *filename)
{
      char *list[MAXFILENOS],buf[60]; int cnt,index,i,status;
      struct find_t info;

for(i=0;i<MAXFILENOS;i++)
            list[i] = NULL;
      status = _dos_findfirst(ext,_A_RDONLY|_A_NORMAL, &info);
      cnt =0;
      while (!status)
      {
            list[cnt++] =(char *)strdup(info.name);
            if (cnt>=MAXFILENOS) break;
            status = _dos_findnext(&info);

}
      if (cnt == 0)
      {
            sprintf(buf,"No file available %s",ext);
            Message(buf);
            return(-1);
      }
      if ((index = getlist(" SELECT FILES ",cnt,list,0)) != -1)
      {
            strncpy(filename,list[index],FILENAMELENGTH);
      }
      else
            *filename =0;

for (i=0; i<MAXFILENOS ; i++)
      {
            if (list[i] != NULL)
                  free(list[i]);
      }

} prt_time()
{
 char dbuf[9];
 char tbuf[9];
 char pbuf[16];
 int oldcolor; long oldbk;

_strdate(dbuf);
 _strtime(tbuf);
 sprintf(pbuf,"%9s",dbuf); pbuf[15]=0;
 oldcolor = _settextcolor(wind[WIN4].txt_high);
 oldbk = _setbkcolor(wind[WIN4].bkcolor);
 _settextposition(W4YL+1,W4XL+1);
 _outtext(pbuf);
 _settextcolor(oldcolor);
 _setbkcolor(oldbk);
} char * savscr()
{
      char far * ptr;
      char * buf;
      int i;

ptr = (char far *) 0xb80000001;
      buf = (char *)malloc(4000);
      if(buf == (char *)NULL){
            printf("\nNot enought memory");
            exit(1);
```

```c
        }
        for(i = 0; i < 4000; i++)
                buf[i] = ptr[i];

return(buf);
} void restore(char * buf)
{
        int i;
        char far * ptr;

ptr = (char far *) 0xb80000001;
        for(i = 0; i < 4000; i++)
                ptr[i] = buf[i];

free(buf);
} cursor_on()
{
        _settextcursor(0x707);
} cursor_off()
{
        _settextcursor(0x2000);
} outstext(char *buf)
{
        int page;
        struct rccoord pos;
        char far *baseaddress;
        char far *start;
        int offset,color,fclr,bclr;

fclr = _gettextcolor();
        bclr = (int) _getbkcolor();
        color = fclr | bclr << 4;
        pos = _gettextposition();
        page = _getactivepage();
        if ((page <0 ) || (page >7))  return(0);
        baseaddress = (char far *)(   0xb8000000L + (page * 0x4000));
        offset = (pos.row-1) * 160 + (pos.col-1) *2;
        start = baseaddress + offset;
        while (*buf != 0)
        {
                *start++ = *buf;
                *start++ = color;
                buf++;
                pos.col = pos.col +1;
                if (pos.col>80)
                {
                        pos.col =0;
                        pos.row++;
                        if (pos.row>25)
                                pos.row =0;

}
        }
        _settextposition(pos.row,pos.col);
} char _far * st_timer()
{
        void (_interrupt _far *oldtimer)();

prt = (char far *) 0xb8000132;
        count = incount = 0;
```

```
    _dos_gettime(&mytime);
    hour = mytime.hour;
    min = mytime.minute;
    sec = mytime.second;
    oldtimer = _dos_getvect(0x1c);

_dos_setvect(0x1c,prt_timer);
    return((char _far *)oldtimer);
/*  _dos_setvect(0x1c,oldtimer);
    _dos_keep(0, 200);  */
} void _interrupt _far prt_timer()
{
 int i, j;

if (++count != 18)
        return;
    count =0;
    sec ++;
    if (++incount == 91 ){
        incount =0;
        sec--;
        return;
    } if(sec >= 60){
        sec = 0;
        min++;
    }
    if(min >= 60){
        min = 0;
        hour++;
    }
    if(hour > 23)
        hour = 0;
    if (hour<10){
        tbuf[0] = '0';
        itoa(hour,&tbuf[1],10);
    }
    else
        itoa(hour,&tbuf[0],10);

if (min<10){
        tbuf[3] = '0';
        itoa(min,&tbuf[4],10);
    }
    else
        itoa(min,&tbuf[3],10);

/*  if (sec<10){
        tbuf[6] = '0';
        itoa(sec,&tbuf[7],10);
    }
    else
        itoa(sec,&tbuf[6],10);
    tbuf[5]= ':';
*/
    tbuf[2] = ':';

for(i = 0, j = 0; i < 5; i++,j++){
        prt[j] = tbuf[i];
        j++;
        prt[j] = 0x0e;
    }

/*  _chain_intr(oldtimer);   */
} update_helpbuf(int win,int index)
{
```

```
switch(win)
  {
  case MENU:     strcpy(helpbuf,"MENU"); break;
  case OPTIONS:
                 switch(wind[MENU].index)
                 {
           case EDIT:    strcpy(helpbuf,"EDIT"); break;
             case PROFILE: strcpy(helpbuf,"PROFILE"); break;
           case REPORTS: strcpy(helpbuf,"REPORTS"); break;
           case INSTALL: strcpy(helpbuf,"INSTALL"); break;
           case FILEMAINT: strcpy(helpbuf,"FILEMAINT"); break;
                 } break;
  }
}
z
```

SH4.C

```
/******************************************************************
*                                                                 *
* MODULE:   SH4.C                                                 *
*                                                                 *
* TITLE:    X                                                     *
*                                                                 *
*        VV    VV EEEEEE RRRRRR  IIIIII FFFFFFF  OOOOO  NNN   NN EEEEEEE *
*        VV    VV EE     RR  RR    II   FF       OO  OO NNNN  NN EE      *
*        VV    VV EEEEEE RRRRRR    II   FFFFFF   OO  OO NN NN NN EEEEEE  *
*         VV  VV  EE     RR RR     II   FF       OO  OO NN  NNNN EE      *
*          VVV    EEEEEE RR   RR IIIIII FF        OOOOO  NN   NNN EEEEEE *
*                                                                 *
*        COPYRIGHT 1990 VERIFONE, INC.                            *
*                                                                 *
*        This program is the property of VERIFONE, INC. and is copyright *
*        protected.  The user is authorized solely to read the program  *
*        from its media into the memory of the computer and  execute the *
*        program. No additional rights with respect to this program are *
*        granted. COPYING, REPRODUCTION, OR DISTRIBUTION of this program *
*        is strictly PROHIBITED.                                  *
*                                                                 *
* PRODUCT: SYSGEM                                                 *
*                                                                 *
* VERSION: 1.00                                                   *
*                                                                 *
* AUTHOR:  RAJESH P. HALARNKAR                                    *
*                                                                 *
* DATE:    7-1-91                                                 *
*                                                                 *
* PURPOSE: The main purpose of this file is to form the rule tree by parsing *
*          rules and also some supplementry functions that aid the evaluation*
*      of these rules.                                            *
* INPUT:   Rules from the rule file.                              *
*                                                                 *
* OUTPUT:  None                                                   *
*                                                                 *
* ENTRY:   X                                                      *
*                                                                 *
* PROGRAM: X                                                      *
* LOGIC                                                           *
*                                                                 *
* RESTRICT:X                                                      *
*                                                                 *
* FILES:   Rule file                                              *
*                                                                 *
* EXIT:    X                                                      *
*                                                                 *
* CHANGES: #   Date       Who        Why & What                   *
*          ---  ---------- ---------- --------------------------- *
*          #01                                                    *
*                                                                 *
******************************************************************/
#include <stdio.h>
#include <process.h>
```

```c
#include <stdlib.h>
#include <errno.h>
#include "shell.h"
#include "prog.h"
#include "proto.h"

create_rule_tree()
{
    char filename[64];
    char buf[256];
    int type = FRL;
    unsigned int j;

for(j=0;j<MAXRULES;j++)
        conc[j] = (PCONCL) NULL;
    if (frlfp==0) { sprintf(msgbuf,"No RULE File opened"); Message(msgbuf); return(-1); }
    if(goto_rules(type) != 1)
        return(0);
    j=0;
    while(check_end(buf, type) != 1){
        if((conc[j] = parser(buf)) == (PCONCL)NULL)
            return(0);
        j++;
    }
    sprintf(msgbuf,"Rules Tree created "); Message(msgbuf);
    return(1);
}

PCONCL parser( char * buf)
{
    unsigned char type;
    char operator;
    char name[NAM_LEN + 1];
    char operand[MAX_OPR][NAM_LEN + 1];
    unsigned i, j;
    PCONCL    conctree;
    POPRND pointer;
    POPRND    ptr;
    int k;
        conctree = (PCONCL)NULL;
    type = buf[0];
    buf++;
    k = skip_blanks(buf);
    buf += k;
    for( i = 0; ((i < NAM_LEN) && (buf[i] != ' ')); i++)
        name[i] = buf[i];
    name[i] = (char)NULL;
    i++;
    buf += i;
    k = skip_blanks(buf);
    buf += k;
    operator = *buf;
    buf++;
    k = skip_blanks(buf);
    buf += k;

for(j = 0, i = 0; (j < MAX_OPR && buf[i] != (char)NULL); j++){
        for( i = 0; ((i < NAM_LEN) && (buf[i]!= ' ')&&(buf[i] != (char)NULL));
                                                                        i++)
            operand[j][i] = buf[i];
        buf += i;
        k = skip_blanks(buf);
        buf += k;
        operand[j][i] = (char)NULL;
        i = 0;
    }
    operand[j][0] = (char)NULL;

conctree = (PCONCL)malloc(CONCLSIZE);
    if ( conctree == (PCONCL)NULL)
        return((PCONCL)NULL);
    conctree->type = type;
```

```
strcpy(conctree->name, name);
conctree->status = 'U';
conctree->operator[0] = operator;

for( i = 0; i < j; i++){
    ptr = (POPRND)malloc(OPRNDSIZE);
    if ( ptr == (POPRND)NULL)
        return((PCONCL)NULL);
    type = locate_fact(&(operand[i][0]));
    if ( type != 0xff){
        switch(type){
            case 'S' :
                    ptr->oprnd_ptr.pstr = p1$;
                    if ( p1$ == (POPRND)NULL){
                        message("P1 null pointer");

}
                    break;
            case 'N' :
                    ptr->oprnd_ptr.pnum = p2$;
                    if ( p2$ == (POPRND)NULL){
                        message("P2 null pointer");

}
                    break;
            case 'L' :
                    ptr->oprnd_ptr.pbool = p3$;
                    if ( p3$ == (POPRND)NULL){
                        message("P3 null pointer");

}
                    break;
            case 'A' :
                    ptr->oprnd_ptr.patrb = p4$;
                    if ( p4$ == (POPRND)NULL){
                        message("P4 null pointer");

}
                    break;
            case 'M' :
                    ptr->oprnd_ptr.pmult = p5$;
                    if ( p5$ == (POPRND)NULL){
                        message("P5 null pointer");
                    }
                    break;
            default  :
                    sprintf(mess_str,"Lousy Type = %c", type);
                    message(mess_str);
                    break;
        }
    }
    else{
        locate_conc(operand[i]);

if(p6$ != NULL){
            ptr->oprnd_ptr.pcon = p6$;
            type = 'C';
        }
        else{
            if ( operator == '='){
                ptr->oprnd_ptr.pbool = (PBOOLFACT)malloc(BOOLSIZE);
                if ( ptr->oprnd_ptr.pbool == (PBOOLFACT)NULL)
                    return((PCONCL)NULL);
                strcpy(ptr->oprnd_ptr.pbool->name, operand[i]);
                ptr->oprnd_ptr.pbool->type = 'L';
                type = 'L';
            }
            else if ( conctree->type == EXEC || conctree->type == DOS){
                ptr->oprnd_ptr.pstr = (PSTRFACT)malloc(STRSIZE);
                if ( ptr->oprnd_ptr.pstr == (PSTRFACT)NULL)
                    return((PCONCL)NULL);
```

```
                strcpy(ptr->oprnd_ptr.pstr->name, operand[i]);
                ptr->oprnd_ptr.pstr->type = 'S';
                type = 'S';
                }
                else{
                        sprintf(mess_str, "Major problems boss type = %x, operator = %c,
name = %s",
                                        type, operator, operand[i]);
                        message(mess_str);
                }
            }
        } ptr->type = type;
        if ( i == 0)
            conctree->oprnds[0] = ptr;
        else
            pointer->nxt_oprnd = ptr;
        pointer = ptr;
        if(type == 0xff){
            sprintf(mess_str ,"Super Major problems boss type = %x, operator = %c",
                                    type, operator);
            message(mess_str);
        }
    }
    ptr->nxt_oprnd = (POPRND)NULL;
    return(conctree);
}

PCONCL locate_conc(name)
char *name;
{
 unsigned int i;
 for (i=0;i<MAXRULES;i++)
   {
    if (conc[i]==0) break;
    if ( strncmp(name,conc[i]->name,NAM_LEN) == 0)
      {
       p6$ = conc[i];
       return(conc[i]);
      }
   }
 p6$ = NULL;
 return( (PCONCL) 0);
} exec_prog(PCONCL conctree)
{
        POPRND    first;
        POPRND    second;
        POPRND    third;
        char str[64];
            char *scrptr,name[20];

name[0] = 0;
        first = conctree->oprnds[0];
        if(first->nxt_oprnd != (POPRND)NULL)
                second = first->nxt_oprnd;
        else{
                second = (POPRND)NULL;
        }
        if(second->nxt_oprnd != (POPRND)NULL)
                third = second->nxt_oprnd;
        else{
                third = (POPRND)NULL;
        }
        if( conctree->type == EXEC){ if(first->oprnd_ptr.pbool->bool_val == TRUE){
/*                      sprintf(str, "%s %s", second->oprnd_ptr.pstr->name,
                                third->oprnd_ptr.pstr->name);
*/
                        sprintf(str, "%s", second->oprnd_ptr.pstr->name);
```

```c
                if((strcmp(str,"command")==0)||(strcmp(str,"COMMAND")==0))
                    ;
                else
                    {
                        get_fil_nam(userfil,name);
                        /*sprintf(str,"%s %s",str,name);*/
                    }
            sprintf (msgbuf," str = %s %s",str,name);
                Message(msgbuf);
            /*selectdospage(1);*/
                scrptr = savscr();
                cursor_on();
//              system (str);
            spawnlp(P_WAIT, str, str, name, NULL);
            restore(scrptr);
            cursor_off();
            /* selectuserpage(1);
            refresh();*/
            }
        }
        else{
/*      sprintf(str, "%s %s", first->oprnd_ptr.pstr->name,
                        second->oprnd_ptr.pstr->name);
*/
        sprintf(str, "%s", first->oprnd_ptr.pstr->name);
            if((strcmp(str,"command")==0)||(strcmp(str,"COMMAND")==0))
        ;
        else
                {
                    get_fil_nam(userfil,name);
                    /* sprintf(str,"%s %s",str,name); */
                }
        sprintf (msgbuf," str = %s %s",str,name);
            Message(msgbuf);
        /*selectdospage(1);*/
                scrptr = savscr();
                cursor_on();
//              system(str);
        spawnlp(P_WAIT, str, str, name, NULL);
                cursor_off();
        restore(scrptr);
        /*selectuserpage(1);*/
        /*refresh();*/
        }
} void eval_eq(PCONCL conctree)
{
    POPRND      first;
    POPRND      second;
    POPRND      third;
/*  POPRND      fourth;
*/
    first = conctree->oprnds[0];
    if(first->nxt_oprnd != (POPRND)NULL)
        second = first->nxt_oprnd;
    else{
        message("Second parameter missing");
        return;
    }
    if(second->nxt_oprnd != (POPRND)NULL)
        third = second->nxt_oprnd;
    else{
        if(conctree->type != CONCLUSION){
            message("Third parameter missing");
            return;
        }
    }

/*  if( (first->type == MULTI)||(first->type == ATTRB)) {
        if(third->nxt_oprnd != (POPRND)NULL)
            fourth = first->nxt_oprnd;
        else{
            message("Fourth parameter missing");

return;
        }
    }
*/
    if ((second->type == MULTI||second->type == ATTRB) &&
```

```
(((first->type == CONCLUSION && (first->oprnd_ptr.pcon->con_val == TRUE
|| first->oprnd_ptr.pcon->con_val == YES)) || (first->type == BOOLEAN
&& (first->oprnd_ptr.pbool->bool_val == TRUE ||
                           first->oprnd_ptr.pbool->bool_val == YES))))
      {
     set_list_name(second->type, third->oprnd_ptr.pbool->name, second->oprnd_ptr);
        second->oprnd_ptr.pbool->status = DEFINED;
        } if(first->type == BOOLEAN && (first->oprnd_ptr.pbool->bool_val == TRUE ||
             first->oprnd_ptr.pbool->bool_val == YES))
        {
     second->oprnd_ptr.pbool->bool_val = third->oprnd_ptr.pbool->name[0];
        second->oprnd_ptr.pbool->status = DEFINED;
        }
  if(first->type == CONCLUSION && (first->oprnd_ptr.pcon->con_val == TRUE ||
             first->oprnd_ptr.pcon->con_val == YES))
        {
     second->oprnd_ptr.pbool->bool_val = third->oprnd_ptr.pbool->name[0];
        second->oprnd_ptr.pbool->status = DEFINED;
        }
  if(conctree->type == CONCLUSION){
      switch(first->type)
         {
          case STRING:
          if ((strcmp(first->oprnd_ptr.pstr->str_val,
              second->oprnd_ptr.pstr->str_val)) == 0)
                conctree->con_val = TRUE;
          else
                conctree->con_val = FALSE;
          break;
        case NUMERIC:
          if (first->oprnd_ptr.pnum->num_val ==
              second->oprnd_ptr.pnum->num_val)
                conctree->con_val = TRUE;
          else
                conctree->con_val = FALSE;
          break;
        case ATTRB:
          if (check_list(ATTRB,second->oprnd_ptr.pbool->name,
                                    first->oprnd_ptr) )
            conctree->con_val = TRUE;
                else
            conctree->con_val = FALSE;
                break;
        case MULTI:
          if (check_list(MULTI,second->oprnd_ptr.pbool->name,
                                    first->oprnd_ptr) )
            conctree->con_val = TRUE;
                else
            conctree->con_val = FALSE;
                break;
         }
  } conctree->status = DEFINED;

} evaluate(PCONCL conctree)
{
    POPRND pointer;
    unsigned int i = 0;
    int ret[MAXRULES];
    pointer = conctree->oprnds[0];
    while(pointer != (POPRND)NULL){
        switch(pointer->type){
            case 'S' :
                message("Strings cannot be evaluated");
                return(0xffff);
            case 'N' :
                ret[i] = (int)eval_num(pointer->oprnd_ptr.pnum);
                break;
```

```
                    case 'L' :
                            ret[i] = (int)eval_bool(pointer->oprnd_ptr.pbool);
                            break;
                    case 'A' :
                            message("Attributes cannot be evaluated");
                            return(0xffff);
                    case 'R' :
                            ret[i] = (int)eval_real(pointer->oprnd_ptr.preal);
                            break;
                    case 'C' :
                            ret[i] = (int)eval_one(pointer->oprnd_ptr.pcon);
                            break;
                    default :
                                    sprintf(msgbuf," Dubious type = %s %x",
                            pointer->oprnd_ptr.pstr->name, pointer->type);
                                    Message(msgbuf);
                            break;
            }
            i++;
            if (pointer->nxt_oprnd != (POPRND)NULL)
                    pointer = next(pointer);
            else
                    break;
    }
    ret[i] = 0xffff;
    if(conctree->operator[0] == AND)
            conctree->con_val = eval_and(ret);
    else if (conctree->operator[0] == OR)
            conctree->con_val = eval_or(ret);
    else{
            sprintf(mess_str, "This operator not yet suported %c, name = %s",
                    conctree->operator[0], conctree->name);
            message(mess_str);

}
    conctree->status = DEFINED;
    return(conctree->con_val);
}
eval_plus(PCONCL conctree)
{
    POPRND pointer;
    unsigned int i = 0;
    int ret[MAXRULES];
    pointer = conctree->oprnds[0];
    while(pointer != (POPRND)NULL){
            switch(pointer->type){
                    case 'S' :
                            message("Strings cannot be added or subtracted");
                            return(0);
                    case 'N' :
                            ret[i] = (int)eval_pos(pointer->oprnd_ptr.pnum);
                            break;
                    case 'L' :
                            message("Logicals cannot be added or subtracted");
                            return(0);
                    case 'A' :
                            message("Attributes cannot be added or subtracted");
                            return(0);
                    case 'R' :
                            ret[i] = (int)eval_pos(pointer->oprnd_ptr.preal);
                            break;
                    case 'C' :
                            ret[i] = (int)eval_one(pointer->oprnd_ptr.pcon);
                            break;
                    default :
                            sprintf(msgbuf," Dubious type = %s %x",
                                            pointer->oprnd_ptr.pstr->name, pointer->type);
                            Message(msgbuf);
                            break;
            }
            i++;
            if (pointer->nxt_oprnd != (POPRND)NULL)
                    pointer = next(pointer);
            else
                    break;
    }
    ret[i] = 0;
    if(conctree->operator[0] == PLUS)
            conctree->result = eval_positive(ret);
    else if (conctree->operator[0] == MINUS)
            conctree->result = eval_minus(ret);
    else if(conctree->operator[0] == MULTIPLY)
```

```
            conctree->result = eval_multiply(ret);
    else if (conctree->operator[0] == DIVIDE)
            conctree->result = eval_divide(ret);
    else if(conctree->operator[0] == GT)
            conctree->con_val = eval_gt(ret);
    else if (conctree->operator[0] == LT)
            conctree->con_val = eval_lt(ret);
    else{
            sprintf(mess_str, "This operator is not yet suported %c, name = %s",
                    conctree->operator[0], conctree->name);
            message(mess_str);

}
    conctree->status = DEFINED;
    return(conctree->result);
} eval_multiply(int * ret)
{
    int i;
    int val = 1;
    for( i = 0; ret[i] != 0; i++)
        val *= ret[i];
    return(val);
} eval_divide(int * ret)
{
    int val;
    val = ret[0] / ret[1];
    return(val);
} unsigned char eval_gt(int * ret)
{
    if(ret[0] > ret[1])
        return(TRUE);
    return(FALSE);
} unsigned char eval_lt(int * ret)
{
    if(ret[0] < ret[1])
        return(TRUE);
    return(FALSE);
} eval_positive(int * ret)
{
    int i;
    int val = 0;
    for( i = 0; ret[i] != 0; i++)
        val += ret[i];
    return(val);
} eval_minus(int * ret)
{
    int val;
    val = ret[0] - ret[1];
    return(val);
} unsigned char eval_and(int * ret)
{
    int i;
    for( i = 0; ret[i] != 0xffff; i++){
        if( ret[i] == 0 || ret[i] == (int)FALSE || ret[i]==(int)NO)
            return('F');
    }
    return('T');
} unsigned char eval_or(int * ret)
{
    int i;
    for( i = 0; ret[i] != 0xffff; i++){
        if( ret[i] == 1 || ret[i] == (int)TRUE||ret[i]==(int)YES)
            return('T');
    }
    return('F');
}
```

```
eval_num (PNUMFACT ptr)
{
    if(ptr->num_val != 0)
        return(1);
    else
        return(0);
} eval_bool (PBOOLFACT ptr)
{
    if( (ptr->bool_val == 'T')||(ptr->bool_val == 'Y') )
        return(1);
    else
        return(0);
} eval_real (PREALFACT ptr)
{
    if(ptr->real_val != 0)
        return(1);
    else
        return(0);
} eval_pos (PNUMFACT ptr)
{
    return(ptr->num_val);
}
/*message(char * str)
{
    printf(str);
    getch();
}
*/

POPRND next(POPRND ptr)
{
    return(ptr->nxt_oprnd);
} eval_all()
{
    int k;
    for(k = 0; conc[k] != (PCONCL)NULL; k++){
        /*if(conc[k]->status != DEFINED){*/
            if (conc[k]->operator[0] == AND || conc[k]->operator[0] == OR)
                evaluate(conc[k]);
            else if (conc[k]->operator[0] == PLUS || conc[k]->operator[0]
                == MINUS || conc[k]->operator[0] == MULTIPLY ||
                conc[k]->operator[0] == GT || conc[k]->operator[0] == LT ||
                                       conc[k]->operator[0] == DIVIDE)
                eval_plus(conc[k]);
            else if(conc[k]->operator[0] == EQ)
                eval_eq(conc[k]);
            else if (conc[k]->operator[0] == QUERY)
                query(conc[k]);
        /*}*/
    }
    sprintf(msgbuf,"All Rules Evaluated");
    Message(msgbuf);
} eval_one(PCONCL concp)
{
    if (concp->operator[0] == AND || concp->operator[0] == OR){
        evaluate(concp);
        return((int)(concp->con_val));
    }
    else if (concp->operator[0] == PLUS || concp->operator[0]
        == MINUS || concp->operator[0] == MULTIPLY ||
                                   concp->operator[0] == DIVIDE){
        eval_plus(concp);
        return(concp->result);
    }
    else if(concp->operator[0] == GT || concp->operator[0] == LT){
        eval_plus(concp);
        return((int)(concp->con_val));
    } else if(concp->operator[0] == EQ){
        eval_eq(concp);
            if (concp->type==RESULT)
```

```
                    return(concp->result);
                        else return(concp->con_val);
            }
            else if (concp->operator[0] == QUERY){
                query(concp);
            }
    } query(PCONCL conctree)
{
        POPRND    first;
        POPRND    second;

first = conctree->oprnds[0];
        if(first->nxt_oprnd != (POPRND)NULL)
            second = first->nxt_oprnd;
        else{
            Message("Second parameter missing");
            return(0);
        }
        if( (first->oprnd_ptr.pbool->bool_val == TRUE)||
                (first->oprnd_ptr.pbool->bool_val == YES) ){
            switch (second->type){
            case STRING :
                        sprintf(msgbuf," %s [string] : ", second->oprnd_ptr.pstr->name);
                        getstr(msgbuf,NAM_LEN,second->oprnd_ptr.pstr->str_val);
                                second->oprnd_ptr.pstr->status = DEFINED;
                        break;
            case NUMERIC :
                        sprintf(msgbuf,"%s [numeric] : ", second->oprnd_ptr.pnum->name);
                        getint(msgbuf,5,&(second->oprnd_ptr.pnum->num_val));
                                second->oprnd_ptr.pnum->status = DEFINED;
                        break;
            case BOOLEAN :
                        sprintf(msgbuf,"%s [boolean] : ", second->oprnd_ptr.pbool->name);
                        getcon(msgbuf,1,&(second->oprnd_ptr.pbool->bool_val));
                                second->oprnd_ptr.pbool->status = DEFINED;
                        break;
/*          case ATTRB :
                        printf("\n%s [attribute] : ", second->oprnd_ptr.patrb->name);
                        fflush(stdin);
                        scanf("%c", &(second->oprnd_ptr.patrb->cur_val));
                        break;
            case REAL :
                        printf("\n%s [real] : ", second->oprnd_ptr.preal->name);
                        fflush(stdin);
                        scanf("%f", &(second->oprnd_ptr.preal->real_val));
                        break;
            case MULTI :
                        printf("\n%s : ", second->oprnd_ptr.pmult->name);
                        scanf("%s", second->oprnd_ptr.pmult->str_val);
                        break;
*/
            default :
                        sprintf(mess_str, "Very very bad case type = %c, %x",
                                                second->type, second->type);
                        Message(mess_str);
                        break;
            }
            conctree->status = DEFINED;
        }
}
exec_dos()
{
    unsigned int i; int cnt,k;
    int ret[MAXRULES];

for (i = 0, k = 0; i < MAXRULES; i++){
        if (conc[i] == 0)
            break;
        if(conc[i]->type == EXEC || conc[i]->type == DOS){
            /*mlist[k] = conc[i]->oprnds[0]->oprnd_ptr.pstr->name;*/
                    mlist[k] = conc[i]->name;
            ret[k] = i;
            k++;
        }
    }
    cnt = k;

while(1){
        k = getlist("Select a program ",cnt,mlist);
        if(k<0)
            break;
```

```
            sprintf(msgbuf,"Item no %d selected ",k); Message(msgbuf);
            exec_prog(conc[ret[k]]);

sprintf(msgbuf,"Program %s executed ",mlist[k]);
            Message(msgbuf);
        }
} exec_group_all()
{
    unsigned int i; int cnt,k;
    int ret[MAXRULES];

for (i = 0, k = 0; i < MAXRULES; i++){
        if (conc[i] == 0)
            break;
        if(conc[i]->type == GRP){
            glist[k] = conc[i]->name;
            ret[k] = i;
            k++;
        }
    }
    cnt = k;

while(1){
        k = getlist("Select a program ",cnt,glist);
        if(k<0)
            break;
        sprintf(msgbuf,"Item no %d selected ",k);
        Message(msgbuf);
        exec_g(conc[ret[k]]);

sprintf(msgbuf,"Group %s evaluated ",glist[k]);
        Message(msgbuf);
    }
} exec_group(char *name)
{
    unsigned int i; int cnt,k;
    int ret[MAXRULES];

for (i = 0, k = 0; i < MAXRULES; i++){
        if (conc[i] == 0)
            break;
        if(conc[i]->type == GRP){
                    if (strcmp(name,conc[i]->name)==0)
                    {
            glist[k] = conc[i]->name;
            ret[k] = i;
            k++;
                    }
        }
    }
    if (k==0) {
       sprintf(msgbuf,"Group %s not found",name);
       Message(msgbuf); return(-1);
       }
    cnt = k;
    for (i=0;i<cnt;i++)
        {exec_g(conc[ret[i]]); sprintf(msgbuf,"Group Line %d executed",i);
         Message(msgbuf);}
        sprintf(msgbuf,"Group %s executed",name);
        Message(msgbuf);
} exec_g(PCONCL conctree)
{
    PCONCL concp;
    POPRND pointer;
    pointer = conctree->oprnds[0];
    concp = conctree->oprnds[0]->oprnd_ptr.pcon;
    while ( concp != (PCONCL)NULL){
        if (concp->operator[0] == AND || concp->operator[0] == OR)
            evaluate(concp);
        else if (concp->operator[0] == PLUS || concp->operator[0]
                == MINUS || concp->operator[0] == MULTIPLY ||
                concp->operator[0] == DIVIDE||
                concp->operator[0] == GT ||
                concp->operator[0] == LT)
            eval_plus(concp);
```

```
            else if(concp->operator[0] == EQ)
                eval_eq(concp);
            else if (concp->operator[0] == QUERY)
                query(concp);
            if(pointer->nxt_oprnd != (POPRND)NULL)
                pointer = next(pointer);
            else
                break;
            concp = pointer->oprnd_ptr.pcon;
        }
        /*sprintf(msgbuf,"Group Evaluated");
        Message(msgbuf);*/
} heap()
{
int ret;
struct _heapinfo info;
ret = _heapchk();
switch(ret){
    case _HEAPEMPTY :
            printf("\nHeapchk: The Heap is empty but doing fine.\n");
            getch();
            break;
    case _HEAPOK :
            printf("\nHeapchk: All systems go. The Heap is fine\n");
            getch();
            break;
    case _HEAPBADBEGIN:
            printf("\nHeapchk: ERROR Very Start of heap lost.");
            getch();
            return(-1);
    case _HEAPBADNODE:
            printf("\nHeapchk: ERROR There is a very bad node in the heap");
            getch();
            return(-1);
    } info._pentry = NULL;
while((ret = _heapwalk(&info)) == _HEAPOK)
    ;
switch(ret){
    case _HEAPEMPTY :
            printf("\nHeapwalk: Heap is empty but doing fine.\n");
            break;
    case _HEAPEND :
            printf("\nHeapwalk: All systems go. End of heap reached.\n");
            getch();
            return(0);
    case _HEAPBADBEGIN:
            printf("\nHeapwalk: ERROR Start of heap lost.");
            getch();
            return(-1);
    case _HEAPBADPTR:
            printf("\nHeapwalk: ERROR Pointer to next entry lost.");
            getch();
            return(-1);
    case _HEAPBADNODE:
            printf("\nHeapwalk: ERROR There is a bad node in the heap");
            getch();
            return(-1);
    }
} bld_ost()
{
 char name[20],*scrptr,buf[64];
  gen_rep(F1L,KEYRPT,KEYEXT);
  gen_rep(F1L,MNURPT,MNUEXT);
  get_fil_nam(userfil,name);
  scrptr = savscr();
  cursor_on();
//system (str);
  strcpy(buf,OST);
  sprintf(msgbuf,"%s %s",buf,name); Message(msgbuf);
  spawnlp(P_WAIT, buf, buf, name, NULL);
  restore(scrptr);
  cursor_off();
} bld_kbd()
{
```

```
  char name[20],*scrptr,buf[64];
  gen_rep(FIL,KEYRPT,KEYEXT);
  get_fil_nam(userfil,name);
  scrptr = savscr();
  cursor_on();
//system (str);
  strcpy(buf,KEYB);
  sprintf(msgbuf,"%s %s",buf,name); Message(msgbuf);
  spawnlp(P_WAIT, buf, buf, name, NULL);
  restore(scrptr);
  cursor_off();
} bld_cost()
{
 char name[20],*scrptr,buf[64];
  gen_rep(FIL,PRTSLST,PRTSEXT);
  get_fil_nam(userfil,name);
  scrptr = savscr();
  cursor_on();
//system (str);
  strcpy(buf,PRTSPRG);
  sprintf(msgbuf,"%s %s",buf,name); Message(msgbuf);
  spawnlp(P_WAIT, buf, buf, name, NULL);
  restore(scrptr);
  cursor_off();
}
^Z
                                         SH5.C /********************************************************************
 *                                                                  *
 * MODULE:    SH5.C                                                 *
 *                                                                  *
 * TITLE:     X                                                     *
 *                                                                  *
 *            VV    VV EEEEEEE RRRRRR IIIIII FFFFFFF  OOOOO  NNN   NN EEEEEEE *
 *            VV    VV EE      RR  RR   II   FF       OO  OO NNNN  NN EE      *
 *            VV    VV EEEEEE  RRRRRR   II   FFFFFF   OO  OO NN NN NN EEEEEE  *
 *             VV  VV  EE      RR RR    II   FF       OO  OO NN  NNNN EE      *
 *              VVV    EEEEEEE RR   RR IIIIII FF       OOOOO  NN   NNN EEEEEEE *
 *                                                                  *
 *            COPYRIGHT 1990 VERIFONE, INC.                         *
 *                                                                  *
 *            This program is the property of VERIFONE, INC. and is copyright *
 *            protected.   The user is authorized solely to read the program  *
 *            from its media into the memory of the computer and  execute the *
 *            program.  No additional rights with respect to this program are *
 *            granted. COPYING, REPRODUCTION, OR DISTRIBUTION of this program *
 *            is strictly PROHIBITED.                               *
 *                                                                  *
 * PRODUCT:  SYSGEM                                                 *
 *                                                                  *
 * VERSION:  1.00                                                   *
 *                                                                  *
 * AUTHOR:   SRINIVASAN RAO                                         *
 *                                                                  *
 * DATE:     15 NOV 1990                                            *
 *                                                                  *
 * PURPOSE: CONTAINS THE USER MENU AND OPTIONS INTERFACE            *
 *                                                                  *
 * INPUT:    KEYBOARD                                               *
 *                                                                  *
 * OUTPUT:   CGA/VGA MONITOR                                        *
 *                                                                  *
 * ENTRY:    X                                                      *
 *                                                                  *
 * PROGRAM:  X                                                      *
 * LOGIC                                                            *
 *                                                                  *
 * RESTRICT:X                                                       *
 *                                                                  *
 * FILES:    X                                                      *
 *                                                                  *
 * EXIT:     X                                                      *
 *                                                                  *
 * CHANGES:  #  Date      Who         Why & What                    *
 *             ---  ---------- ----------- ------------------------------ *
 *             #01                                                  *
 *                                                                  *
 ********************************************************************/
#include <stdio.h>
#include <graph.h>
```

```c
#include "win.h"
#include "menu.h"
#include "shell.h"
#include "proto.h"

#define NOOFUNITS "NO_OF_UNITS"
#define DCOST "DCOST"
#define CCOST "CCOST"
#define MEMORY "MEMORY"
#define DUNITCOST "DUNITCOST"
#define CUNITCOST "CUNITCOST"
#define PARTLIST "PARTLIST"
#define KEYLIST "KEYLIST"

exec_menu(int win)
{
 int k;
 if (win==SMENU_WIN)
   {
    switch(wind[MENU_WIN].index)
      {
       case EDIT:   switch(wind[win].index)
                   {
                    default: Message(" Function not implemented "); break;
                   } break;
       case PROFILE:  switch(wind[win].index)
                   {
                    case LOAD: if (getfrlfil())
                              {
                               create_fact_tree();
                                         create_rule_tree();
                               create_rpts_tree();
                              }
                                         if (getuserfil()) load_cust_facts();
                              break;
                    case RUN:  if(get_user_info())
                                  eval_all();
                                  break;
                    case DOSPROG: exec_dos();
                                  break;
                    case GROUP: exec_group_all();
                                  break;
                    case SAVE: if (check_dat_fil()==0) getnewfil();
                              store_cust_data();
                                  close_dat_fil();
                                         reset_dat_fil();
                              Clear_File_Msg('B');
                                  break;
                    default:   Message(" Function not implemented ");break;
                   } break;
       case REPORTS:  switch(wind[win].index)
                   {
                    case BUILD: eval_rpts(); break;
                    case PRINT: print_rpts(); break;
                    case VIEW:  view_rpts(); break;
                    case PARTS: k = memsize();
                                         sprintf(msgbuf,"Memsize is %d ",k);
                              Message(msgbuf);
                              exec_group(PARTLIST);
                                         bld_cost();
                              break;
                    default: Message(" Function not implemented "); break;
                   } break;
       case INSTALL: switch(wind[win].index)
                   {
                    case PROGRAMS:
                              bind();
                              Message("Bind over going to coster");
                              coster();
                              Message("Coster executed");
                              break;
                    default: Message(" Function not implemented "); break;
                   } break;
       case FILEMAINT:  switch(wind[win].index)
                   {
                    case BUILD_OST:
                       bld_ost(); break;
                    case KEYBOARD:
                       exec_group(KEYLIST);
                          bld_kbd(); break;
                    default: Message(" Function not implemented "); break;
                   } break;
 }
```

```c
    }
}
coster()
{
    unsigned char type;
    unsigned long totalcost,dollars,cents;
    unsigned int memry;
    unsigned long unitcost, unitdollars;

type = locate_fact(NOOFUNITS);
    if(type == NUMERIC){
        totalcost = (unsigned long) costing(p2$->num_val, &memry,
                                                        &unitcost);
        dollars = totalcost/100;
        cents = totalcost-dollars*100;
        type = locate_fact(DUNITCOST);
        if(type == NUMERIC){
            unitdollars = unitcost/100;
            p2$->num_val = unitdollars;
            p2$->status = DEFINED;
        }
        else
            Message("DUNITCOST sould be numeric");

type = locate_fact(CUNITCOST);
        if(type == NUMERIC){
            p2$->num_val = unitcost - unitdollars *100;
            p2$->status = DEFINED;
        }
        else
            Message("CUNITCOST sould be numeric");

type = locate_fact(MEMORY);
        if(type == NUMERIC){
            p2$->num_val = (unsigned long) memry;
            p2$->status = DEFINED;
        }
        else
            Message("MEMORY sould be numeric");

type = locate_fact(DCOST);
        if(type == NUMERIC){
            p2$->num_val = dollars;
            p2$->status = DEFINED;
        }
        else
            Message("DCOST sould be numeric");

type = locate_fact(CCOST);
        if(type == NUMERIC){
            p2$->num_val = cents;
            p2$->status = DEFINED;
        }
        else
            Message("CCOST sould be numeric");
    }
    else
        Message("NOOFUNITS should be numeric");
} display_file(int win, char *fil)
{
int xl,yl,xh,yh,oldclr; FILE *fp; long oldbk; char buf[80];
 xl = wind[win].xl+1;
 xh = wind[win].xh-1;
 yl = wind[win].yl+1;
 yh = wind[win].yh-1;
 _settextwindow(yl,xl,yh,xh);
 If ( (fp=fopen(fil,"r")) == NULL )
   { sprintf(buf,"Unable to open File %s"); Message(buf); return(-1); }
 oldclr = _settextcolor(wind[win].txt_color);
 oldbk = _setbkcolor(wind[win].bkcolor);
 while (!feof(fp))
   {
    fgets(buf,80,fp);
    _outtext(buf);
   }
   fclose(fp);
   _settextwindow(1,1,25,80);
   _settextcolor(oldclr);
   _setbkcolor(oldbk);
  return(1);
}^Z
```

SHELL.H

```c
/*****************************************************************
 *                                                               *
 * MODULE:   shell.h                                             *
 *                                                               *
 * TITLE:    X                                                   *
 *                                                               *
 *           VV    VV EEEEEE RRRRRR IIIIII FFFFFFF OOOOO  NNN    NN EEEEEEE *
 *           VV    VV EE     RR  RR   II   FF      OO  OO NNNN   NN EE      *
 *           VV    VV EEEEEE RRRRRR   II   FFFFF   OO  OO NN NN  NN EEEEE   *
 *           VV VV EE        RR RR    II   FF      OO  OO NN  NNNN EE       *
 *            VVV   EEEEEE RR   RR  IIIIII FF       OOOOO NN   NNN EEEEEEE  *
 *                                                               *
 *           COPYRIGHT 1990 VERIFONE, INC.                       *
 *                                                               *
 *           This program is the property of VERIFONE, INC. and is copyright *
 *           protected.  The user is authorized solely to read the program   *
 *           from its media into the memory of the computer and execute the  *
 *           program.  No additional rights with respect to this program are *
 *           granted. COPYING, REPRODUCTION, OR DISTRIBUTION of this program *
 *           is strictly PROHIBITED.                             *
 *                                                               *
 * PRODUCT: SYSGEM                                               *
 *                                                               *
 * VERSION: 1.00                                                 *
 *                                                               *
 * AUTHOR:  SRINIVASAN RAO                                       *
 *                                                               *
 * DATE:    CONTAINS DECLARATIONS FOR THE SHELL VARIABLES AND CONSTANTS *
 *                                                               *
 * PURPOSE: FOR USE BY SHELL FUNCTIONS                           *
 *                                                               *
 * CHANGES: #   Date        Who         Why & What               *
 *          --- ----------  ----------  ----------------------   *
 *          #01                                                  *
 *                                                               *
 *****************************************************************/
#include <malloc.h>
#include <dos.h>
#define NOPAIN 1
#define NOTEST 1
#ifdef DEFGLB
define EXTERN
#else
#define EXTERN extern
endif
/* ---------------------------------------------------------------- */
/* Header File for Shell Variable declaration                       */
/* ---------------------------------------------------------------- */

/*--------------------------------*/
/*   CONSTANT Declaration Part   */
/*--------------------------------*/ define MAX_OPR 10
define CR 0x0d
#define LF 0x0a
#define UNDEFINED 'U'
#define UNKNOWN 'U'
define DEFINED 'D' define NAM_LEN 32
define BUF_LEN 80
#define MAX_CON 256
#define MSG_LEN 80
#define N_LEN 8
#define MAX_GRPS 32
#define MAXRULES 256

/******************************/
/* File Types                 */
/******************************/ define FRL    1
define DATA   2

/* Type Definition for Facts */ define STRING  'S'
define NUMERIC 'N'
#define BOOLEAN 'L'
```

```
#define ATTRB    'A'
#define REAL     'R'
#define MULTI    'M'
#define MESSAGE  'Q'
define GROUPS   'G' define QUERY    '?'
define EQUALS   '=' define TRUE     'T'
define FALSE    'F' define YES      'Y'
define NO       'N' define RESULT      'E'
define CONCLUSION  'C'
#define ASSIGN   'P'
#define GOAL     'Z'
#define EXEC     'X'
#define DOS      'D'
#define CONSTANT 'K'
#define GRP      'G'
/* Operators */ define AND      '&'
define OR       '!'
#define EQ       '='
#define NE       '#'
#define NOT      '~'
#define GT       '>'
#define LT       '<'
#define MAJ      '\'
#define PLUS     '+'
#define MINUS    '-'
#define MULTIPLY '*'
#define DIVIDE   '/'

/* Reports Part */ define SCREEN 'S'
define FIL    'F'

/*-------------------------------------------------------------------*/
/* Struct and Variable Definitions                         */      */
/*-------------------------------------------------------------------*/ typedef struct nam_list {
            char status;
            char val;
            char lname[NAM_LEN];
            struct nam_list *next_nam;
                } LIST,*PLIST;

typedef struct msg_list {
            char status;
            char val;
            char name[NAM_LEN];
                char messg[MSG_LEN];
            struct msg_list *next_nam;
                } MLIST,*PMLIST;

typedef struct str_fact {
          char status;
          char type,mode;
          char name[NAM_LEN];
              char mname[N_LEN];
              char gname[N_LEN];
          char str_val[NAM_LEN];
          struct str_fact *lptr,*rptr;
        } STRFACT,*PSTRFACT;

typedef struct num_fact {
          char status;
          char type,mode;
          char name[NAM_LEN];
              char mname[N_LEN];
              char gname[N_LEN];
          long num_val;
          struct num_fact *lptr,*rptr;
        } NUMFACT,*PNUMFACT;
typedef struct real_fact {
```

```
                char status;
                char type,mode;
                char name[NAM_LEN];
                        char mname[N_LEN];
                        char gname[N_LEN];
                float real_val;
                struct real_fact *lptr,*rptr;
                } REALFACT,*PREALFACT;
typedef struct bool_fact {
                char status;
                char type,mode;
                char name[NAM_LEN];
                        char mname[N_LEN];
                        char gname[N_LEN];
                unsigned char bool_val;
                struct bool_fact *lptr,*rptr;
                } BOOLFACT,*PBOOLFACT;
typedef struct atrb_fact {
                char status;
                char type,mode;
                char name[NAM_LEN];
                        char mname[N_LEN];
                        char gname[N_LEN];
                char cur_val;
                unsigned char lcount;
                PLIST head,tail;
                struct atrb_fact *lptr,*rptr;
                } ATRBFACT,*PATRBFACT;
typedef struct mult_fact {
                char status;
                char type,mode;
                char name[NAM_LEN];
                        char mname[N_LEN];
                        char gname[N_LEN];
                unsigned char lcount;
                PLIST head,tail;
                struct mult_fact *lptr,*rptr;
                } MULTFACT,*PMULTFACT;

#define STRSIZE sizeof(STRFACT)
#define NUMSIZE sizeof(NUMFACT)
#define REALSIZE sizeof(REALFACT)
#define BOOLSIZE sizeof(BOOLFACT)
#define ATRBSIZE sizeof(ATRBFACT)
#define MULTSIZE sizeof(MULTFACT)
#define LISTSIZE sizeof(LIST)
#define MLISTSIZE sizeof(MLIST)

/*------------------------------------------------------------------*/
/* CONCLUSION Tree variables                                        */
/*------------------------------------------------------------------*/ typedef union fcptr   {
                struct str_fact *pstr;
                struct num_fact *pnum;
                struct real_fact *preal;
                struct bool_fact *pbool;
                struct con_tre *pcon;
                struct atrb_fact *patrb;
                struct mult_fact *pmult;
                } *FACTPTR, FACT;

typedef struct oprnd    {
                unsigned char type;
                FACT oprnd_ptr;
                struct oprnd *nxt_oprnd;
                } OPRND, *POPRND;

typedef struct con_tre   {
                unsigned char status;
                unsigned char type,mode;
                char name[NAM_LEN];
                unsigned char con_val;
                long result;
                char operator[MAX_OPR];
                POPRND oprnds[MAX_OPR];
                } CONCL,*PCONCL;

#define OPRNDSIZE sizeof(OPRND)
#define CONCLSIZE sizeof(CONCL)
```

```
EXTERN PSTRFACT root_str,p1$;
EXTERN PNUMFACT root_num,p2$;
EXTERN PBOOLFACT root_bool,p3$;
EXTERN FILE *frlfp;
EXTERN FILE *datfp, * rptfp;

EXTERN    PCONCL conc[MAXRULES];
EXTERN    PCONCL rpts[32];
EXTERN    PATRBFACT root_atrb,p4$;
EXTERN    PMULTFACT root_mult,p5$;
EXTERN    PCONCL p6$;

EXTERN    FACTPTR fptr,cptr;
EXTERN    char mess_str[128];
EXTERN    char helpbuf[64];
EXTERN    char msgbuf[80];
EXTERN char *mlist[64];
EXTERN char *glist[64];
EXTERN int ilist[32],grp_cnt; /*ret[MAXRULES];*/
EXTERN char userfrl[20],frlfil[20],userfil[20];
EXTERN char *grp_name[MAX_GRPS];
EXTERN PMLIST msg_head,msg_tail;

EXTERN union REGS inregs;
EXTERN union REGS outregs;
EXTERN struct SREGS segregs;
^z
```

ST.C

```
/****************************************************************
 *                                                              *
 * MODULE:  ST.C                                                *
 *                                                              *
 * TITLE:   X                                                   *
 *                                                              *
 *        VV   VV EEEEEEE RRRRRR  IIIIII FFFFFFF OOOOO  NNN   NN EEEEEEE *
 *        VV   VV EE      RR   RR   II   FF      OO  OO NNNN  NN EE      *
 *        VV   VV EEEEEE  RRRRRR    II   FFFFFF  OO  OO NN NN NN EEEEE   *
 *         VV VV  EE      RR RR     II   FF      OO  OO NN  NNNN EE      *
 *          VVV   EEEEEEE RR   RR IIIIII FF       OOOOO NN   NNN EEEEEEE *
 *                                                              *
 *        COPYRIGHT  1990  VERIFONE, INC.                       *
 *                                                              *
 *        This program is the property of VERIFONE, INC. and is copyright *
 *        protected.  The user is authorized solely to read the program  *
 *        from its media into the memory of the computer and  execute the *
 *        program.  No additional rights with respect to this program are *
 *        granted. COPYING, REPRODUCTION, OR DISTRIBUTION of this program *
 *        is strictly PROHIBITED.                               *
 *                                                              *
 * PRODUCT: SYSGEM                                              *
 *                                                              *
 * VERSION: 1.00                                                *
 *                                                              *
 * AUTHOR:  SRINIVASAN RAO                                      *
 *                                                              *
 * DATE:    1 NOV 1990                                          *
 *                                                              *
 * PURPOSE: MAIN MODULE FOR SYSGEM                              *
 *                                                              *
 * INPUT:   NONE                                                *
 *                                                              *
 * OUTPUT:  NONE                                                *
 *                                                              *
 * ENTRY:   X                                                   *
 *                                                              *
 * PROGRAM: X                                                   *
 * LOGIC                                                        *
 *                                                              *
 * RESTRICT:X                                                   *
 *                                                              *
 * FILES:   X                                                   *
 *                                                              *
 * EXIT:    X                                                   *
 *                                                              *
 * CHANGES: #   Date        Who         Why & What             *
 *          --- ----------  ----------- ----------------------- *
 *          #01                                                 *
 *                                                              *
 ****************************************************************/
```

For internal functions.

```
/*********************************************************************
 * PURPOSE: X                                                        *
 *                                                                   *
 * INPUT:   X                                                        *
 *                                                                   *
 * OUTPUT:  X                                                        *
 *                                                                   *
 * PROGRAM: X                                                        *
 * LOGIC                                                             *
 *********************************************************************/ define DEFGLB 1
include "win.h"
#include "shell.h"
#include "proto.h"

define COLOR 1 char *namelist[] = { "Amar","Arun","Ashok","Bill","Bud" };
define NAMESIZE   sizeof namelist/sizeof (char *)

extern free_fact_mem();

char *menu[]= { "EDIT","PROFILE","REPORTS","INSTALL","FILEMAINT"};
char *emnu[] = { "FILES","OPEN","NEW","SAVE","EXIT","QUIT"};
/*char *fmnu[] = { "LOAD","NEW","SAVE","EXIT","QUIT"};*/
char *rmnu[] = { "LOAD","RUN","DOSPROG","SAVE", "GROUP"};
char *rpmnu[] = { "BUILD","PRINT","VIEW","PARTS_LIST"};
/*char *flmnu[]  = {"RULEFIL","USERFIL"};*/
char *inmnu[] = {"PROGRAMS","FILES"};
char *mnmnu[] = {"BUILD_OST","KEYBOARD"};
#define MENUSIZE   sizeof menu/sizeof (char *)
#define EMNUSIZE   sizeof emnu/sizeof (char *)
#define FMNUSIZE   sizeof fmnu/sizeof (char *)
#define RMNUSIZE   sizeof rmnu/sizeof (char *)
#define RPMNUSIZE  sizeof rpmnu/sizeof (char *)
#define FLMNUSIZE  sizeof flmnu/sizeof (char *)
#define INMNUSIZE  sizeof inmnu/sizeof (char *)
#define MNMNUSIZE  sizeof mnmnu/sizeof (char *)
unsigned char far dots[8] = {0xff,0xff,0xff,0xff,0xff,0xff,0xff,0xff};
main()
{
  int i,j; char far *timer_ptr;
  onexit(free_fact_mem);
  cursor_off();
  /* oldtimer = _dos_getvect(0x1c);
  system("timer");*/
  /*welcome();*/
  _clearscreen(_GCLEARSCREEN);
#ifdef COLOR
  _setvideomode(_TEXTC80);
#else
  _setvideomode(_TEXTBW80);
#endif
  /*selectuserpage(0);   */
  init_win(WIN0,BKBLK,BRWHITE,YELLOW);
  init_win(WIN1,BKLBL,BRWHITE,YELLOW);
  init_win(WIN2,15L,BRWHITE,YELLOW);
  init_win(WIN3,BKLGN,BRWHITE,YELLOW);
  init_win(WIN4,BKBLK,BRWHITE,LRED);
  init_win(WIN5,BKBRN,BRWHITE,YELLOW);
  displayframe(W0XL,W0YL,W0XH,W0YH); fill(WIN0);
  displayframe(W1XL,W1YL,W1XH,W1YH,BLUE); fill(WIN1);
  displayframe(W2XL,W2YL,W2XH,W2YH,GREEN); fill(WIN2);
  displayframe(W3XL,W3YL,W3XH,W3YH,CYAN); fill(WIN3);
  displayframe(W4XL,W4YL,W4XH,W4YH,BRWHITE); fill(WIN4);
  displayframe(W5XL,W5YL,W5XH,W5YH,YELLOW); fill(WIN5);
  prnt_titles();
/*  for (i=0;i<6;i++)
    for (j=0;j<32;j++)
      mnu[i][j] = tstr[j];

for (i=0;i<5;i++)
  {
    scount[i] = 6;
    for (j=0;j<6;j++)
      smnu[i][j] = tstr[i*5+j];
  }*/
```

```c
   for(i=0; i<MENUSIZE; i++)
      mnu[WIN0][i] = menu[i];
   for(i=0; i<EMNUSIZE; i++)
      mnu[WIN5][i] = emnu[i];
   for(i=0; i<EMNUSIZE; i++)
      smnu[0][i] = emnu[i]; scount[0] = EMNUSIZE;
/* for(i=0; i<FMNUSIZE; i++)
      smnu[1][i] = fmnu[i]; scount[1] = FMNUSIZE; */
   for(i=0; i<RMNUSIZE; i++)
      smnu[1][i] = rmnu[i]; scount[1] = RMNUSIZE;
   for(i=0; i<RPMNUSIZE; i++)
      smnu[2][i] = rpmnu[i]; scount[2] = RPMNUSIZE;
   for(i=0; i<INMNUSIZE; i++)
      smnu[3][i] = inmnu[i]; scount[3] = INMNUSIZE;
   for(i=0; i<MNMNUSIZE; i++)
      smnu[4][i] = mnmnu[i]; scount[4] = MNMNUSIZE;
   show_list(WIN0,mnu[0],MENUSIZE,GREEN);
/* show_list(WIN1,mnu[1],20,LRED);
   show_list(WIN2,mnu[2],32,BLACK);*/
   show_list(WIN5,mnu[5],EMNUSIZE,BLACK);
   /*getch();*/
   win_seq[0] = WIN0; win_seq[1] = WIN5; win_seq[2] = 2; win_seq[3] = 5;
   curr_wind = 0; win_index = 0;
   wind[WIN3].curr_row = W3YL+1;
   wind[WIN3].curr_col = W3XL+1;

/*
   for (j=0;j<MAX_WINDOWS;j++)
   {
     for (i=0;i<mcount[j];i++)
     printf("WIN%d row = %d col = %d ",j,mrow[j][i],mcol[j][i]);
     printf("\n");
   }
   */
   fflush(stdin);
   timer_ptr = st_timer();
   main_loop();
   _dos_setvect(0x1c, (void(_interrupt _far *)())timer_ptr);
   _setvideomode(_DEFAULTMODE);
} refresh()
{
   displaydframe(W0XL,W0YL,W0XH,W0YH); fill(WIN0);
   displaydframe(W1XL,W1YL,W1XH,W1YH,BLUE); fill(WIN1,BKCYN);
   displaydframe(W2XL,W2YL,W2XH,W2YH,GREEN); fill(WIN2,BKLCY);
   displaydframe(W3XL,W3YL,W3XH,W3YH,CYAN); fill(WIN3,BKLGN);
   displaydframe(W4XL,W4YL,W4XH,W4YH,BRWHITE);
   displaydframe(W5XL,W5YL,W5XH,W5YH,YELLOW); fill(WIN5,BKLMG);
   prnt_titles();
   show_list(WIN0,mnu[0],MENUSIZE,GREEN);
/* show_list(WIN1,mnu[1],20,LRED);
   show_list(WIN2,mnu[2],32,BLACK);*/
   show_list(WIN5,mnu[5],EMNUSIZE,BLACK);
}
welcome()
{
 _setvideomode(_VRES16COLOR);
 displaydframe(1,2,200,20);
 RegFont();
 ChooseFont(2,24);
 _moveto(120,80);
 _setcolor(LCYAN);
 _outgtext("WELCOME TO SYSGEM");
 ChooseFont(1,20);
 _moveto(180,170);
 _setcolor(YELLOW);
 _outgtext("Copyright VeriFone Inc");
 _moveto(220,200);
 _outgtext(" Ver 1.0 1990 ");
 _moveto(180,280);
 _setcolor(BRWHITE);
 _outgtext("Press Any Key to Continue");
 getch();
 _setvideomode(_TEXTC80);
}
```

WIN.H

```c
/*******************************************************************
 *                                                                  *
 * MODULE:  WIN.H                                                   *
 *                                                                  *
 * TITLE:   X                                                       *
 *                                                                  *
 *          VV    VV EEEEEE RRRRRR IIIIII FFFFFFF 00000  NNN   NN EEEEEE  *
 *          VV    VV EE     RR  RR   II   FF      OO  OO NNNN  NN EE      *
 *          VV    VV EEEEEE RRRRRR   II   FFFFFF  OO  OO NN NN NN EEEEE   *
 *           VV  VV  EE     RR RR    II   FF      OO  OO NN  NNNN EE      *
 *            VVV    EEEEEE RR  RR IIIIII FF      00000  NN   NNN EEEEEE  *
 *                                                                  *
 *          COPYRIGHT 1990  VERIFONE, INC.                          *
 *                                                                  *
 *          This program is the property of VERIFONE, INC. and is copyright *
 *          protected.  The user is authorized solely to read the program  *
 *          from its media into the memory of the computer and  execute the *
 *          program.  No additional rights with respect to this program are *
 *          granted. COPYING, REPRODUCTION, OR DISTRIBUTION of this program *
 *          is strictly PROHIBITED.                                 *
 *                                                                  *
 * PRODUCT: SYSGEM                                                  *
 *                                                                  *
 * VERSION: 1.00                                                    *
 *                                                                  *
 * AUTHOR:  SRINIVASAN RAO                                          *
 *                                                                  *
 * DATE:    20 NOV 1990                                             *
 *                                                                  *
 * PURPOSE: CONTAINS VARIABLE FOR USER INTREFACE FUNCTIONS          *
 *                                                                  *
 * CHANGES: #   Date        Who         Why & What                  *
 *          --- ----------  ----------  ------------------------------ *
 *          #01                                                     *
 *                                                                  *
 *******************************************************************/
#include <graph.h>
#include <dos.h>
#include <stdio.h>
#include <stdlib.h>
#include <ctype.h>
#include <conio.h>
#include <sys\types.h>
#include <sys\stat.h>
include <io.h> ifdef DEFGLB
define EXTERN
#else
#define EXTERN extern
endif define MAXFILENOS 40
define FILENAMELENGTH 13
#define MAX_WINDOWS 6
#define MAXW 2
#define MAX_MNU 6
#define MAX_SMNU 20
define DLWND 2 define ONE 1
define ZERO 0
#define TRUE 1
#define FALSE 0
#define BLACK 0
#define BLUE 1
#define GREEN 2
#define CYAN 3
#define RED 4
#define MAGENTA 5
```

```
#define BROWN 6
#define WHITE 7
#define GREY 8
#define LBLUE 9
#define LGREEN 10
#define LCYAN 11
#define LRED 12
#define LMAGENTA 13
#define YELLOW  14
#define BRWHITE 15
#define BLBLUE 17
#define BLGREEN 18
#define BLCYAN 19
#define BLRED 20
#define BLMAGENT 21
#define BLBROWN 22
define BLWHITE 31 define BKBLK 0L
define BKBLU 1L
#define BKGRN 2L
#define BKCYN 3L
#define BKRED 4L
#define BKMAG 5L
#define BKBRN 6L
#define BKWHT 7L
#define BKLBL 9L
#define BKLGN 10L
#define BKLCY 11L
#define BKLRD 12L
#define BKLMG 13L
define BKYEL 14L define ARROWS 1
define NOARROWS 0
#define TAB 9
#define CR 0x0D
#define UP 0x48
#define DOWN 0x50
#define LEFT 0x4b
#define RIGHT 0x4d
#define F10 0x44
#define F7 0x41
define ESC 0x1b define WIN0 0
define WIN1 1
#define WIN2 2
#define WIN3 3
#define WIN4 4
define WIN5 5 define MENU_WIN 0
define SMENU_WIN 5 define W0XL 1
define W0YL 1
#define W0XH 62
define W0YH 3 define W1XL 1
define W1YL 4
#define W1XH 62
define W1YH 7 define W2XL 1
define W2YL 8
#define W2XH 62
define W2YH 21 define W3XL 1
define W3YL 22
```

```
#define W3XH 62
define W3YH 24 define W4XL 63
define W4YL 1
#define W4XH 80
define W4YH 3 define W5XL 63
define W5YL 4
#define W5XH 80
define W5YH 24 define TXTSIZE 12 struct file_list
 {
   struct find_t fileinfo;
   int file_number;
   struct file_list *next;
 };

EXTERN struct wins
  {
    int count,index;
    int rows,cols,lastcol;
    int curr_row,curr_col;
    long bkcolor;
    int txt_high,txt_color;
    int xl,xh,yl,yh;
  } wind[MAX_WINDOWS];

EXTERN char *mnu[MAX_WINDOWS][32];
EXTERN int mrow[MAX_WINDOWS][32],mcol[MAX_WINDOWS][32];
EXTERN int mcount[MAX_WINDOWS];
EXTERN int mcurr[6],curr_wind,win_seq[MAX_WINDOWS],win_index;
EXTERN char *smnu[MAX_MNU][MAX_SMNU],scount[MAX_SMNU];
EXTERN char *namelist[],*scrptr,tbuf[9];
EXTERN struct dostime_t mytime;
EXTERN unsigned int count,incount,hour,hour,min,sec;

char *savscr();
void restore(char *ptr);
void _interrupt _far prt_timer(void);
void (_interrupt _far *oldtimer)();
char far *st_timer();
char far *prt;
^Z
```

What is claimed is:

1. A system configuration tool for providing a custom designed transaction system in response to user specified requirements, comprising:
   means for defining facts for use in determining the configuration of a system which is capable of performing desired transaction functions;
   means for utilizing said facts to obtain data defining said desired transaction functions;
   means for receiving and storing said data;
   means for storing a set of predefined hardware options;
   means for storing a set of predesigned application modules serving as software options;
   means for defining, based upon said data, a transaction system hardware configuration selected from said set of predefined hardware options, said hardware configuration being capable of providing said desired transaction functions; and
   means for defining, based upon said data, a software configuration selected from said set of, predesigned application modules, said software configuration capable of running on said hardware configuration in order to provide said desired transaction functions.

2. A system as in claim 1 wherein said means for defining facts comprises a template file.

3. A system as in claim 1 which further comprises means for obtaining specific information required in response to a selected one or more desired transaction functions.

4. A system as in claim 1 which further comprises means for providing a report defining said transaction system hardware configuration.

5. A system as in claim 1 which further comprises means for providing a report defining said desired transaction functions.

6. A system as in claim 1 which further comprises means for providing a set of software and data files in response to said desired transaction functions.

7. A system as in claim 4 wherein the format of said report is specified in a template file.

8. A system as in claim 5 wherein the format of said report is specified in a template file.

9. A system as in claim 6 wherein the format of said report is specified in a template file.

10. A system as in claim 1 which further comprises a master state table comprising a plurality of state transitions, and means for providing an operational state table comprising a selected set of said transitions contained in said master state table based upon said desired transaction functions.

11. A system as in claim 1 which further comprises means for allowing a user to define a layout of an input keyboard on said system being configured, based upon a set of choices available in response to said desired transaction functions.

12. A system as in claim 3 wherein said additional specific information includes information specific to the application to be run by a transaction system user.

13. A method for providing a custom designed transaction system in response to user specified requirements, comprising computer implemented steps of:
 defining facts for use in determining the configuration of a system which is capable of performing desired transaction functions;
 utilizing said facts to obtain data defining said desired transaction functions;
 receiving and storing said data;
 storing a set of predefined hardware options;
 storing a set of predesigned application modules serving as software options;
 defining, based upon said data, a transaction system hardware configuration selected from said set of predefined hardware options, said hardware configuration being capable of providing said desired transaction functions; and
 defining, based upon said data, a software configuration selected from said set of predesigned application modules, said software configuration capable of running on said hardware configuration in order to provide said desired transaction functions.

14. A method as in claim 13 wherein said step of defining facts comprises the step of using a template file which defines said facts.

15. A method as in claim 1 which further comprises the step of obtaining specific information required in response to a selected one or more desired transaction functions.

16. A method as in claim 13 which further comprises the step of providing a report defining said transaction system hardware configuration.

17. A method as in claim 13 which further comprises the step of providing a report defining said desired transaction functions.

18. A method as in claim 13 which further comprises the step of providing a set of software and data files in response to said desired transaction functions.

19. A method as in claim 16 wherein the format of said report is specified in a template file.

20. A method as in claim 17 wherein the format of said report is specified in a template file.

21. A method as in claim 18 wherein the format of said report is specified in a template file.

22. A method as in claim 13 which further comprises the step of using a master state table comprising a plurality of state transitions to provide an operational state table comprising a selected set of said transitions contained in said master state table based upon said desired transaction functions.

23. A method as in claim 13 which further comprises the step of allowing a user to define a layout of an input keyboard on said system being configured, based upon a set of choices available in response to said desired transaction functions.

24. A method as in claim 15 wherein said additional specific information includes information specific to the application to be run by a transaction system user.

* * * * *

UNITED STATES PATENT AND TRADEMARK OFFICE
CERTIFICATE OF CORRECTION

PATENT NO.   : 5,263,164
DATED        : November 16, 1993
INVENTOR(S)  : Kannady et al.

It is certified that error appears in the above-identified patent and that said Letters Patent is hereby corrected as shown below:

Column 204,
Line 5, delete "claim 1" and insert therefor -- claim 13 --

Signed and Sealed this

Fourteenth Day of September, 2004

JON W. DUDAS
*Director of the United States Patent and Trademark Office*